Dec. 17, 1946. N. H. SAUNDERS Re 22,820

AUTOMATIC TELEPHONE SYSTEM

Original Filed Feb. 2, 1942 14 Sheets-Sheet 1

Inventor:
Norman H. Saunders
By C. R. Sif.
Atty.

AUTOMATIC TELEPHONE SYSTEM

Original Filed Feb. 2, 1942 14 Sheets-Sheet 2

Inventor:
Norman H. Saunders
By C. C. S.
Atty.

Dec. 17, 1946. N. H. SAUNDERS Re 22,820

AUTOMATIC TELEPHONE SYSTEM

Original Filed Feb. 2, 1942 14 Sheets-Sheet 3

Inventor:
Norman H. Saunders
By C. R. Sof
Atty.

Dec. 17, 1946. N. H. SAUNDERS Re 22,820
AUTOMATIC TELEPHONE SYSTEM
Original Filed Feb. 2, 1942 14 Sheets-Sheet 4
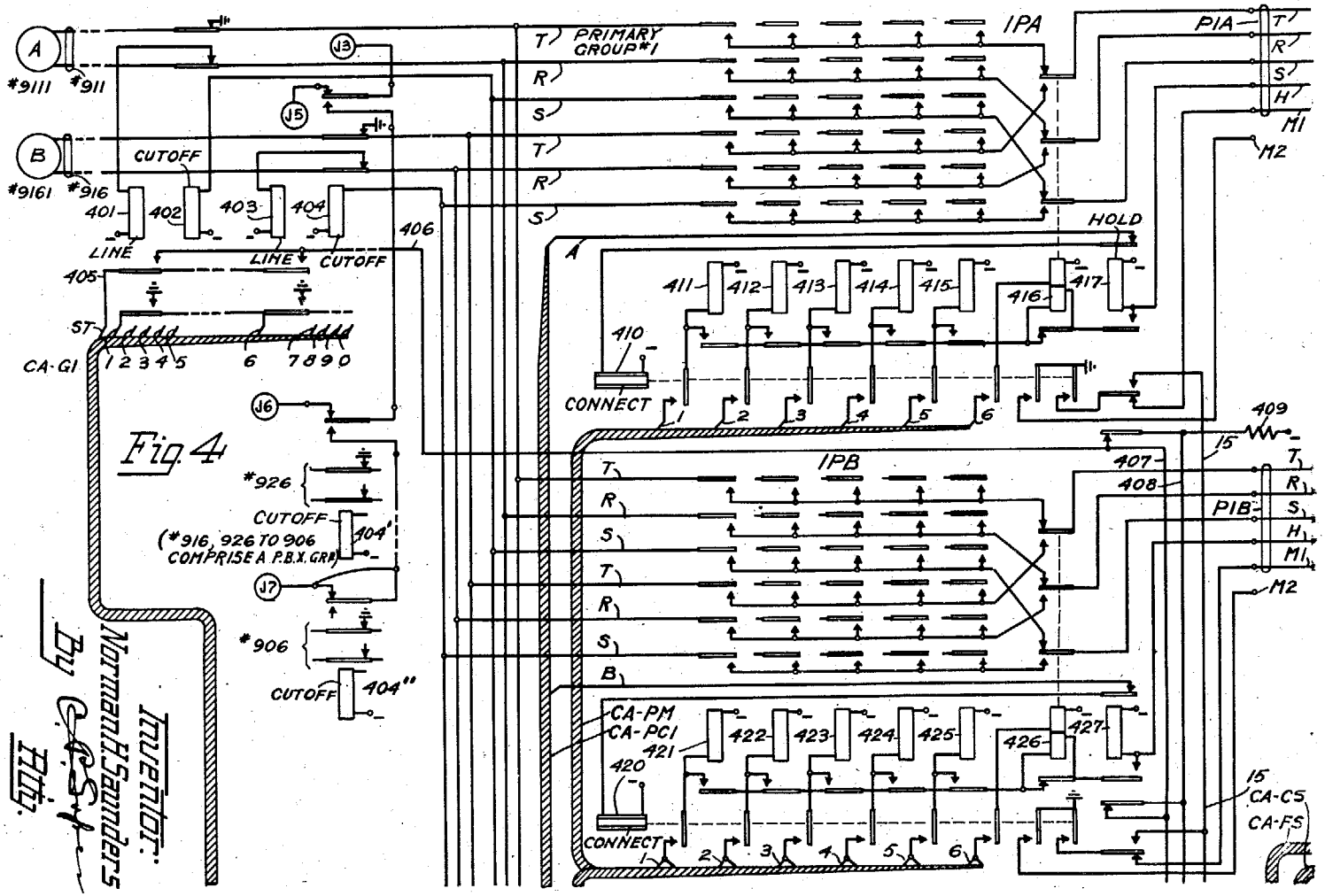

AUTOMATIC TELEPHONE SYSTEM

Original Filed Feb. 2, 1942 14 Sheets-Sheet 5

Inventor:
Norman H Saunders
By C. P. Sapin
Atty.

AUTOMATIC TELEPHONE SYSTEM

Original Filed Feb. 2, 1942 14 Sheets-Sheet 6

Inventor:
Norman H. Saunders
By C. C. Soper
Atty.

AUTOMATIC TELEPHONE SYSTEM

Original Filed Feb. 2, 1942 14 Sheets-Sheet 7

Inventor:
Norman H. Saunders
By C. S. Sifer
Atty.

Dec. 17, 1946. N. H. SAUNDERS Re 22,820

AUTOMATIC TELEPHONE SYSTEM

Original Filed Feb. 2, 1942 14 Sheets-Sheet 8

Inventor:
Norman H. Saunders
By C. R. Sofer
Atty.

AUTOMATIC TELEPHONE SYSTEM

Original Filed Feb. 2, 1942 14 Sheets-Sheet 9

Inventor:
Norman H. Saunders
By C. C. Soper
Atty.

AUTOMATIC TELEPHONE SYSTEM

Original Filed Feb. 2, 1942 14 Sheets-Sheet 10

Inventor:
Norman H. Saunders
By C. C. Spencer
Atty.

AUTOMATIC TELEPHONE SYSTEM

Original Filed Feb. 2, 1942 14 Sheets-Sheet 11

Inventor:
Norman H. Saunders
By C. P. S.
Atty.

Dec. 17, 1946. N. H. SAUNDERS Re 22,820

AUTOMATIC TELEPHONE SYSTEM

Original Filed Feb. 2, 1942 14 Sheets-Sheet 12

Inventor:
Norman H. Saunders
By C.P.S.
Atty.

AUTOMATIC TELEPHONE SYSTEM

Original Filed Feb. 2, 1942 14 Sheets-Sheet 13

Inventor:
Norman H. Saunders
By C. P. Sofer
Atty.

AUTOMATIC TELEPHONE SYSTEM
Original Filed Feb. 2, 1942 14 Sheets-Sheet 14
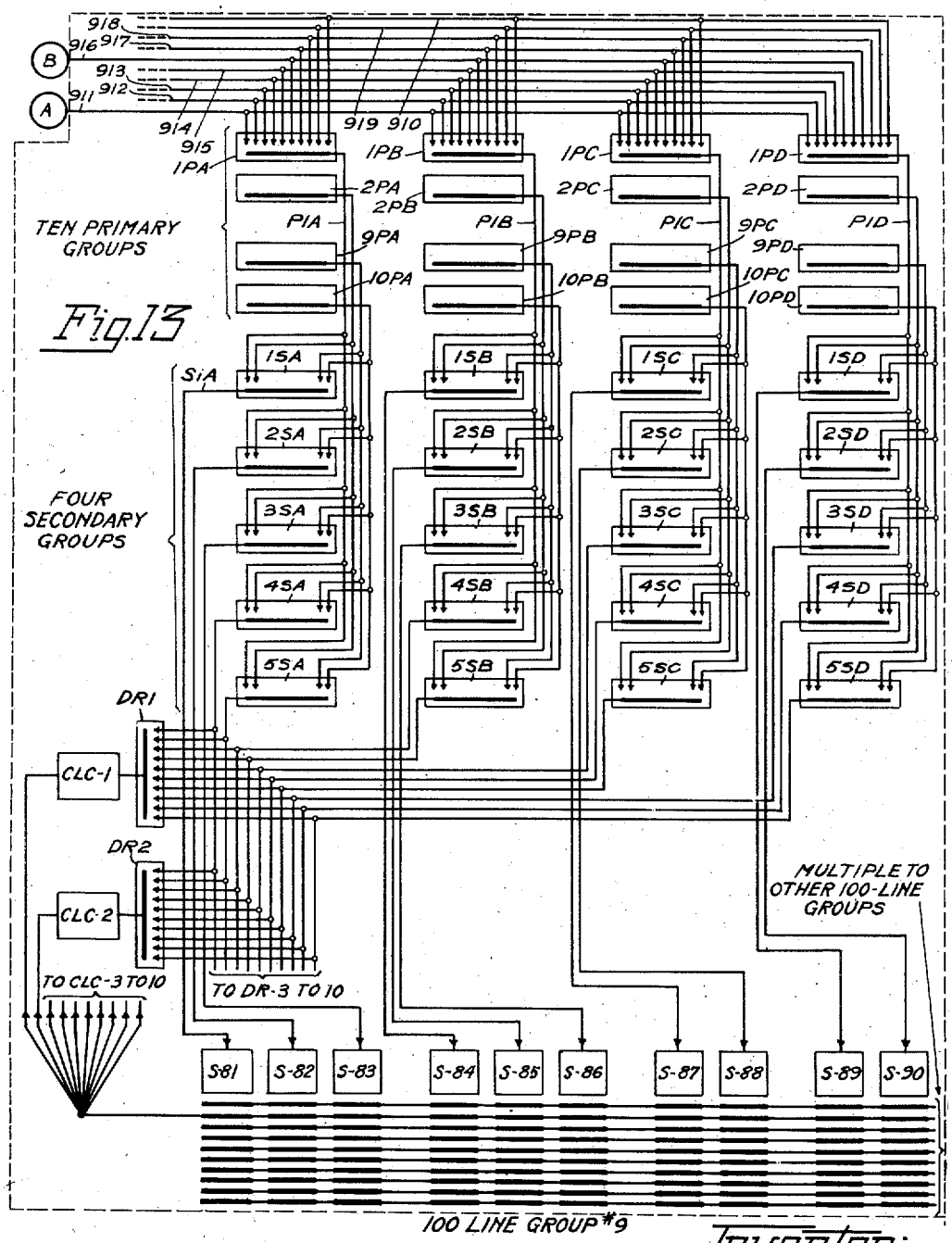
Inventor:
Norman H. Saunders
By C. P. Soper
Atty.

Reissued Dec. 17, 1946 Re. 22,820

UNITED STATES PATENT OFFICE 22,820

AUTOMATIC TELEPHONE SYSTEM

Norman H. Saunders, Chicago, Ill., assignor to Kellogg Switchboard and Supply Company, Chicago, Ill., a corporation of Illinois Original No. 2,333,744, dated November 9, 1943, Serial No. 429,232, February 2, 1942. Application for reissue September 9, 1944, Serial No. 553,483

46 Claims. (Cl. 179—17)

This invention relates to automatic telephone systems, and its object is to provide an economical and reliable automatic telephone system arranged to provide the various services which have heretofore been found necessary or desirable in connection with the subscriber lines.

This application is a continuation in part of my prior application Serial No. 400,990, filed July 3, 1941.

General Description

In addition to providing regular telephone service for individual subscriber lines, it is necessary or at least desirable that automatic telephone systems provide the following services:

1. Party-line service, which includes the selection of the called party line and the signaling of the desired substation thereon;
2. Reverting-call party-line service, in which a subscriber at one substation on a party line is able to call a subscriber at any other substation on the same party line;
3. P. B. X service, the provision of a group of subscriber lines having a common directory number, with arrangements for selecting and making connection with an idle line of the group when the common directory number is called;
4. Non-busy-line service, the provision of a line which is not made busy when called, enabling a number of contemporaneous calls to be made to such line;
5. Call-holding service, the provision of arrangements for enabling calls to a desired substation to be held therefrom, as when a subscriber is being annoyed by anonymous calls;
6. Secretarial service, the provision enabling the calls directed to a substation while the subscriber is absent to be routed to a secretary's telephone; and
7. Intercepting service, the provision of arrangements enabling calls to a disconnected substation to be routed to an intercepting operator.

It is an object of the invention to provide services such as those mentioned above through the provision of equipment common to all of the connecting-link circuits serving a group of lines (100 lines in the illustrated example).

It has been chosen to illustrate the invention as applied to an automatic telephone system of the type employing small-capacity primary and secondary switches in tandem to replace the large-capacity switches heretofore used as line finders and connectors. The disclosed tandem arrangement of the small-capacity switches incorporates a number of features of improvement in addition to those previously enumerated.

As will be described more fully hereinafter, the subscriber lines are divided into what are termed large groups (of 100 lines each); subgroups of small-capacity primary and secondary switching devices are provided in each large group to handle both the originating and terminating calls; and control equipment common to all the primary and secondary switching devices of a large group is provided to position these devices for extending originating or finder-action connections, which common control equipment also responds to position the required primary and secondary switching devices to complete terminating of connector-action connections, the dialed line-designating digits for each call being stored for this purpose and then transferred, call-by-call, to the common equipment as the common equipment becomes available.

A specific object is the production of a system of the character under consideration wherein control equipment common to all of the primary and secondary switching devices of a large group is provided to control the setting of these devices in outgoing of finder-action connections, which common equipment also responds in substantially the same way to position the required primary and secondary switches for incoming or connector action, the dialed tens and units digits for each call being stored for this purpose and then transferred, call-by-call, to the common equipment as it becomes available.

A feature of the disclosed arrangement is that the digit-storage equipment is associated with the connecting-link circuit (the circuits which control the setting-up of incoming or connector-action connections). A further feature is that the distributing device associated with each such link circuit has access to each secondary device allotted to extend connector-action calls to the primary devices, whereby no connector-action calls need be lost at any time because of unavailability to the connecting-link circuits of idle connector-action secondary devices.

A further specific object is the production of a system of the character under consideration wherein the equipment for providing services such as those enumerated hereinbefore is provided in connection with the above-mentioned common equipment, whereby the amount of equipment necessary for providing such services is greatly reduced.

Other objects and features of the invention will appear more fully as the description progresses.

*The drawings*

Referring now to the accompanying drawings, they show by means of the usual circuit diagrams a sufficient amount of the equipment involved in an automatic telephone system embodying the features of the invention to enable the invention to be understood.

Figs. 12 and 13 illustrate the arrangement of the system; and

Fig. 14 shows the intended arrangement of the sheets of drawings on which Figs. 1 to 11 are drawn.

*The system arrangement*

Figure 12:
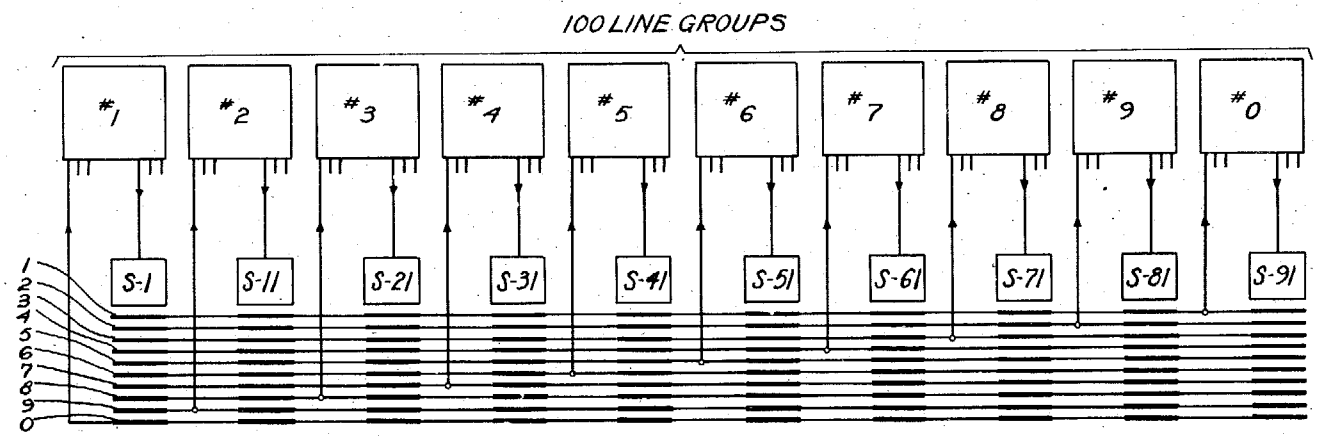

Referring now particularly to Figs. 12 and 13, the arrangement of the system will be described.

The arrangement shown in Fig. 12 illustrates a 1,000-line automatic telephone system comprising ten 100-line groups, each of which may be arranged as indicated in Fig. 13. Each of the rectangles in Fig. 12 indicates a separate 100-line group, each such group having originating-link paths taken for use automatically by primary and secondary finder action within the group when the receiver is removed at a calling substation, each group also having terminating or connector-action link paths, any idle one of which may be seized when a connection is to be completed to a subscriber line of that group.

The selectors S1, S11, etc. to S91, located respectively below the 100-line groups, #1, #2, etc. to #0, are each but one of a number (ten, for example) provided to handle calls originating in the associated 100-line group. In the illustrated 1,000-line system, only a single rank of selectors is employed, the illustrated hundreds selectors. If the system illustrated were expanded to a 10,000-line system, two ranks of selectors would be provided, thousands selectors and hundreds selectors; while if it were reduced to a 100-line system, no selectors at all would be required, each originating or finder-action path being joined to a terminating or connector-action path, as will be understood.

The illustrated selectors, mechanically, may be of the usual two-motion type of automatic switch. Where long-life is a factor, the selectors may be of the so-called all-relay type, in which a counting-relay operation occurs responsive to dialed impulses to select any one of ten group relays, followed by a hunting-relay action to select an idle link connected up by the group relay operation. One selector of the latter type suitable for use herein is illustrated in applicant's co-pending application, Serial No. 346,069, filed July 18, 1940, issued April 14, 1942, Patent No. 2,279,531.

Considering, for example, the selector S1 of Fig. 12, the rectangle within which the reference character S1 is placed may indicate the control relays of the selectors, while each of the short, heavy lines beneath this rectangle is intended to indicate a group of contact sets (assumed to be ten in the present example). Each of these groups of contact sets is connected up responsive to the dialing of a separate one of the digits 1 to 9 and 0, as indicated. The fainter lines extending horizontally between illustrated selectors are intended to indicate the multiple between selectors.

The links incoming to the 100-line group #1 are reached from the first, or digit-1, group of contact sets of all of the selectors; the links incoming to the 100-line group #2 are reached from the second, or digit-2, group of contact sets of all of the selectors; etc., to the 100-line group #0, whose incoming links are reached from the tenth, or digit-0, group of contact sets of all of the selectors.

Since the arrangement of any one of the 100-line groups may be similar to those of all of the rest of the 100-line groups, it suffices to show the switching and circuit arrangements of a single one of the 100-line groups. The 100-line group #9 has been chosen arbitrarily for this purpose. It is the 100-line group whose incoming links are reached through any one of the selectors responsive to the dialing of the digit 9. The switching arrangement of 100-line group #9 is shown in Fig. 13, while the circuit arrangements thereof are indicated in Figs. 1 to 11.

Referring now particularly to Fig. 13, it will be seen that the selector S81 of Fig. 12 is only one of ten selectors provided for handling calls originating in 100-line group #9, the other selectors being S82 to S90, the respective groups of contact sets of all of these selectors being connected in multiple with each other and with the corresponding groups of contact sets of the selectors reached from the other 100-line groups.

The one hundred subscriber lines served by 100-line group #9 are subdivided into ten 10-line groups, each served by a separate group of primary switching devices. For example, the first 10-line group in Fig. 13 comprises the subscriber lines 911 to 910, indicated along the top of the drawing and connected in multiple to the selective-position contacts of the four primary switching devices 1PA, 1PB, 1PC, and 1PD. These switching devices constitute the first of ten primary groups. The second primary group, including primary switches 2PA to 2PD, serves the second 10-line group (lines 921 to 920) of the 100-line group #9. The primary groups serving the third to eighth 10-line groups have been omitted for the sake of compactness, but the primary switching devices (9PA to 9PD and 10PA to 10PD) which serve the ninth and tenth 10-line groups are indicated.

The lines and line multiple for all of the 10-line groups except the first have been omitted for the sake of simplicity, as each 10-line group is similar to each of the other 10-line groups. It is intended to be illustrated by the arrangement in Fig. 13 that any idle one of the primary switching devices, such as 1PA to 1PD, for example, having access to a group of 10 lines can operate to make connection with a calling line, and that any idle one of the said devices can operate to make connection with any called line in the associated 10-line group.

The arrangement illustrated in Fig. 13 has been provided on the assumption that four connections (incoming, outgoing, or both) within a 10-line group are sufficient. For the 100-line group, this provides for a total of forty connections to be made with calling and called lines, which has been shown by experience to be much more than is required. Accordingly, the total number of connection paths is halved in the secondary groups, as will now be pointed out.

As illustrated in Fig. 13, a total of twenty secondary switching devices (each of 10-line capacity) is provided, and are arranged in four groups, A to D. The secondary devices are 1SA to 5SA in the A group, 1SB to 5SB in the B group, 1SC to 5SC in the C group, and 1SD to 5SD in the D group. In each secondary group, the selective-position contacts of the switching devices are connected respectively in multiple as indicated, and the ten links thus provided extend respectively to ten primary switching devices, each in a different 10-line group. The five secondary devices 1SA to 5SA, comprising the A secondary group, have access to the ten A primary devices 1PA to 10PA; the B secondary group has access to the ten B primary devices 1PB to 10PB; the C secondary group has access to the ten C primary switching devices 1PC to 10PC; and the D secondary group has access to the ten D primary switching devices 1PD to 10PD. Each of the twenty secondaries, 1SA to 5SD, therefore, has access to each of the 10-line groups of lines, through the illustrated primary switching devices. The common secondary devices are thus more efficient from a call-handling standpoint than are the primary switching devices in that they receive calls from and extend calls to the large group of one hundred lines, instead of being restricted to a small or 10-line group, as is the case of the primaries. The reduction permitted in the number of switching devices or links when the group is enlarged is well known, and therefore need not be further discussed herein.

Of the twenty secondary switching devices, some in each group are allotted to the handling of the originating or finder-action connections, the remainder being allotted to the handling of terminating or connector-action connections. It is to be observed that devices 1SA to 3SA in secondary group A, are assigned to finder action, and are linked respectively to the selectors S81 to S83; the devices 1SB to 3SB in secondary group B are linked respectively to the selectors S84 to S86; and the first two devices in each of the C and D secondary groups are linked respectively with the selectors S87 to S90. The ten remaining secondary switching devices (the last two in each of secondary groups A and B, and the last three in each of the secondary groups C and D), are assigned to connector action, and are therefore linked to the selective-position contacts of the distributing devices, such as DR—1 and DR—2.

Since the 100-line group shown in Fig. 13 is group #9, calls to this group come through the ninth group of contact sets of all of the selectors serving all 100-line groups. The link group reached through the ninth selector group of contact sets is shown by a single line extending to the left from selector S81, and then branching out upwardly into ten lines to indicate the ten link paths represented by the ninth selector group. These link paths are all incoming to the 100-line group #9 of Fig. 13, and they extend respectively to connecting-link circuits CLC—1 to CLC—10, of which only the first two are indicated.

Each connecting-link circuit CLC—1 to CLC—10 has a selective-switching device associated therewith termed herein a distributor. The distributors DR—1 and DR—2 are shown associated respectively with the connecting-link circuits CLC—1 and CLC—2. Each of the distributors has ten selective-position contact sets, whereby it can associate its individual connecting-link circuit with any one of the ten terminating or connector-action paths leading to the secondary devices assigned to connector action.

*The circuit drawings*

Figure 1:
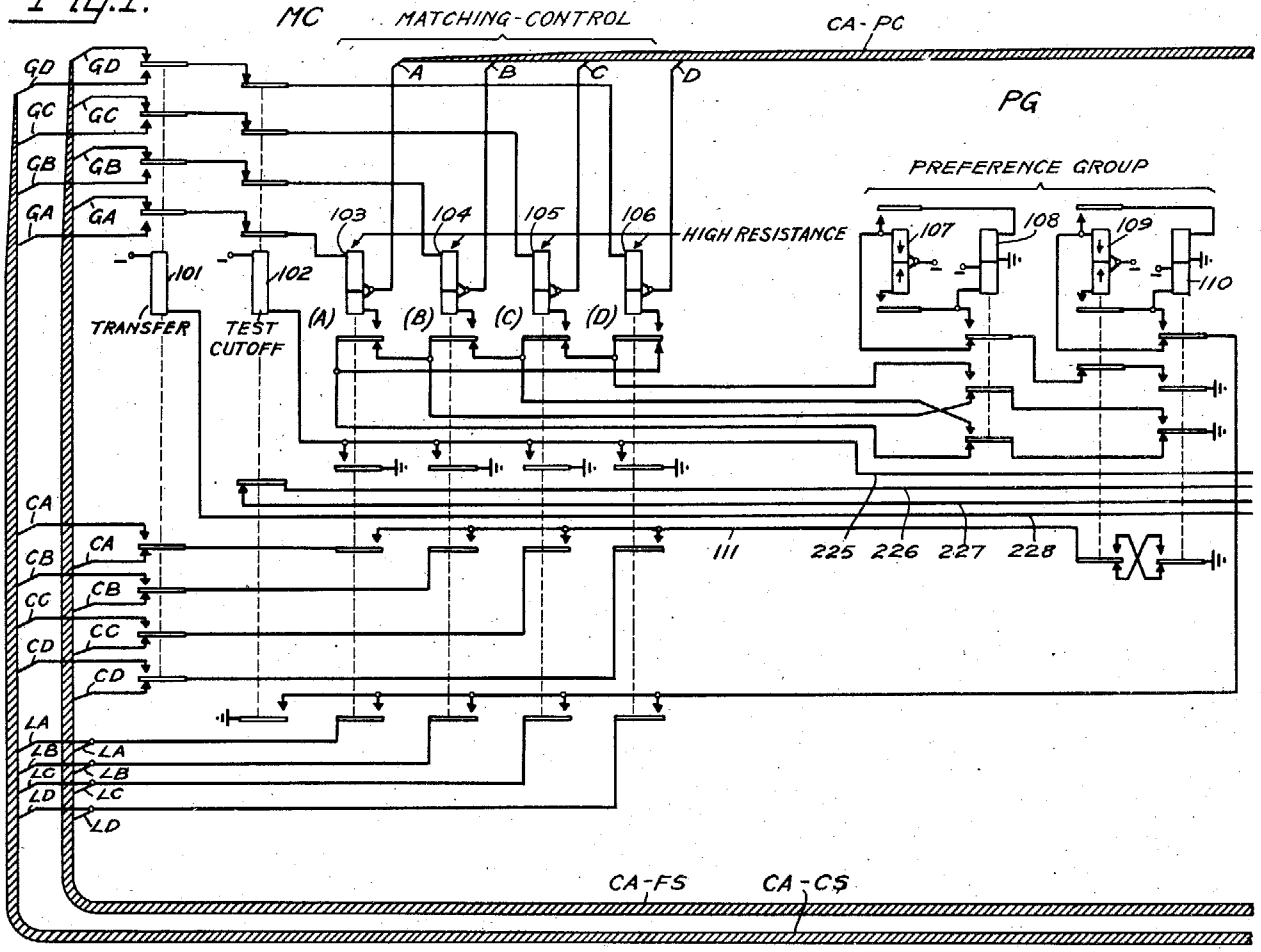
Figs. 1 to 11 are circuit drawings of the system.
Figure 2:
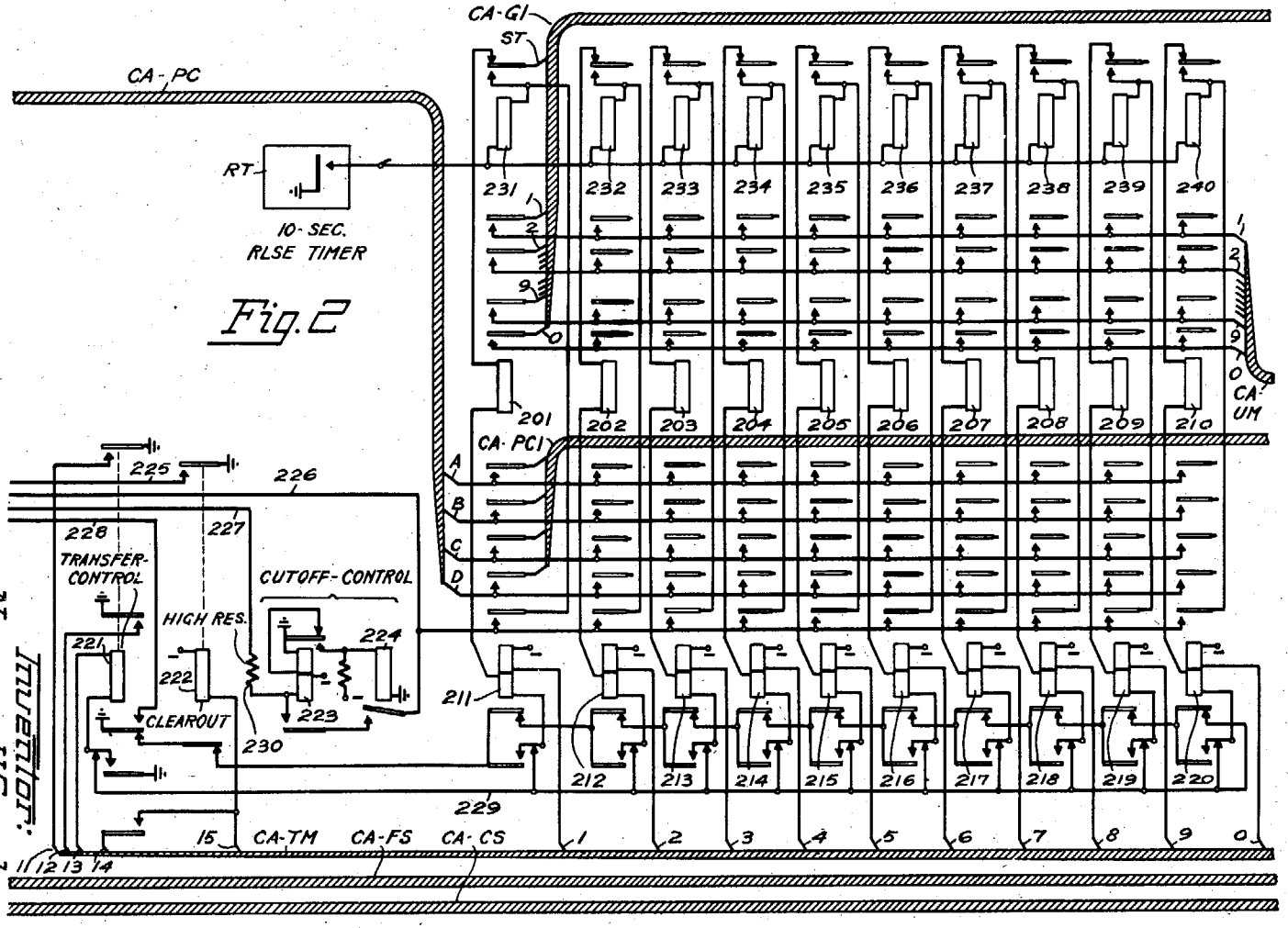
Figure 3:
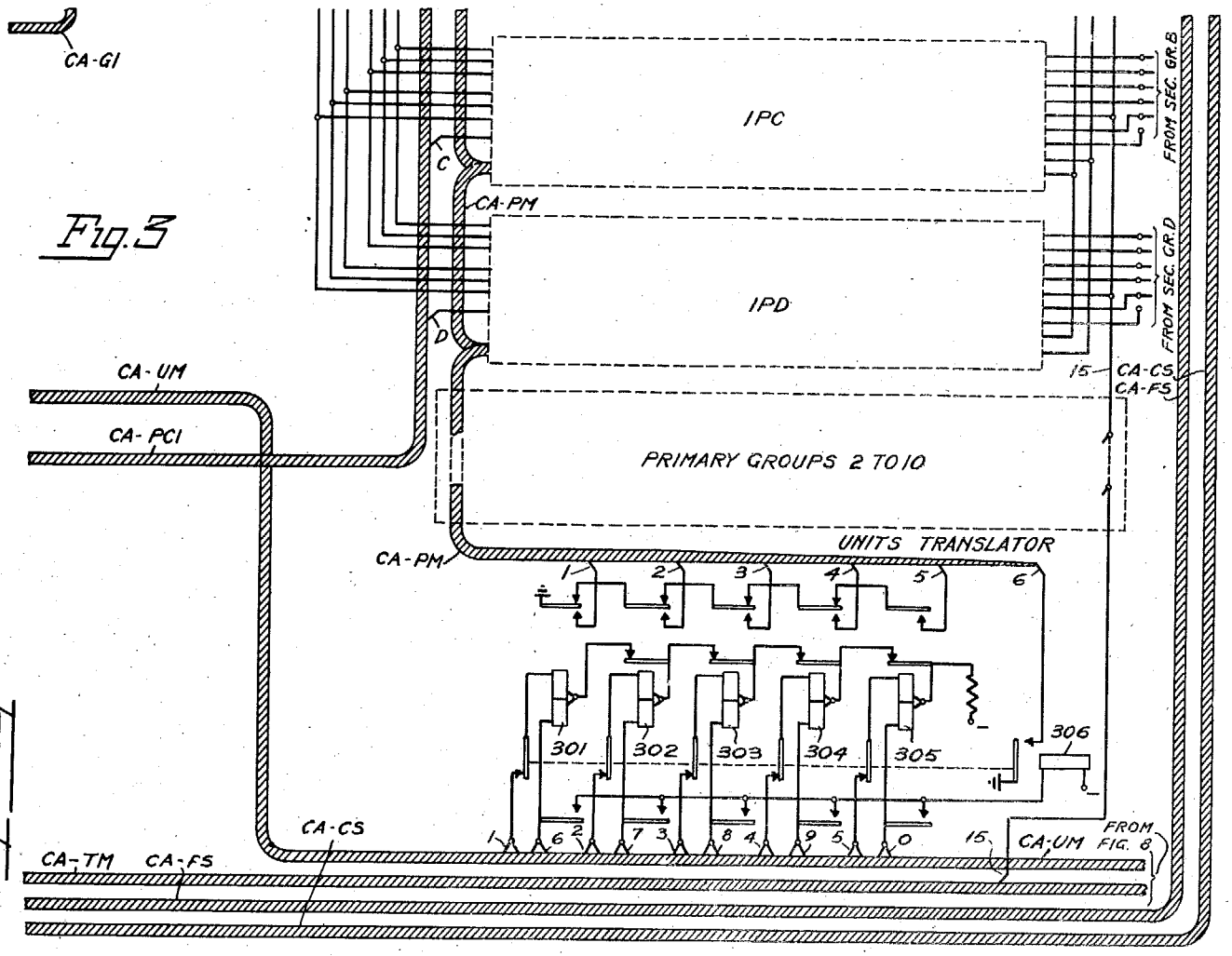

Referring now to the circuit drawings (Figs. 1 to 11) of the 100-line group #9, the equipment shown in Figs. 1 and 2 and in the lowermost portion of Fig. 3 is common equipment controlled from the 10-line groups of hundreds group #9. The equipment shown in Fig. 1 includes transfer relay 101, for changing over from finder action to connector action; test-cutoff relay 102, matching control relays 103 to 106, controlled according to the instant position of the preference group of relays 107 to 110 to match an idle one of the four primary switching devices in a calling (or called, as the case may be) 10-line group with a secondary group in which there is at least one idle secondary device allotted for finder action (or for connector action, as the case may be).

Fig. 2 shows ten pairs of tens-connecting relays, each pair being associated with a separate one of the ten 10-line groups. Relays 201 and 211 are associated with the first 10-line group; 202 and 212 are associated with the second 10-line group, etc., to the last pair, relays 210 and 220, which are associated with the tenth 10-line group.

Relays 211 to 220 are used both for finder action and for connector action and are arranged to be mutually exclusive in their operation. Each of the relays 211 to 220 serves, when operated, to connect up the four primary switching devices having access to the associated 10-line group of lines.

The relays 201 to 210 are used for finder action only and each serves, when operated, to connect up the ten marking conductors individual respectively to the ten lines of the associated 10-line group, whereby the selected primary device is caused to be set in a position to connect with the instant calling line. For this purpose, each of the relays 201 to 210 has ten contact pairs, but for the sake of compactness of the illustration, only the first, second, ninth and tenth contact pairs are illustrated. The relays 221 and 222 are control relays associated with the group relays 211 to 220.

The relays 231 to 240 are associated respectively with the ten 10-line groups, and each of them serves as a cutoff relay to disconnect the associated 10-line group from finder action, when a call is made from a line therein at a time when at least one of the primary switches of the group is idle, but a busy condition in one or more of the secondary groups precludes the completion of the finder action. The timer RT associated with the relays 231 to 240 is arranged to unlock any operated one of these relays at frequent intervals (every ten seconds, for example) to permit a further test to be made. Relays 223 and 224 are common relays associated with cutoff relays 231 to 240 to bring about the operation thereof as above pointed out.

The units translator shown on the lower part of Fig. 3, comprising the relays 301 to 306, is operated over conductors 1 to 0 of the cable CA—UM through contacts of any one of the relays 201 to 210 to energize the conductors 1 to 6 in the cable CA—PM according to the required setting of the relays in any one of the four switching devices of any primary group, such as the switching devices 1PA to 1PD, Figs. 4 and 3, of the first primary group. Relays 301 to 305 serve also to prevent double marking in the event that two lines of the same 10-line group are calling simultaneously.

Although the system arrangement herein disclosed is not limited to any particular form of small-capacity switching device, it has been chosen to illustrate the invention as applied to a system using all-relay small-capacity switching devices at the primary, secondary, and distributor stages.

The switching devices 1PA and 1PD of Fig. 13 are each shown in full in Fig. 4, but switching devices 1PC and 1PD of Fig. 13 are each indicated in Fig. 3 as a broken-line rectangle, for each of these devices may be similar to the devices 1PA and 1PB.

The switching device 1PA, for example, includes the five selecting relays 411 to 415, each of which has two sets of selective-position contacts thereon. The contact sets in the upper row (three contact pairs to a set) are assigned respectively to the first to fifth lines of the associated 10-line group, while the five contact sets shown just below the ones last named are assigned, respectively, to the sixth to tenth lines in the associated 10-line group. The switching device 1PA includes also a sixth or switching relay 416, which remains normal when connection is to be made, through the concerned one of the relays 411 to 415, with one of the first five lines in the group, but is operated, along with one of the relays 411 to 415, when connection is to be made with any one of the sixth to tenth lines in the associated 10-line group. The other small-capacity switching devices are similar.

In addition to the relays 411 to 416 which cooperate as previously pointed out to select any desired one of the illustrated ten contact sets, the switching device 1PA has associated therewith a connection relay 410 which, among other things, when operated, connects up the conductors 1 to 6 of the cable CA—PM to permit setting of the relays 411 to 416 according to the marking placed on the conductors of this cable by the units translator of Fig. 3. The hold relay 417 is associated with the switching device to exercise certain control functions to be hereinafter described.

Also shown in Fig. 3 is a broken-line rectangle indicative of the primary groups 2 to 10. It is to be observed that the primary marking cable CA—PM extends dotted through this broken-line rectangle, which is intended to indicate that this cable multiples into the switching device of each of the primary groups 2 to 10 as indicated in connection with the primary switching devices 1PA to 1PD of Figs. 4 and 3.

Of the ten subscriber lines served by the primary switching devices 1PA to 1PD of Figs. 4 and 3, only the first and sixth lines (#911 and #916) are shown. The tip, ring, and sleeve conductors T, R, and S of each of these lines are multipled to the corresponding selective-position contacts of the associated primary devices 1PA to 1PD. The illustrated first and sixth lines are served by relay 411 of device 1PA; the second relay 412 serves the second and seventh lines; the third relay 413 serves the third and eighth lines; the fourth relay 414 serves the fourth and ninth lines; and the fifth relay 415 serves the fifth and tenth lines of the associated 10-line group.

Line #911 is the line of substation A, while line #916 is the line of substation B. Line and cutoff relays 401 and 402 are individual to line #911, while line and cutoff relays 403 and 404 are individual to line #916.

Figures 4A, 4B:
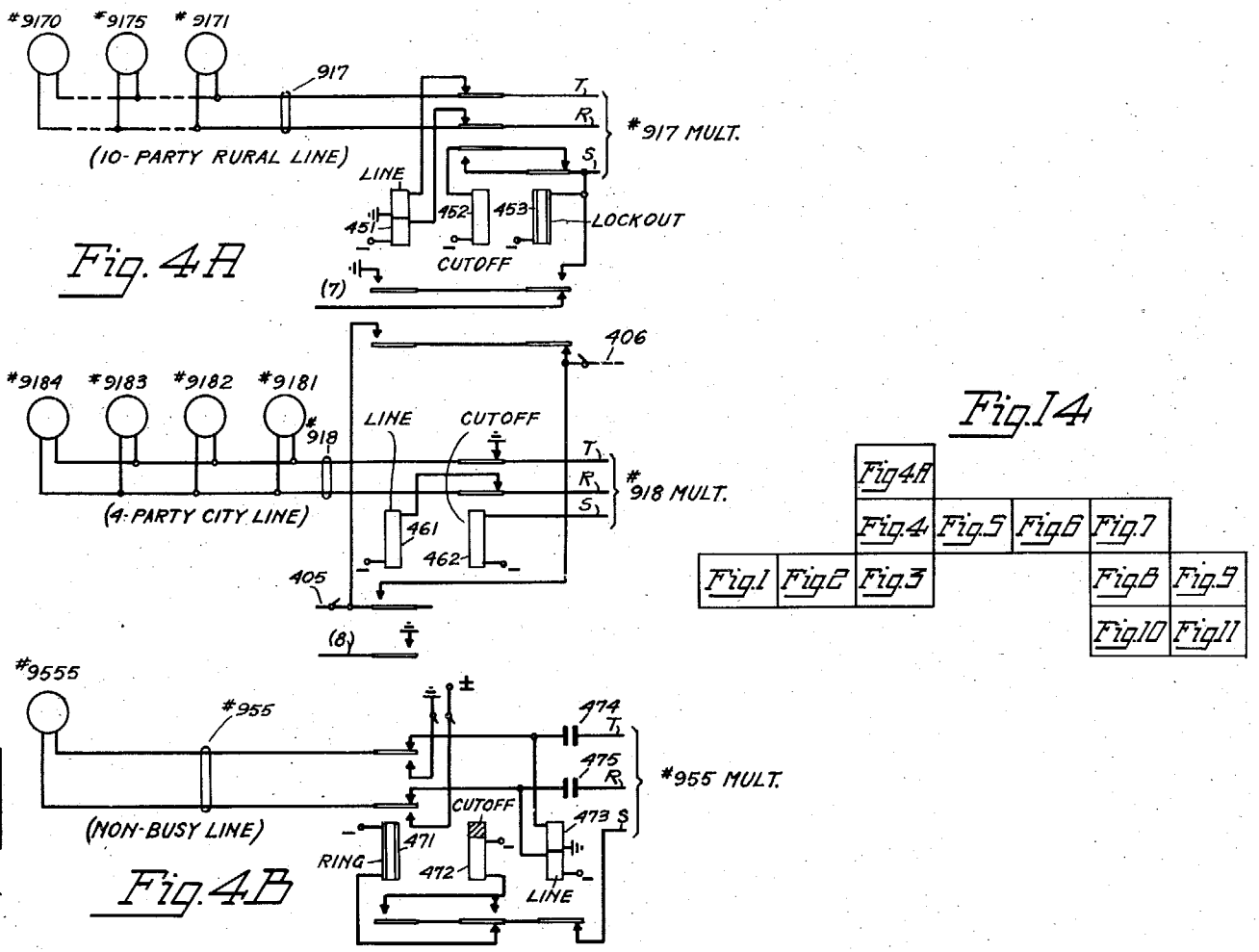

Whereas, the lines #911 and #916 are individual (or single-party) lines, Fig. 4A shows lines #917 and #918 which are party lines. Line #917 is illustrated as a ten-party line having substations #9171 to #9170 thereon, of which only substation #9171, #9175, and #9170 are shown. The line #918 is shown as a four-party line, having substations #9181 to #9184 thereon.

The line equipment of line #918 comprises line and cut-off relays 461 and 462, as in the case of the individual lines. The line equipment of line #917, in addition to line and cutoff relays 451 and 452, includes lockout relay 453. This lockout relay is arranged to enable the exchange switching equipment to be entirely disconnected from the line while a reverting-call conversation is being carried on over the line, which conversations are likely to be quite frequent because of the large number (10) of substations connected to line #917. As will be pointed out hereinafter, the common control equipment is arranged to distinguish between a party line with a lockout relay and a party line without a lockout relay, and to disconnect the switching equipment from a party line over which a reverting call has been made, only in the event that such party line is equipped with a lockout relay.

Figure 5:
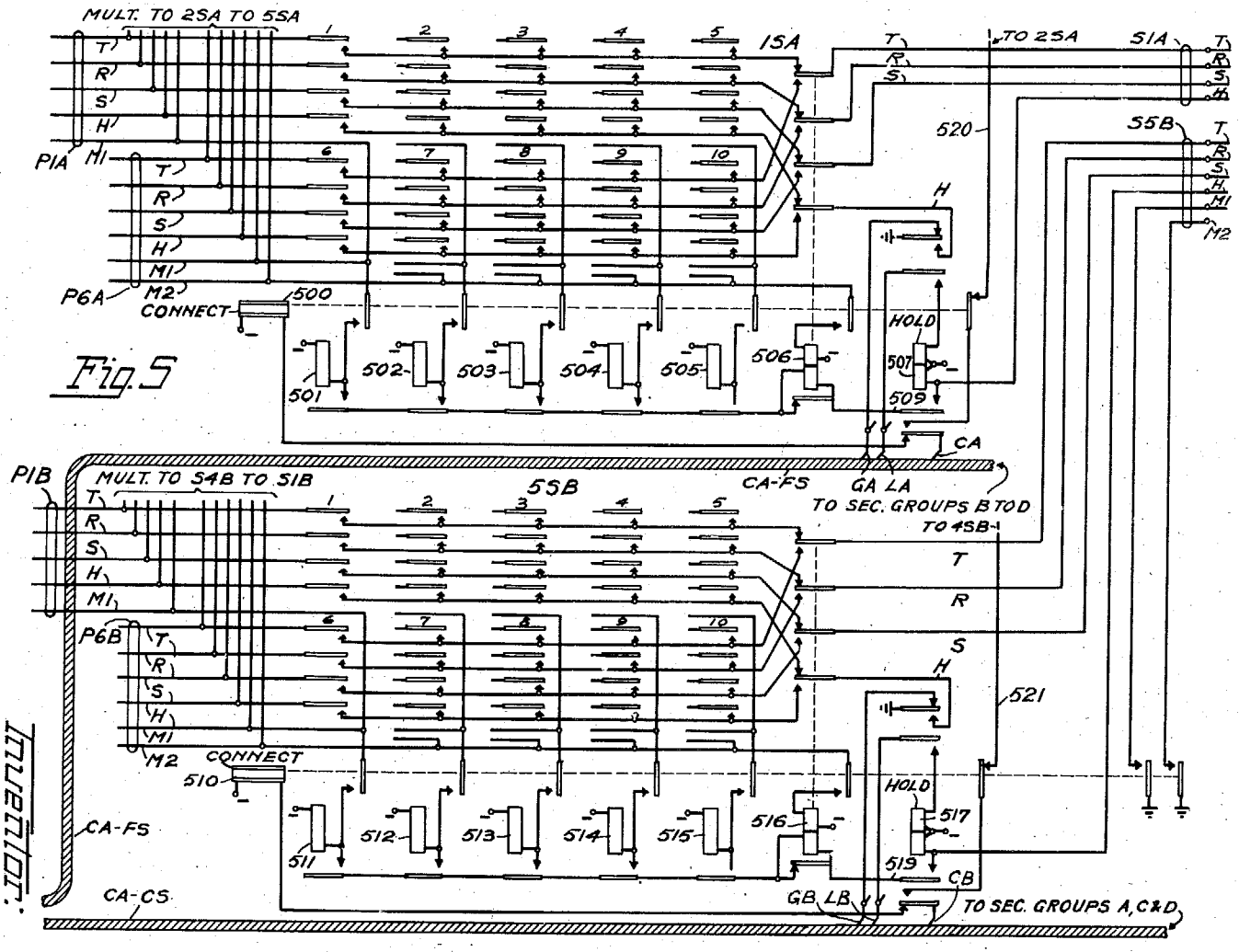

Fig. 5 shows the secondary switching devices 1SA and 5SB of Fig. 13, each of which differs from one of the primary switching devices (such as 1PA, Fig. 4) in that there are four contact pairs to a set (tip, ring, sleeve, and hold).

Figure 6:
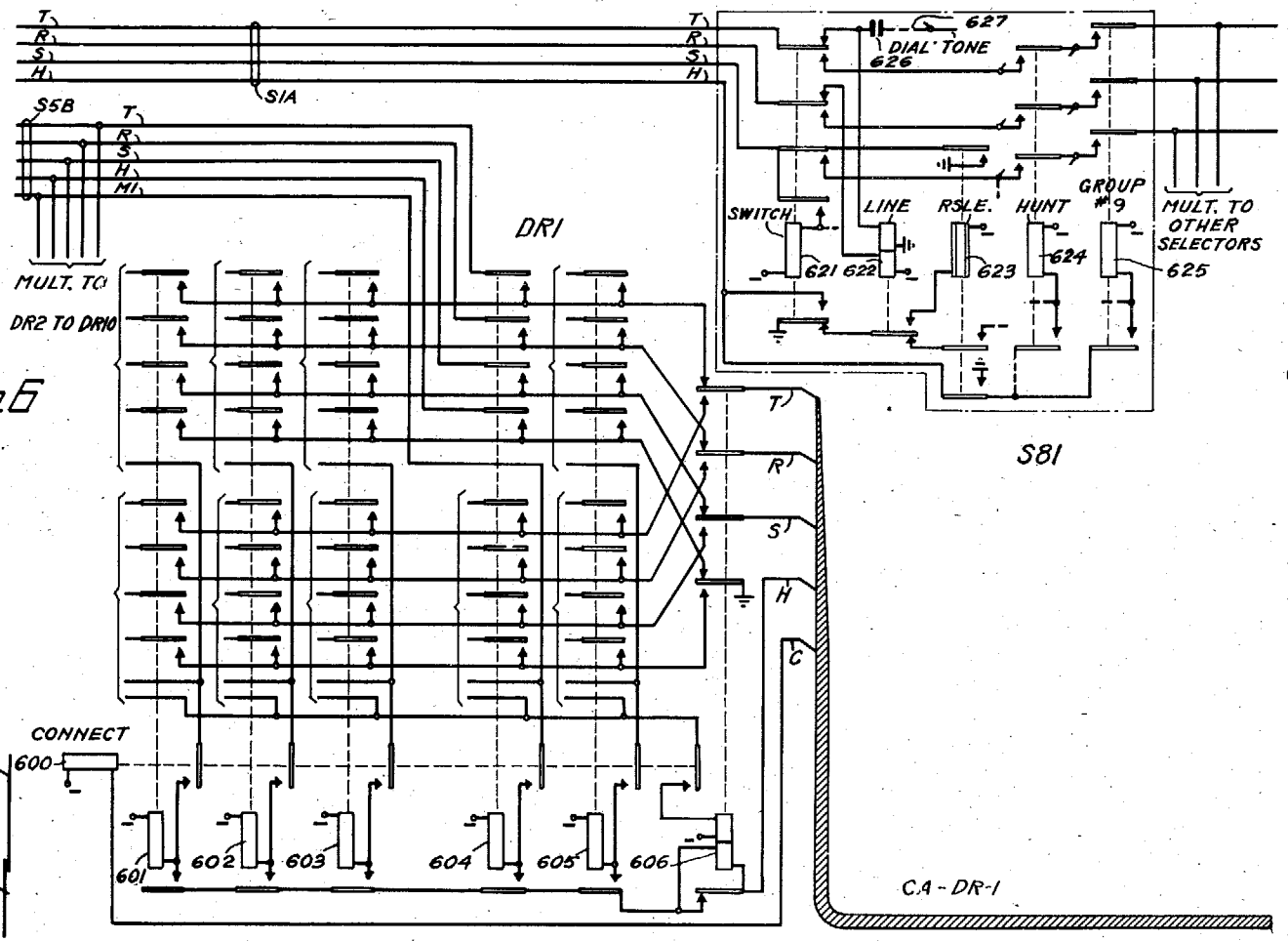

Fig. 6 shows the distributor DR—1 of Fig. 13, as well as the selector S1. This selector is assumed to be of the so-called all-relay type shown in applicant's Patent No. 2,279,531, issued April 14, 1942, hereinbefore referred to. Of the relays of this selector, only the switching, line, and release relays 621 to 623, one of the hunting relays 624, and the group #9 relay 625 are shown. The other circuit apparatus and conductors of the selector are omitted, as the details of the selector form no part of this invention.

Figure 7:
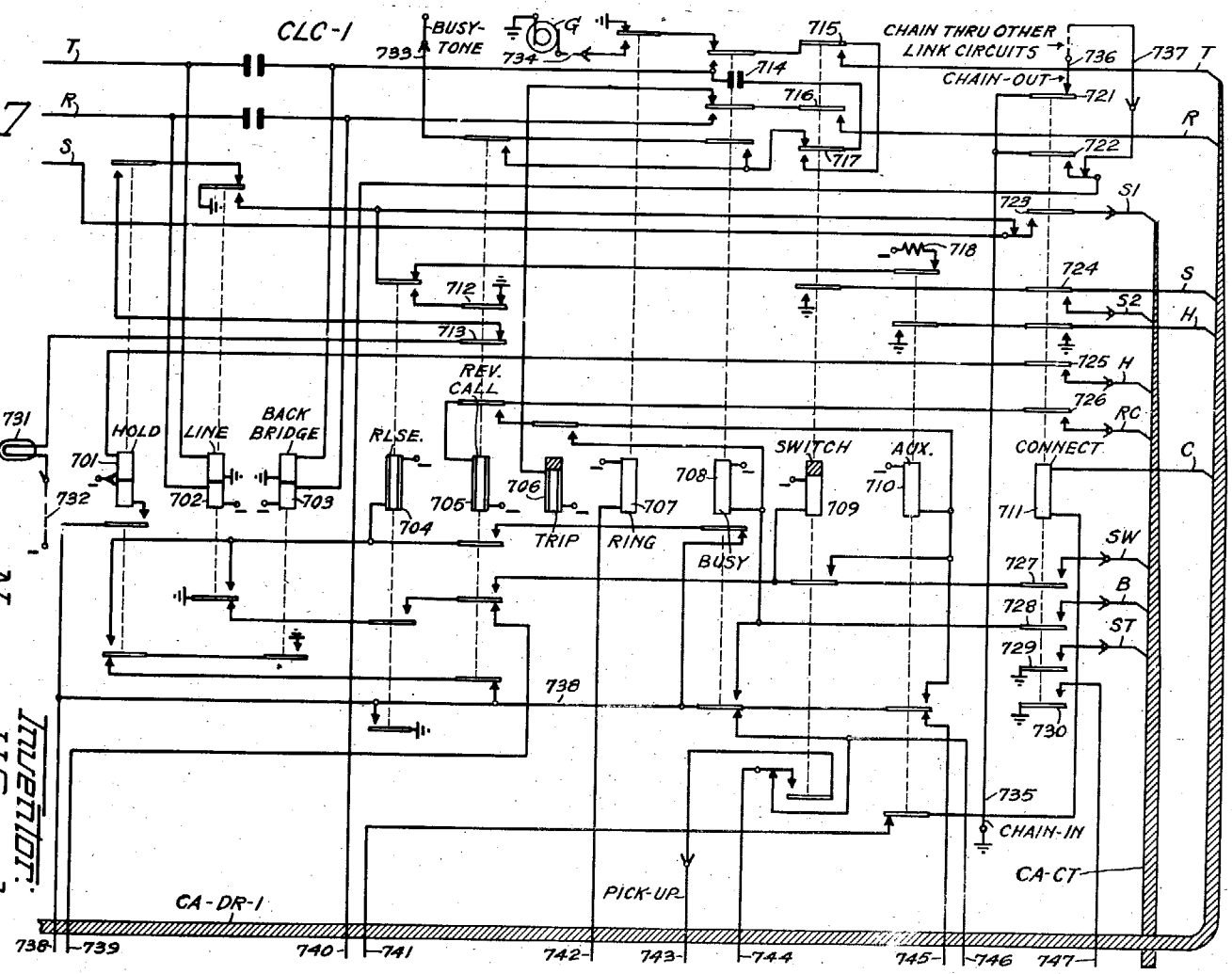
Figure 8:
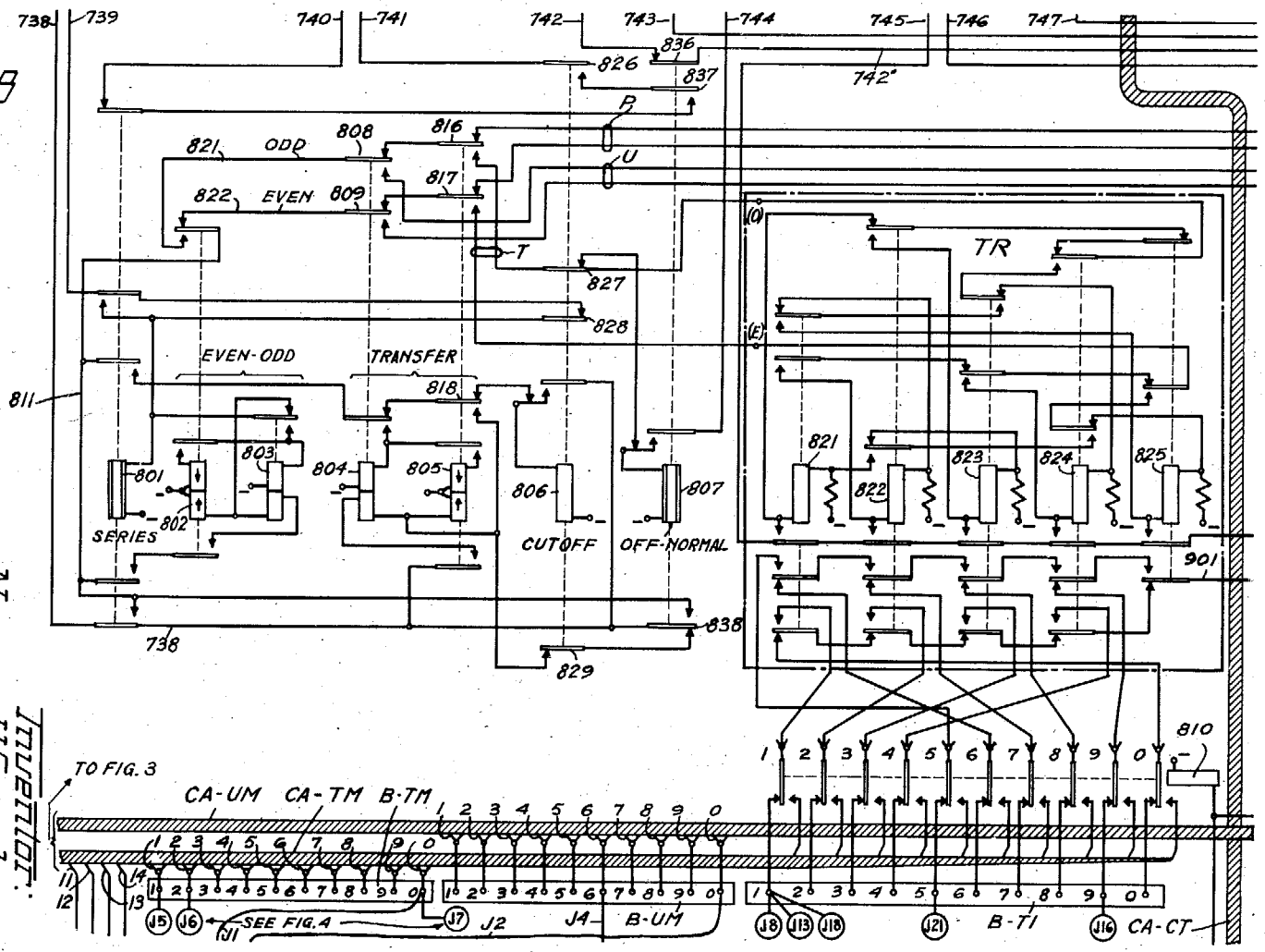
Figure 9:
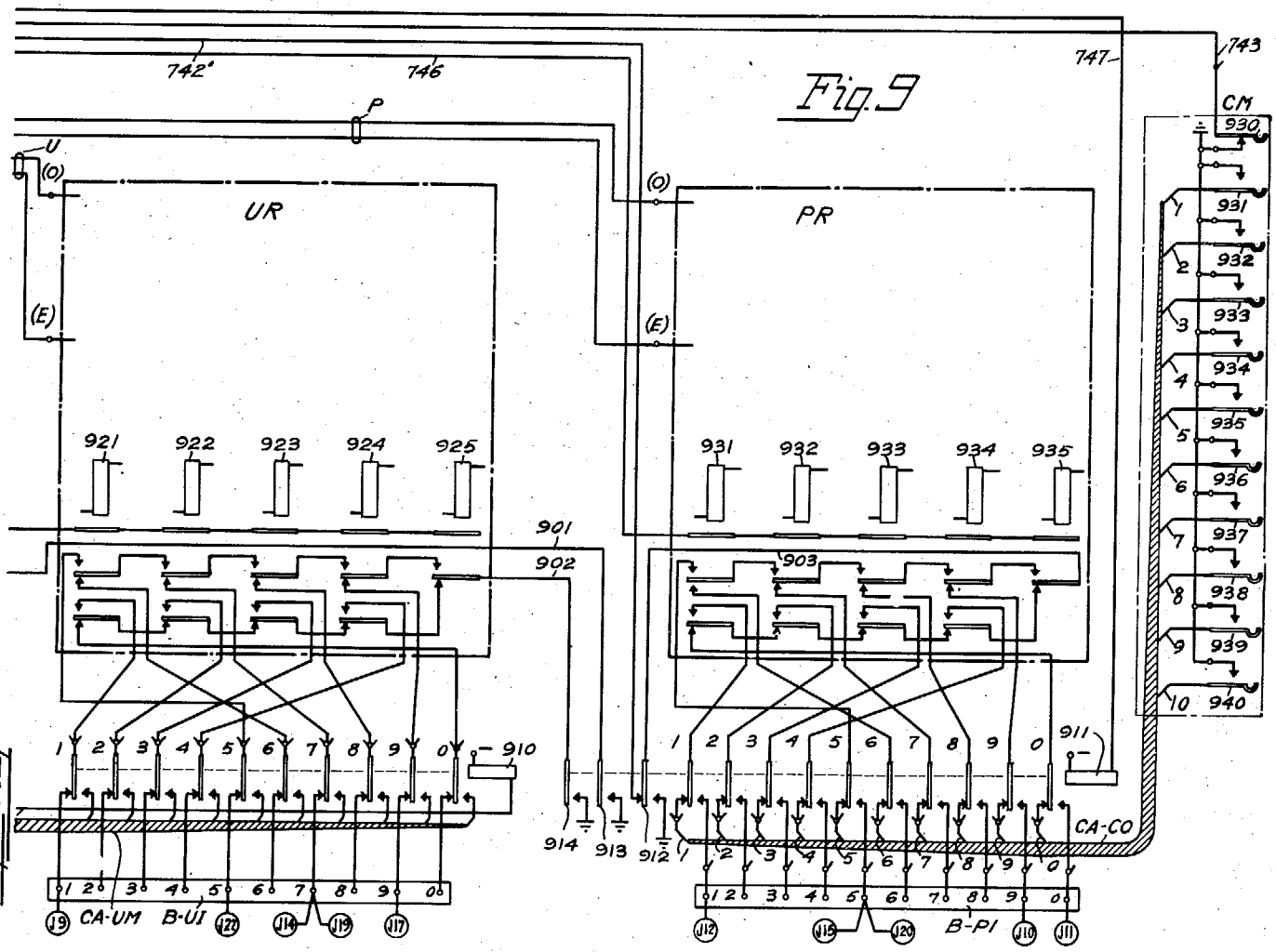

The connecting-link circuit CLC—1 of Fig. 13 is shown in Figs. 7, 8, and 9. This connecting-link circuit is accessible to the selectors over the tip, ring, and sleeve conductors T, R, and S extending to Fig. 7 from Fig. 6, and it is interconnected through cable CA—DR—1 to the distributor DR—1, Fig. 6.

The connecting-link circuit CLC—1 includes the illustrated control relays 701 to 711 of Fig. 7; the control relays 801 to 807 of Fig. 8; the tens, units, and party registers TR, UR, and PR of Figs. 8 and 9; and control relay 911 of Fig. 9.

Figure 10:
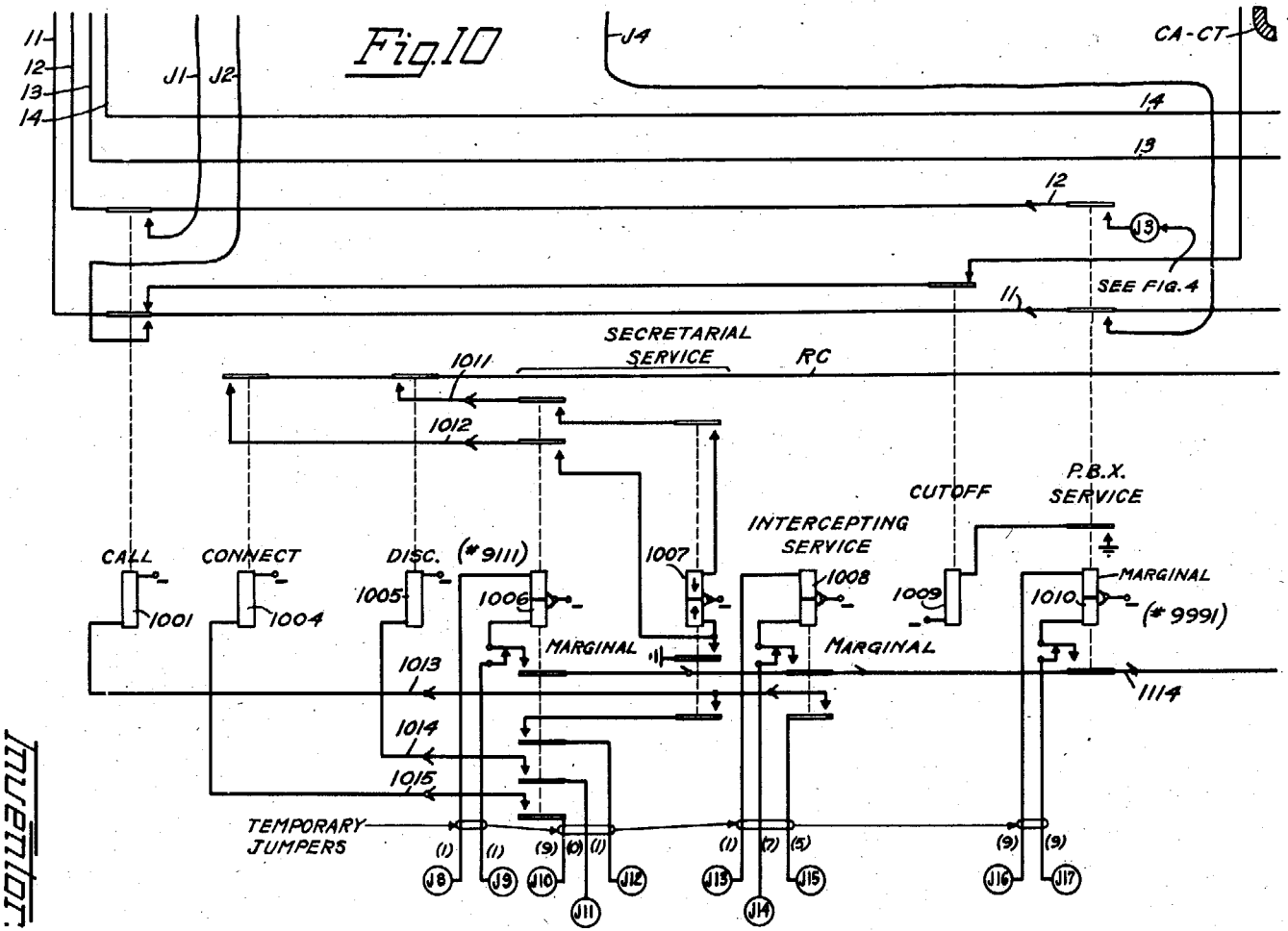
Figure 11:
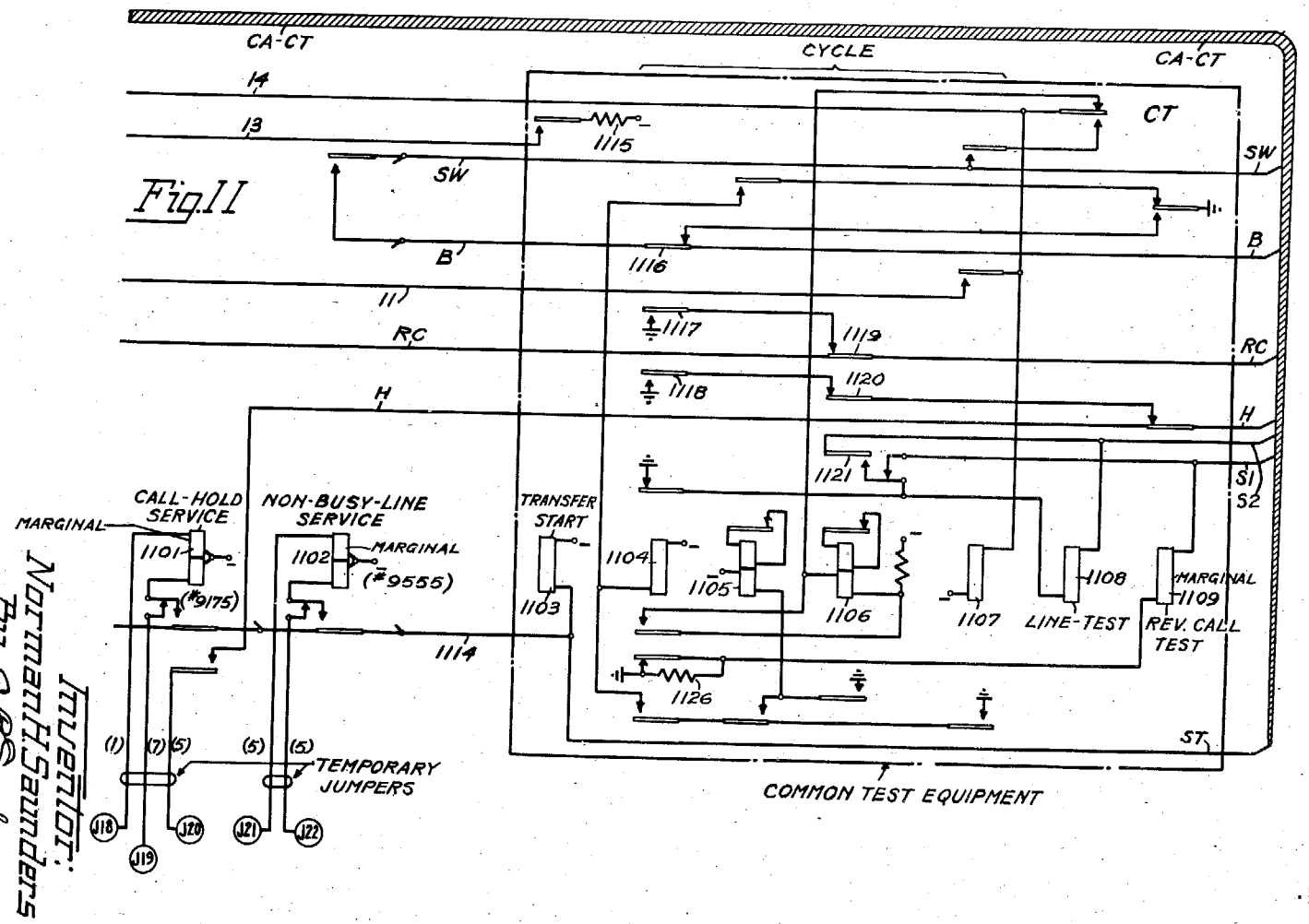

Along the lower portion of Figs. 8 and 9, and in Figs. 10 and 11, there is shown common equipment which is a portion of and supplemental to the common equipment of Figs. 1 to 3. The two portions of the common equipment are interconnected by the tens and units marking cables CA—TM and CA—UM.

The portion of the common equipment shown in Figs. 8 and 9 includes the marking terminal blocks B—TM and B—UM; control relays 810 and 910; and the tens-, units-, and party-identifying terminal blocks B—TI, B—UI, and B—PI. Temporary jumpers may be attached to the above-mentioned blocks for marking and identifying purposes.

The portion of the common equipment shown in Figs. 10 and 11 includes control relays 1001 to 1010, 1101 and 1102, and the common-test equipment CT. The common-test equipment CT includes control relays 1103 to 1109. The common test equipment CT is connected by cable CA—CT to all of the connecting-link circuits, such as CLC—1, of the same hundreds group.

Detailed Description.

The disclosure having been described generally, a detailed description of the operation of the disclosed embodiment of the invention will now be given.

*A call from substation A to substation B*

A description will first be given of the operations involved when the subscriber at substation A calls the subscriber at substation B.

It is to be observed that the number of the line of substation A is 911, and that the number of the line of substation B is 916, the lines being both lines of the same large (100-line) group, and both of the same small (10-line) group. From the description which is to follow, it will be understood how any line of the system can call any other line thereof.

In order to cause a connection to be completed from the calling line 911 to the called line 916, the subscriber at substation A removes his receiver; waits for dial tone, which he hears when connection has been extended to a selector; and then dials the hundreds, tens, and units digits—9, 1, and 6—in the desired number, followed by the final digit 1 to cause ringing current to be applied to the called line.

*Marking the calling 10-line group and the calling line therein*

When the receiver (not shown) is removed at substation A, line relay 401 energizes over the calling line. Assuming that at least one of the primary switching devices 1PA to 1PD (Figs. 4 and 3) having access to the 10-line group in which the calling line is located is idle, the closure of the inner contacts of line relay 401 places a starting battery potential on conductor ST of the #1 tens-groups cable CA—G1 over the following circuit path: from battery, by way of the resistor 409, conductor 408, contacts of any unoperated one of the hold relays (such as 417 and 427) of the associated primary group, conductor 407, conductor 406, common to all relays of the first 10-line group, inner contacts of the operated line relay 401, to conductor 405.

At its lower contacts, line relay 401 places a marking ground potential on conductor 1 in cable CA—G1. The tens and units designation of the calling line is thus marked in cable CA—G1.

Assuming that the operation of line relay 401 occurs at an instant when all of the tens relays 211 to 220 (and consequently relays 201 to 210) are in a restored condition, the previously described placing of a tens-marking battery potential on conductor ST of cable CA—G1 results in the closure of an energizing circuit for group relays 201 and 211 in series, as follows: from battery potential on conductor ST of cable CA—G1, through the armature and back contact of group-cutoff relay 231, winding of group relay 201, the lower winding of group relay 211, normally closed contacts controlled by the lower armature of relay 211, common conductor 229, the inner lower contacts of all of the group relays 220 to 211 in series, and thence to ground through contacts of clearout and transfer-control relays 222 and 221. Group relays 201 and 211 operate over this circuit.

*Operating the units translator UT*

Upon operating, relay 201 connects the mark conductors 1 to 0 of the group-1 cable CA—G1 respectively with the conductors of units-mark cable CA—UM. The ground potential placed on the individual marking conductor 1 in the group-1 cable CA—G1 by the lower contacts of line relay 401 is thereby extended, through the uppermost contacts of relay 201, to conductor 1 of the units-marking cable CA—UM, closing a circuit through the outermost contacts of relay 306, upper winding of relay 301, inner upper contacts of relays 302 to 305, and thence to battery through the associated resistor. Relay 301 operates over this circuit. At its upper armature, it places a marking ground potential on conductor 1 of the primary marking cable CA—PM, while at its lower armature it connects conductor 6 in cable CA—UM to the marking relay 306, but relay 306 is not operated at this time, since the conductor 6 in cable CA—UM is grounded only when the sixth line in a tens group is calling or is being called, in which case relays 301 and 306 are both operated to ground both the first and the sixth conductors in cable CA—PM.

At this point it should be noted that the relays 301 to 306 are so connected that the marking of only a single line can be impressed upon the conductors of cable CA—PM, even though two or more lines in the same 10-line group are calling simultaneously. For example, when relay 306 operates, which it does when any one of the sixth to tenth lines in a 10-line group is calling or is being called, it disconnects the conductors 1 to 5 of the cable CA—UM, associated respectively with the first to fifth lines of a group, whereby only the sixth to tenth conductors in cable CA—UM are effective to operate the relays 301 to 305 under that condition. The battery-chain contacts carried by relays 302 to 305 insure that no two of these relays can be operated at the same time. As an additional safeguard, the ground potential through which conductors 2 to 5 of the cable CA—PM can be marked is carried through chain contacts of relays 301 to 304.

The ground potential applied to conductor 1 of cable CA—PM is effective to position whichever one of the primary switching devices 1PA to 1PD becomes connected up to extend the calling line.

*Selecting the primary switching devices in the calling 10-line group*

Upon operating over its previously traced circuit, relay 211, at its lower armature, locks the lower terminal of its lower winding to ground through contacts of relays 222 and 221, at the same time disconnecting its lower winding from the common conductor 229. At its inner armature, relay 211 disconnects ground potential from conductor 229 to thereby prevent operation of any further group relays over a circuit such as that above traced. The removal of ground potential from conductor 229 also prevents operation of transfer-control relay 221 until the current finder action has been completed.

Relay 211 also connects the conductors A to D of the primary-control cable CA—PC respectively to the conductors A to D of the first-group primary-control cable CA—PC1, thereby selecting the group of primary switching devices (1PA to 1PD) having access to the 10-line group containing the calling line.

*Matching an idle primary device with an idle finder-action secondary group*

An idle primary switching device in the calling primary group is now to be matched with one of the secondary groups having an idle finder-action secondary device therein, responsive to the described connecting up of the conductors of the cable CA—PC1. It may be assumed that the relays 107 to 110 of the preference group PG are all in their illustrated restored condition at this time, in which event secondary group A has the preference, for ground potential is extended (through contacts of relays 110 and 108) directly to the inner armature of the A relay 103 of the matching-control group MC.

Let it be assumed now that all four of the primary switching devices 1PA to 1PD, Figs. 4 and 3, of the selected primary group are idle at this time. In this event, all four of the concerned hold relays, such as 417 and 427, are restored, and battery potential is applied through all four of the connecting relays, such as 410 and 420, to all four of the conductors A to D of the associated primary-control cable CA—PC1. Battery potential is thus extended, through contacts of the operated group relays 211, and over the four conductors of cable CA—PC to the junction of the windings of the respective relays 103 to 106 of the matching control group MC. Let it be assumed further that there is at least one idle finder-action secondary in each of the four secondary groups. In this event, there is ground potential on the upper terminal of the upper winding of each of the relays 101 to 106, as will now be pointed out.

It is to be observed that the finder-action-secondary cable CA—FS leads from equipment illustrated in Fig. 1 to the four secondary groups, carrying 12 conductors, including group conductors GA to GD, associated respectively with the finder-action secondary devices in secondary groups A to D. As shown in Fig. 5, conductor GA in cable CA—FS, is common to the finder-action secondaries in secondary group A, and is supplied with ground potential through contacts of the hold relay 507, as long as the secondary device 1SA is idle, and is similarly supplied with ground potential at each other idle finder-action secondary device in group A. Similarly, conductors GB to GD in cable CA—FS extend to the finder-action secondary devices in secondary groups B to D, respectively. By this arrangement, under the present assumed conditions, each of the conductors GA to GD of cable CA—FS is grounded, whereby ground potential, through contacts of the unoperated relays 101 and 102, is applied to the upper terminal of each of the relays 103 to 106 of the matching control group MC, and all four of these relays operate, each in series with the connecting relay (such as 410 and 420) of the corresponding primary device 1PA to 1PD. None of the said connecting relays, however, can operate at this instant because of the indicated high resistance of the upper windings of relays 103 to 106.

With preference ground potential applied, as described, only to the armature of the A relay 103, only relay 103, can lock itself operated, through its low-resistance lower winding. Each of the relays 103 to 106 closes an operating circuit for test-cutoff relay 102, whereupon relay 102 open-circuits the upper winding of each relay 103 to 106, whereupon relays 104 to 106 immediately restore. Relay 103, however, remains operated, and relay 410 operates, in the following locking circuit: from ground, through contacts of the unoperated relays 110 and 108, lower armature and front contact of relay 103, the low-resistance lower winding of relay 103, conductor A of cable CA—PC, contacts of relay 211, conductor A of cable CA—PC1, contacts of the unoperated hold relay 417, and the winding of connecting relay 410, to battery.

*Finding the calling line*

The primary switching device 1PA is selected by the operation of connecting relay 410 over its above-traced circuit, in series with the low-resistance lower winding of the locked matching-control relay 103. Relay 410 connects the conductors 1 to 6 of the primary marking cable CA—PM respectively with the selective relays 411 to 416. Conductor 1 of cable CA—PM has been marked by ground potential applied thereto as previously described at the units translator UT, Fig. 3, conductors 2 to 6 of this cable being unmarked. As a result, relay 411 operates, but relays 412 to 416 remain unoperated.

Upon operating, relay 411 connects up the tip, ring, and sleeve conductors T, R, and S of the #1 and #6 lines in the associated 10-line group, but the connecting up of the #6 line is ineffective at this time because switching relay 416 remains unoperated, and only the #1 line of the group (the calling line #911) is effectively connected up. The tip, ring, and sleeve conductors of the calling line #911 are thereby extended, through the uppermost set of contact pairs of relay 411, and thence through contacts of the unoperated switching relay 416, to the tip, ring, and sleeve conductors of the primary link P1A, extending to the secondary multiple in the A secondary group.

*Marking the actuated primary switching device*

The actuated primary switching device 1PA is marked in the A secondary multiple to enable the finder-action secondary switching device in the A group which is to operate to make connection with the actuated primary device 1PA. This marking is accomplished only during the time connecting relay 410 is operated, being accomplished as follows:

Connecting relay 410 applies ground potential to the marking conductor M2 (not used on any of the primary switching devices accessible through selective positions 1 to 5 of a secondary switch), and it applies a marking ground potential through contacts of hold relay 417, to the marking conductor M1, illustrated as included in the primary link P1A, extending to the secondary multiple of the A-secondary group.

*Selecting a finder-action secondary device in the matched A group*

As a further result of its above-described operation, matching-control relay 103 connects up conductor CA of the cable CA—FS, to prepare for the selection of a finder-action device in the A secondary group.

At its lower armature, test-cutoff relay 102 closes a circuit, through contacts of relay 110, for the upper winding of relay 109 of the preference group PG, whereupon relay 109 operates and applies ground potential to conductor 111. With relays 104 to 106 restored, and relay 103 locked operated, the grounding of conductor 111 closes a circuit as follows: from ground, through the lower contacts of relay 110, contacts of the operated relay 109, conductor 111, contacts of the operated matching-control relay 103, contacts of the unoperated transfer relay 101, conductor CA of cable CA—FS, lower contacts of the unoperated hold relay 507 of secondary switch 1SA (assuming device 1SA to be idle), and thence to battery, through the winding of connecting relay 500. Relay 500 thereupon operates to select device 1SA for operation.

*Finding the calling primary device 1PA*

When relay 500 operates, it connects up the associated selective relays 501 to 506, whereupon relay 501 operates over conductor M1 of link P1A, marked as previously described through the outermost contacts of connecting relay 410. The tip, ring, sleeve, and hold conductors T, R, S, and H of the link P1A are thus extended through the uppermost contact set of relay 501, and thence through contacts of the unoperated switching relay 506, to the conductors T, R, S, and H on the outgoing side of the switching device 1SA.

*Preparing the selector S81 for operation*

The said tip, ring, and sleeve conductors further extend, by way of secondary link S1A, to the selector S81, a portion of whose circuits are shown in Fig. 6. The tip, ring, and sleeve conductors of the calling line #911 are thus extended (through devices 1PA and 1SA) to the selector S81. The lower winding of line relay 622 is now energized over the calling line, in parallel with the winding of line relay 401. Line relay 622 thereupon operates, causing release relay 623 to operate to prepare the selector for operation. Release relay 623 places ground potential on the sleeve conductor S of link S1A, and it places ground potential on the hold conductor H of the said link S1A. The placing of ground potential on the hold conductor H of link S1A operates hold relay 507 to close a locking circuit at its inner lower armature for the operated selective relay 501. At its uppermost armature, relay 507 disconnects ground potential at one point from the group conductor GA and places it upon the associated hold conductor H, thereby closing a circuit, through contacts of the unoperated relay 506, and through contacts of the operated relay 501, over conductor H in the link P1A, for the hold relay 417 of the primary device 1PA. Relay 417 thereupon operates and closes a locking circuit at its inner lower contacts for the operated selective relay 411. The operated switching devices 1SA and 1PA are thus locked in operated condition subject to the continued grounded condition of the hold lead H of the secondary link S1A, extending to the selector S81, Fig. 8.

*Seizing the calling line*

As a result of the placing of ground potential on the sleeve conductor S of the link S1A by release relay 623, ground potential is extended over the sleeve conductor S of the connection established through the devices 1SA and 1PA, to cutoff relay 402 of the calling line. The sleeve conductor S of the calling line is thus marked busy in the line multiple between the selective-position contacts of the primary devices 1PA to 1PD. Cutoff relay 402 operates to disconnect ground potential from the tip talking conductor T of the calling line and to disconnect the winding of line relay 401 from the ring talking conductor R of the calling line, following which the further flow of current over the conductors of the calling line is from the battery and ground connections thereto, through the windings of the double-wound line relay 802 of the selector S81, Fig. 8.

A dial-tone signal is now impressed on the calling line from the common dial-tone lead 627 and through the condenser 626 to inform the calling subscriber at substation A that he may now dial the digits (9, 1, 6, and 1) in the desired number.

*Clearing out the common equipment*

Referring again to the previously described operation of hold relay 507 of device 1SA, Fig. 5, the lower armature of relay 507 disconnects conductor CA of cable CA—FS from the winding of connecting relay 500 and prepares to extend this conductor to conductor 520, leading to the next A group finder-action secondary 2SA. Relay 500, however, is slightly slow-acting as indicated, to give time for conductor CA to become ungrounded in the matching-control group MC, Fig. 1, before the extension is made, whereby the operation of any further secondary device at this time is prevented. Relay 507 also disconnects ground potential at one point from the group ground conductor GA of the cable CA—FS, leaving this conductor grounded through contacts of the unoperated hold relays of either idle one of the group-A finder-action secondary devices 2SA and 3SA, Fig. 13.

Referring again to the previously described operation of hold relay 417 of primary device 1PA, relay 417 disconnects the winding of connecting relay 410. Being slow-restoring, as indicated, relay 410 remains operated for a slight interval before it restores. At its middle lower armature, relay 417 disconnects ground from marking conductor M1 of the link P1A, thereby terminating the marked condition of the primary device 1PA and opening the initial circuit of the now-locked selective relay 501 of the device 1SA.

Relay 417 also applies ground potential to conductor 15 of cable CA—TM to operate clearout relay 222 to clear out the common equipment. In the event that no other line of the same 10-line group has initiated a call since the receiver was removed at the calling substation A, the clearing-out operation is also initiated by the restoration of line relay 401, which occurs responsive to the previously described operation of cut-off relay 402. In this event, the inner contacts of line relay 401 remove battery potential from conductor 405, common to all the lines of the first 10-line group, thereby open circuiting and restoring group relays 201 and 211. Without any further precaution, the restoration of group relay 211 would allow the pair of group relays associated with any other 10-line group to operate immediately, to start a succeeding line-finding action before the common equipment has had time to clear out completely. On the other hand, in the event that another line has called in the same 10-line group with the line of substation A (the first 10-line group), battery potential is maintained applied to conductor 405 by the contacts of the line relay of such other calling line, thus tending to hold relays 201 and 211 operated after line relay 401 has restored, as above pointed out. In either event, clearout relay 222 operates as previously described, through contacts of the operated relays 410 and 417 of the device 1PA, and over conductor 15. Upon operating, relay 222 disconnects ground potential at its lower contacts from the contact chain, thereby unlocking and restoring group relay 211, and restoring group relay 201, whether conductor 405 remains supplied with battery potential or not. As long as relay 222 remains operated, ground potential cannot be replaced on the common operating conductor 229 through the chain circuit controlled by the inner lower armatures of relays 211 to 220, and no further operations of the group relays can therefore occur for the time being.

At its upper armature, relay 222 closes a holding circuit for test-cutoff relay 102 to maintain it operated after relay 103 restores, as it does, responsive to the separation of the upper contacts of hold relay 417.

Group relay 201, on restoring, disconnects the marking conductors of cable CA—G1 from the units-marking cable CA—UM, whereupon any operated ones of the relays 301 to 305 clear out. The previously marked conductor 1 of cable CA—PM is thus unmarked, opening the initial circuit of the now-locked selective relay 411 of the device 1PA. Group relay 211 disconnects the conductors of cable CA—PC1 from the conductors of cable CA—PC.

When relay 103 restores, it disconnects ground potential from conductor CA of the cable CA—FS, at the same time opening the initial circuit of test-cutoff relay 102, but relay 102 remains operated temporarily over conductor 225 and the upper contacts of clearout relay 222.

In the operated secondary device 1SA, the slow-restoring connecting relay 500 restores a short interval after the described operation of hold relay 507, completing the transfer of conductor CA of the cable CA—FS through the outermost contacts of relay 500 to conductor 520, extending to the succeeding finder-action secondary device 2SA, but this occurs after the said conductor CA of cable CA—FS has become ungrounded by the described restoration of relay 103.

In the operated primary device 1PA, the slow-restoring connecting relay 410 restores a slight interval after the described operation of hold relay 417. When it does so, it removes ground potential from conductor 15 of the cable CA—TM, thereby opening the circuit of clearout relay 222. Relay 222 thereupon finally restores and, at its lower armature, it reapplies ground potential through the chain to conductor 229 to thereby permit any required further operation of group relays 211 to 220, and consequently of group relays 201 to 210.

*Transferring the operating preference*

On restoring, relay 222 also opens the holding circuit of test-cutoff relay 102, permitting that relay to restore also. Upon restoring, relay 102 opens the initial circuit of the upper winding of relay 109 of the preference group PG. When this occurs, relay 109 remains operated in its locking circuit (closed at its upper contacts through the upper winding of relay 110) and the upper winding of relay 110 is energized in this locking circuit, having been short-circuited up to this moment. Relay 110 is operated by the energization of its upper winding to transfer the incoming control conductor from the upper winding of relay 109 to the lower winding of relay 110. Relay 110 also prepares a circuit for the upper winding of relay 107, but this circuit is maintained open at the middle lower contacts of the operated relay 109 for the time being. Relay 110, at its lower armature, with relay 109 in operated condition, removes ground potential from conductor 111 so as to maintain this conductor ungrounded until the next matching operation of relays 103 to 106 has been completed. Relay 110 also disconnects ground potential from the inner armature of the A matching-control relay 103 and transfers it, through contacts of the unoperated relay 108, to the inner armature of the B matching-control relay 104, whereby the operating preference has been transferred from secondary group A to secondary group B.

The common equipment used in the described extension of the connection by finder action from the line of the calling substation A through the primary and secondary devices 1PA and 1SA of Figs. 4 and 5, to the selector S81 of Fig. 6, has now been cleared out as described, and is in readiness for further operation, the operating preference having been transferred from the A secondary group to the B secondary group.

*Dialing the hundreds digit 9*

When the subscriber at the calling substation A, Fig. 4, having heard the dial-tone signal transmitted to substation A from the selector S81, Fig. 6, dials the hundreds digit 9 in the desired number, line relay 622 of the selector S81 is thereby restored 9 times momentarily. Each time it restores, it momentarily opens the circuit of the associated relase relay 623, but relay 623, being a slow-releasing relay as indicated, remains operated. As a further result of the series of momentary restorations of relay 622, nine momentary impulses are delivered, through contacts of relay 623, to the counting circuit (not shown), with the result that the group-9 connecting relay 625 becomes operated to connect up the group of links leading to the connecting-link circuits of the ninth hundreds group, of which the connecting-link circuit CLC—1 of Figs. 7 to 9 is one.

The dialing operation is followed by a hunting operation of hunting relays such as 624, to hunt over the links of the connected group until an idle one is found. It may be assumed that the link extending to the connecting-link circuit CLC—1 is the first one found to be idle, with the result that the hunting operation terminates with relay 624 in operated condition. It may be pointed out that the selector S81 is preferably a so-called battery-searching selector; that is, one which must find an idle-indicating battery potential on the test conductor of the link in order that connection will be made thereto, such a selector continuing the hunting operation until such potential is found. The idle-indicating battery potential is normally present on the sleeve conductor S of the link extending to the connecting-link circuit CLC—1 of Figs. 7 to 9, over a circuit path including the resistor 718, and contacts of relays 710, 704, and 711.

It will be observed that relays 625 and 624, upon operating, lock to the hold conductor H of the link S1A, grounded at this time at the lower contacts of release relay 623.

When the hunting operation is terminated, by the finding of the idle link extending to the connecting-link circuit CLC—1, the operation of switching relay 621 occurs. Upon operating, relay 621 locks itself to the sleeve conductor S of the link S1A, now grounded at the upper contacts of relay 623. Relay 621 also disconnects ground potential from the armature of line relay 622 and transfers it to hold conductor H of the link S1A, so as to maintain this conductor grounded to hold relays 624 and 625 locked, as well as to hold the devices 1SA and 1PA operated after release relay 623 restores, as it shortly does. Relay 621 also extends the tip, ring, and sleeve conductors T, R, and S of the link S1A, through contacts of the operated relays 624 and 625 to the corresponding conductors of the link extending to the connecting-link circuit CLC—1. Line relay 622, being disconnected by the operation of switching relay 621, now restores, and slow-acting release relay 623 of the selector restores a moment later and removes ground potential from the sleeve lead S, but this does not occur until after ground potential has been applied thereto in the connecting-link circuit CLC—1, as will be described.

*Preparing the connecting-link circuit CLC—1 for operation*

In the connecting-link circuit CLC—1, line relay 702 responds to the described extending operation of the selector S81 of Fig. 6 by operating over the calling line. Upon so doing, it closes a circuit for the associated release relay 704. At its upper armature, relay 704 disconnects the idle-indicating resistor 718 and substitutes ground potential to maintain the selector S81 and the devices 1SA and 1PA in operated condition. At its inner lower armature, release relay 704 prepares a circuit for series relay 801 and for the even-odd relays 802 and 803, while at its lower armature it applies ground potential to the local conductor 738, thereby preparing certain operating and locking circuits to be described. An immediate result of the grounding of conductor 738 is the closing of a circuit, through armatures 838 and 829 for the lower winding of relay 805 of the transfer pair. Relay 805 thereupon operates and at armatures 816 and 817 disconnects the odd and even counting conductors 821 and 822 from conductors P of the party register PR and transfers them to the conductors T of the tens register TR. The connecting-link circuit CLC—1 is thereby prepared for operation.

*Dialing the tens digit 1*

When the tens digit is dialed (the digit 1 in the present assumed example), line relay 702 is restored momentarily a number of times corresponding to the value of the digit. In order to explain the operation of the tens register TR more fully, the description which is to follow immediately will be of the complete operation of the tens register TR, occurring only when the digit 0 is dialed, in which case line relay 702 is momentarily restored ten times, instead of only once.

Each time it restores, line relay 702 opens the circuit of release relay 704 but release relay 704 remains operated, being a slow-acting relay, as indicated. As a further result of each of the ten restorations of line relay 702 now being temporarily assumed, a circuit is closed, through the lower contacts of relay 702, contacts of the operated release relay 704, and contacts 828, for series relay 801. Relay 801 operates promptly upon receipt of the first momentary impulse. Being a slow-restoring relay, as indicated, series relay 801 remains operated throughout the series of impulses, because of which characteristic it has been termed a series relay. Upon operating, relay 801 shunts contacts 828 at its middle upper armature, and opens a point in the circuit of connecting relay 711 at its upper armature, but these operations are material only during the dialing of the party digit, which is to follow. At its lower armature, relay 801 connects the grounded local conductor 738 to conductor 811.

When the first impulse is delivered to series relay 801, a branch circuit extends, through the armature of relay 803 and its back contact, to the lower winding of relay 802. Relay 802 accordingly operates responsive to the first impulse and closes a locking circuit for its lower winding in series with the lower winding of relay 803. Relay 803 does not respond until the impulse is terminated, as its upper winding remains shunted as long as the impulse endures.

When the first impulse is terminated, the lower winding of relay 802 remains energized in a locking circuit including the lower winding of relay 803, the lower contacts of relay 802, the inner lower contacts of relay 801, and the now-grounded conductor 811. Relay 803 is operated in this locking circuit. It disconnects the associated impulse conductor from the lower winding of relay 602 and transfers it to the upper winding of relay 803.

When the second impulse is delivered, relay 803 is held operated in a locking circuit including its operated armature and front contact. At the same time, this second impulse is delivered, through the inner upper contacts of the operated relay 802, to the upper winding of relay 802. Relay 802 is a differential relay as indicated. As a result, the relay is now deenergized and restored by the reverse current flow in its upper winding. Upon restoring it opens the locking circuit for its lower winding and opens the deenergizing circuit of its upper winding. The circuit of the lower winding of relay 803 is thereby opened, but relay 803 remains operated for the duration of the second impulse by current flow in its upper winding. When the second impulse subsides, relay 803 restores.

From the foregoing description it will be seen that relay 802 operates responsive to the beginning of the first impulse and restores responsive to the beginning of the second impulse, its operation being controlled by relay 803, which operates at the end of the first impulse and restores at the end of the second impulse. Relays 802 and 803 are thus again in restored condition at the end of the second impulse. These two relays go through this same cycle of operations for each succeeding pair of impulses, relay 806 operating at the beginning of each odd-numbered impulse, and restoring at the end of each even-numbered impulse.

With series relay 801 operated, the ground potential on conductor 738 is extended, by way of conductor 811, to the upper armature of relay 802. Relay 802 accordingly applies ground potential alternately to the odd and even impulse conductors 821 and 822. During the receipt of the tens digit (transfer relay 804 being in an unoperated condition and transfer relay 805 being operated as described), odd and even conductors 821 and 822 are extended, through armatures 808 and 809 and their back contacts, and armatures 816 and 817, to the odd and even conductor pair T extending to the tens register TR. The conductors of pair T are thus alternately grounded to secure the successive operation of relays 811 to 815 constituting the tens register TR.

Upon the first application of ground potential to the odd conductor of pair T, a circuit is closed, through contacts 827, for off-normal relay 807. Relay 807 thereupon operates and closes a locking circuit for itself at its inner upper armature, over conductor 744, contacts controlled by the lower armature of relay 709, and contacts of relay 708, to ground on conductor 738. Relay 807 also opens its initial circuit. At contacts 836, relay 807 opens a point in the circuit of ringing relay 707; at contacts 837 it prepares a circuit for connecting relay 711; and at armature 838 it joins conductors 738 and 811 together at a new point, at the same time opening the initial circuit of the lower winding of transfer relay 805. Ground potential remains applied to the lower winding of relay 805, however, over a circuit path from the now-grounded conductor 811, through contacts of the operated relay 801, contacts of relay 804, and armature 818 and its front contact.

As a further result of the first application of ground potential to the upper, or odd, conductor of the pair T, a circuit is closed through contacts of relays 824, 825, and 822 for the first counting relay 821. Relay 821 thereupon operates and closes a self-locking circuit at its inner lower contacts to conductor 745, connected through contacts of relay 710 to the grounded local conductor 738. At its inner upper contacts, relay 821 prepares an operating circuit for relay 822.

When the ground potential is first transferred from the odd to the even conductor of pair T (upon the first operation of relay 802, at the beginning of the second delivered impulse), a circuit is closed through contacts of relays 825, 828, and 821 for the second counting relay 822. Relay 822 thereupon operates; locks itself to conductor 745; and at its upper contacts it prepares a circuit for the third counting relay 823. The third counting relay 823 is operated through contacts of relay 822 upon the second application of ground potential to the odd conductor of pair T.

Upon the second grounding of the even conductor of the pair T, a circuit is closed thereover, through contacts of relay 825 and through the inner upper armature and front contact of relay 823, for the fourth counting relay 824. Relay 824 thereupon operates and locks itself.

Upon the third grounding of the odd conductor of pair T, a circuit is closed thereover, through the upper armature and front contact of relay 824, the upper armature and front contact of relay 823, and the upper armature and front contact of relay 821 for the fifth counting relay 825. Relay 825 thereupon operates and locks itself.

As a result of the delivery of the remaining five impulses of the present assumed series of ten, the counting relays 821 to 825 are successively restored.

The restoration of relay 821 occurs upon the third grounding of the even conductor of pair T, as a result of which ground potential is extended through the inner upper contacts of the operated relays 825, 824, and 822, to the right-hand terminal of relay 821, thereby short-circuiting and restoring relay 821;

Relay 822 is short-circuited and restored upon the next application of ground potential to the odd conductor of pair T, over a circuit path including contacts of the operated relays 824 and 823, and contacts of the restored relay 821;

Relay 823 is short-circuited and restored upon the next application of ground potential to the even conductor, over a circuit path including contacts of the operated relays 825 and 824, and contacts of the restored relay 822;

Upon the next application of ground potential to the odd conductor (upon the delivery of the ninth impulse), relay 824 is short-circuited and restored by ground potential extended to the right-hand terminal thereof, through the upper armature and front contact of relay 824 and the upper armature and back contact of relay 823; and Upon the final application of ground potential to the even conductor of the pair T, relay 825 is short-circuited and restored by ground potential extended to its right-hand terminal through the inner upper armature and front contact of relay 825 and the inner upper armature and back contact of relay 824.

In the present assumed call, the tens digit dialed is the digit 1 (of the called number 916), in which case only a single impulse is delivered to the tens register TR, and not ten impulses, as temporarily assumed for illustrative purposes. Accordingly, only relay 821 of the tens register is operated, and relay 821 remains operated and locked at its inner lower armature to the grounded conductor 745.

At the end of the dialing of the tens digit, line relay 702 comes to rest in an operated condition and slow-acting series relay 801 restores. Upon restoring, relay 801, at its inner lower contacts, unlocks and restores relays 802 and 803 to prepare them for operation in connection with the next succeeding train of impulses. At its inner upper contacts, relay 801 opens the direct holding circuit which it maintained, through armature 818 and its front contact, for the lower winding of relay 805 following the described operation of off-normal relay 807. When this occurs, the lower winding of relay 805 remains energized in a locking circuit through the lower winding of relay 804 and contacts of relay 805, to the grounded conductor 738. Relay 804 operates in this locking circuit. At its inner upper armature, it prepares a holding circuit for its upper winding, while at armatures 808 and 809 it disconnects the odd and even conductors 821 and 822 from the conductors T of the tens register TR and transfers them to the conductors U of the units register UR.

*Dialing the units digit 6*

When the units digit 6 is dialed, and line relay 702 consequently restores six times momentarily, slow-restoring series relay 801 is again operated. At its inner lower contacts, it again prepares a locking circuit for the even-odd relays 802 and 803, while at its inner upper contacts it extends ground potential, from the now-grounded conductor 811, through the upper armature and front contact of relay 804 to the upper winding of relay 804. Relay 804 is thus held operated over its upper winding during the units digit. When this holding circuit is established, a parallel restoring circuit is established for the upper winding of differential relay 805, whereupon relay 805 restores. Upon restoring, relay 805 prepares a circuit for cutoff relay 806 at armature 818, while at its inner upper and at its lower contacts, it open-circuits both its own windings and the lower winding of relay 804. Armatures 816 and 817 prepare for the subsequent operation of the party register PR.

Even-odd relays 802 and 803 operate as previously described to alternately apply ground potential to odd and even conductors 821 and 822, which are at this time extended, through armatures 808 and 809 and their front contacts, to conductors U, leading to the units register UR. As a result, the relays 921 to 925 of the units register UR are operated as described in connection with relays 821 to 825 to record the value of the units digit. In this recording, relays 921 to 925 are first operated successively, responsive to the first five impulses of the digit, whereafter relay 921 is restored responsive to the sixth impulse of the digit.

When series relay 801 restores at the end of the units digit, it opens the holding circuit of the upper winding of transfer relay 804 at its inner upper contacts whereupon relay 804 restores. The odd and even conductors 821 and 822 are now extended, through armatures 808 and 809, and through armatures 816 and 817, to the party conductors P extending to the party register PR.

*Dialing the party digit 1*

When the party digit 1 is dialed, a single impulse is delivered over conductor 739, whereupon the first relay 931 of the party register PR is operated, and locked over conductor 746. Series relay 801 operates as before. Upon operating, relay 801 closes a circuit at its inner upper contacts and through contacts of the restored relays 804 and 805 for cutoff relay 806. Relay 806 thereupon operates and locks itself to the grounded local conductor 738, at the same time opening a point in its initial circuit. At armature 829, relay 806 opens a further point in the circuit of the lower winding of relay 805 to prevent reestablishment of this circuit when off-normal relay 807 is subsequently restored; at armature 827 it opens a further point in the initial circuit of off-normal relay 807; and at armature 828 it severs the connection normally existing between series relay 801 and impulse conductor 739, leaving relay 801 connected temporarily to conductor 739 through the middle upper contacts of relay 801.

When series relay 801 restores at the end of the party digit, it completely opens impulse conductor 739 to prevent any further response of the impulse-responding and recording equipment in the event that the calling subscriber inadvertently transmits a further series of impulses.

*Seizing the common equipment for connector action*

The tens, units, and party digits (1, 6, and 1) having been recorded respectively in the registers TR, UR, and PR, the common equipment may now be called in to set up the connection as indicated by the recorded digits.

Connecting relay 711 of the connecting-link circuit CLC—1 is arranged to connect the connecting-link circuit CLC—1 to the common equipment at a time when it is not in use by any other connecting-link circuit. For this purpose, relay 711 and the corresponding relays of the other connecting-link circuits are chained together, as indicated, in substantially the same manner that relays 211 to 220 are chained together.

Let it be assumed now that none of the relays such as 711 of the other connecting-link circuits is operated when series relay 704 restores at the end of the party digit. Under this connection, relay 711 thereupon operates over the following circuit: from ground, on chain-in conductor 735 of the first connecting-link circuit (CLC—1), through chain armature 721 and its back contact, chain-out conductor 736, the similar chain conductors and contacts of the other connecting-link circuits, chain-end conductor 737 (common to all the connecting-link circuits), contacts controlled by armature 722, conductor 740, contacts of series relay 801, contacts 837 and 826, conductor 741, lower contacts of relay 710, the winding of connecting relay 711, conductor C of cable CA—DR—1, and thence through the winding of connecting relay 600 of the distributor DR—1, to battery. Relays 600 and 711 operate in series through the above-traced circuit. Relay 600 connects up the selecting relays 601 to 605 and switching relay 606, while connecting relay 711 locks itself to chain-in conductor 735 at armature 722, at the same time disconnecting itself from the common chain-end conductor 737; at armature 721 it disconnects chain-in conductor 735 from chain-out conductor 736, thereby opening the chain and removing ground potential from the chain-end conductor 737 to prevent contemporaneous operation of the connecting relay of any of the other connecting-link circuits.

As a further result of the operation of connecting relay 711, connection is made with the associated common conductors S1, S2, H, RC, SW, B, and ST of cable CA—CT. The incoming sleeve conductor S is transferred, at armature 723, from its local ground connection, to ground over conductor S1; at armature 724, the outgoing sleeve conductor S is connected to conductor S2; at armature 725, the upper winding of hold relay 701 is connected to the common hold conductor H; at armature 726, reverting-call relay 705 is connected to the common reverting-call conductor RC; at armature 727, the winding of switching relay 709 is connected to the common switching conductor SW; at armature 728, the winding of busy relay 708 is connected to the common busy conductor B; and, at armature 729, ground potential is applied to the common start conductor ST, in cable CA—CT.

At armature 730, relay 711 grounds the individual transfer conductor 747 to energize transfer relay 911, individual to the party register PR. Relay 911 thereupon operates and transfers the associated conductors 1 to 0 from the common code conductors in cable CA—CO to the respective terminals 1 to 0 in the party-identifying connecting block B—PI. At armature 912, relay 911 opens a point in the ringing-control circuit and applies ground potential to the access point of the ten digit conductors of the party register PR, while at armatures 913 and 914 it grounds conductors 901 and 902 respectively, being the access points to the digit conductors controlled by the tens and units registers TR and UR.

Common transfer relays 810 and 910 being at this time in normal condition, the conductors 1 to 0 of the tens register TR and of the units register UR respectively extend to the terminals of the blocks B—TI and B—UI, whereby the circuit arrangements are in readiness for the tens, units, and party digits which have been dialed to be identified, whereby the appropriate class of service can be given according to which line, and which station thereon, is being called.

The line now being called is one requiring no special service treatment, in which case the identity of the line is not required to be made known in the common equipment. The jumpers run from the blocks B—TI, B—UI, and B—PI therefore do not include a jumper set indicative of the currently called tens, units, and party digits (1, 6, and 1).

In the common equipment CT (Fig. 11), conductor S1 is normally grounded, through contacts of relays 1104 and 1106, whereby ground potential is maintained on the incoming conductor S of the connecting-link circuit CLC—1 (Fig. 7) after connecting relay 711 has operated as described.

The grounding of start conductor ST of cable CA—CT results in the operation of transfer-start relay 1103. Relay 1103 applies battery potential, through resistor 1115, to conductor 13 in cable CA—TM, thereby extending battery potential to the upper terminal of transfer-control relay 221. In the event that none of the tens relays 211 to 220 is operated at this time, there is ground potential on the common chain-end conductor 229, and transfer control relay 221 thereupon operates. Upon operating, relay 221 closes a direct locking circuit for itself at its middle lower armature, at the same time disconnecting itself from the chain-end conductor 229, while at its inner lower armature it removes ground potential from the starting point of the associated chain to preclude the operation of any of the relays 211 to 220 for the time being. Relay 221 also applies ground potential to conductor 228 to bring about the operation of transfer relay 101, to complete the changeover from finder action to connector action.

Relay 221 also applies ground potential to conductors 11 and 12 of cable CA—TM. The placing of ground potential on conductor 11 closes a circuit at this time through contacts of relays 1001 and 1009 for common transfer relays 810 and 910 in parallel. Each of these relays thereupon operates. Relay 810 disconnects the associated conductors 1 to 0 of the tens register TR from the identity block B—TI and transfers them respectively to the conductors 1 to 0 of the tens-mark cable CA—TM, while relay 910 correspondingly disconnects the conductors 1 to 0 of the units register UR from the block B—UI and transfers them to the corresponding conductors of the units-mark cable CA—UM. As a result of this, the first conductor (1) in cable CA—TM becomes grounded because the digit 1 has been set up in the tens register TR wherein relay 821 is energized. At the same time, the sixth conductor (6) becomes grounded in the units-mark cable CA—UM because the digit 6 has been set up in the units register UR, wherein the relays 921 to 925 have been successively operated, and relay 921 has been restored.

As a result of the above-mentioned grounding of conductor 1 in the tens-mark cable CA—TM, the upper winding of tens relay 211 is energized, operating the tens relay 211 to record the called tens digit 1.

In the units translator UT, the grounding of the digit 6 conductor in the units-mark cable CA—UM results in the closure of a circuit for the lower winding of relay 301 through contacts of relays 302 to 305. Relay 301 thereupon operates to ground conductor 1 in the primary marking cable CA—PM. At its lower contacts, relay 301 extends the grounded conductor 6 in cable CA—UM to the winding of relay 306, whereupon relay 306 operates to mark the associated conductor 6 in cable CA—PM. Conductors 1 and 6 of the primary cable CA—PM are thus marked by ground potential, in accordance with the called units digit 6.

*Matching for connector action*

When relay 211 operates as above described to record the tens digit 1 which has been stored in the tens register TR of Fig. 8 and transferred thereto, it connects the conductors of the cable CA—PC1 of the first tens group respectively to the conductors of the primary cable CA—PC, thereby connecting the connecting relays such as 410 and 420 of the devices 1PA to 1PD of Figs. 4 and 3, respectively to the matching-control relays 103 to 106, so as to energize the high resistance upper winding of each of the windings 103 to 106, provided in each case that the primary switching device with which the matching-control relay is associated in the selected tens group (the first tens group in the present example) is idle, and provided that at least one connector-action secondary switching device in the group having access to the concerned primary switching device 1PA to 1PD is idle. In the present example, the upper winding of relay 103 cannot energize, because the switching device 1PA is in use, and connecting relay 410 has been disconnected, as described, at the upper contacts of hold relay 417. It may be assumed, however, that the primary switching devices 1PB, 1PC, and 1PD are all idle, in which case each of the connecting relays therein is still connected to the corresponding ones of the conductors B, C, and D of the cable CA—PC1. It may be assumed further that at least one connector-action secondary in each of the four groups (shown most clearly in Fig. 13) is idle, in which case ground potential is maintained on each of the group conductors GA to GD of the cable CA—CS. The upper winding of each of the relays 104 to 106 is energized in this event. The upper winding of relay 104, for example, is energized over the following circuit path: from ground, through the uppermost armature and back contact of hold relay 517 of the connector-action secondary 5SB in secondary group B, conductor GB of cable CA—CS, contacts of the operated transfer relay 101, contacts of relay 102, the high-resistance upper winding of relay 104, conductor B of cable CA—PC, contacts of relay 211, conductor B of cable CA—PC1, upper contacts of hold relay 427, and the winding of connecting relay 420, to battery. Matching control relay 104 operates over the above-traced circuit, but relay 420 does not operate because of the high-resistance of the upper winding of relay 104.

Each of the relays 104 to 106 attempts to close a locking circuit for itself and an operating circuit for the connecting relay, such as 420, connected in circuit therewith, but at this time only relay 104 is able to close a locking circuit for itself, assuming that the B secondary group now has the preference.

It was explained hereinbefore how the preference was transferred from the A group to the B group by the operation of relay 109 during the described finder action and the consequent operation of relay 110 at the termination thereof. Provided no other finder-action call has been handled in the 100-line group in the meantime, relay 110 is still in operated condition and relay 108 has not operated. In this event, ground potential is extended, at the second armature from the bottom of relay 110 and through its front contact, and thence, through the middle armature and back of contact of relay 108, to the inner armature of relay 104. With relays 104 to 106 operated (relay 103 remaining unoperated for the reason previously stated), the preference ground potential on the inner armature of relay 104 is disconnected from the inner armatures of relays 105 and 106, preventing locking circuits from being closed for these relays, and a locking circuit for relay 104 is closed as follows: from the preference ground potential on the inner armature of relay 104, through the front contact of this armature, the low-resistance lower winding of relay 104, and thence to battery over a portion of the circuit previously traced through the winding of relay 420. Relay 104 remains operated in this locking circuit and relay 420 operates. As a further result of the operation of relays 104 to 106, test-cutoff relay 102 is operated, and is maintained operated at the contacts of the locked relay 104. Relay 102 opens the initial circuit of each of the operated matching-control relays, whereupon relays 105 and 106 restore, leaving only matching-control relay 104 operated.

*Finding the called line*

When connecting relay 420 operates as described, it connects the conductors 1 to 6 of the cable CA—PM respectively to the selective relays 421 to 426 of the primary switching device 1PB, whereupon relays 421 and 426 operate over the conductors 1 to 6 of the cable CA—PM, which have been marked by the previously described operation of relays 301 and 306 of the units translator UT in accordance with the units digit 6 in the called number. The tip, ring, and sleeve conductors T, R, and S of the link P1B are thereupon connected, through contacts of relays 426 and 421, to the tip, ring, and sleeve conductors T, R, and S of the called line #916. These conductors, however, are open for the time being in the secondary multiple.

*Finding the operated primary device 1PB*

As a further result of the operation of test-cutoff relay 102, following the described operation of matching-control relay 104, a circuit is closed at the lower contacts of relay 102, through the inner armature and front contact of relay 110 (relays 110 and 109 are in operated condition at this time under the assumption previously made) for the lower winding of relay 110. Relay 109 being in operated condition under the present assumption, a branch circuit exists, through the lower contacts of relay 109, for the lower winding thereof. Relay 110 is held operated by its lower winding for the time being, but relay 109 restores, being a differential relay as indicated. Upon restoring, relay 109 again grounds conductor 111, at this time extending ground potential, through contacts of the operated relays 104 and 101, and over conductor CB of cable CA—CS, to the lower armature of hold relay 517 of the B-group connector-action secondary 5SB. In the event that the device 5SB is in use, relay 517 is in operated condition, and this connecting ground potential is therefore extended to device 4SB, Fig. 13. Let it be assumed, however, that the device 5SB is idle, in which event relay 517 is not in operated condition, and ground potential on the associated conductor CB is extended to connecting relay 510. Connecting relay 510 is thereupon operated to connect up the windings of relays 511 to 516. When this occurs, relay 511 is operated over the marking conductor M1 of the link P1B to find the primary device 1PB which has made connection with the called line as described. The circuit for relay 511 is from ground, through the outermost contacts of connecting relay 420, middle lower armature and back contact of hold relay 427, conductor M1 of link P1B, contacts of relay 510, and the winding of relay 511, to battery. Upon operating, relay 511 extends the tip, ring, sleeve, and hold conductors T, R, S, and H of the link P1B through its uppermost set of four contact pairs, and thence through the back contacts and four upper armatures of relay 516, to the distributor side of the secondary device.

*Finding the operated secondary device 5SB*

The connecting relay 510 of the device 5SB also marks conductor M1 of the link S5B to enable the distributor DR—1, Fig. 6, associated with the connecting-link circuit CLC—1 of Figs. 7 to 9 to find the device 5SB.

Keeping in mind that connecting relay 600 has been operated in series with relay 711 of the connecting-link circuit, the grounding of conductor M1 of link S5B by relay 510 results in the closure of a circuit through contacts of connecting relay 600 for selecting relay 604 of the distributor DR—1, whereupon relay 604 operates to extend the conductors T, R, and S of the link S5B, through contacts of relay 606, to the conductors T, R, and S of the terminating or connector-action end of the connecting-link circuit CLC—1, at the same time extending the hold conductor H of the link 5SB to ground through contacts of the unoperated switching relay 606. At its lower contacts, relay 604 locks to conductor H of cable CA—DR—1, now grounded at contacts of relay 711.

As described, the devices 1PB, 5SB, and DR—1 have been successively operated to link a connection between the called line of substation B (telephone number 9161) and the terminating or connector-action side of the link circuit CLC—1 of Figs. 7 to 9. With connecting relay 711 operated, the sleeve conductor of the called line is now tested by line-test relay 1108 to determine the busy or idle condition of the called line to thereby determine whether busy relay 708 or switching relay 709 is to become operated after a slight interval, when the common control equipment shown in Figs. 1 to 3 has cleared out.

*Initiating the clearing out of the common equipment*

The way in which holding circuits are established for the operated devices 5SB and 1PB; the temporary selected condition of these devices is terminated; and the clearing out of the common equipment is initiated, will now be described.

Upon the described operation of selecting relay 604 of the distributor DR—1, to link the such distributor with the secondary device 5SB, a circuit is closed for the lower winding of hold relay 517, over hold conductor H of the link S5B, through contacts of the operated relay 604 and of the unoperated relay 606. Relay 517 thereupon operates and closes a locking circuit at its inner lower contacts for the operated selecting relay 511, to maintain relay 511 operated after its initial circuit is opened. Relay 517 also disconnects conductor CB of the cable CA—CS from the winding of connecting relay 510 and prepares to extend this lead, through contacts of relay 510 and over conductor 521 to the secondary device 4SB. Being slow-releasing as indicated, connecting relay 510 remains operated for a slight interval to prevent premature extension of the said lead to conductor 521.

At its upper armature, relay 517 disconnects ground potential at one point from group conductor GB of the cable CA—CS, leaving this conductor grounded at similar contacts of any other idle connector-action secondary device in the B group.

Relay 517 also grounds the associated hold conductor H at its upper armature, thereby closing a circuit, through contacts of the unoperated relay 516, through contacts of the operated relay 511, and over conductor H of the link P1B, for the winding of hold relay 427 of the device 1PB. Hold relay 427 thereupon operates. At its lowermost contacts, relay 427 separates conductors 407 and 408 at one point, and at its inner lower armature it closes a locking circuit from the grounded lead H of the link P1B to maintain relay 421 operated after its initial circuit has been opened. With switching relay 426 in operated condition, the lower winding thereof is in series with the locking circuit for selecting relay 421, so as to maintain relay 426 operated after its initial circuit has been opened. At its upper armature, relay 427 disconnects the connecting relay 420 from conductor B of the cable CA—PC1, thereby marking the device 1PB as busy to the matching-control unit MC, Fig. 1. Being slow-releasing, as indicated, relay 420 does not restore immediately, but remains operated a slight interval for reasons pointed out in connection with relay 410 in device 1PA.

At its middle lower armature, relay 427 terminates the marked condition of the lead M1 of the link P1B and applies ground potential to conductor 15 of the cable CA—TM. Clearout relay 222 thereupon operates as previously explained. At its upper armature, relay 222 grounds conductor 225 to maintain test cutoff relay 102 operated after matching-control relay 104 restores, as it does when its circuit over the associated B lead is opened, as described, at the lower contacts of relay 517.

With transfer-control relay 221 in operated condition, the grounding of conductor 15 of cable CA—TM results in the grounding of conductor 14 of the cable CA—TM.

*Initiating the testing operation*

When ground potential is applied as described to conductor 14 of cable CA—TM, relay 1107 of the cycle group (comprising relays 1104 to 1107) operates. At its inner upper contacts, relay 1107 locks itself to conductor 11, grounded at the upper contacts of transfer control relay 221. By this locking circuit, relays 1107 and 222 are maintained operated as long as relay 221 is held operated, thus avoiding their premature restoration responsive to the restoration of the now-disconnected slow-acting connecting relay 420, which occurs shortly.

The operations now occurring depend upon whether the called line (#916, Fig. 4), to which the connection has been extended, is idle or is busy.

*The called line is busy*

Let it be assumed that the called line #916, Fig. 4, is busy. In this case, a guarding ground potential is being maintained on the associated sleeve conductor S to hold cutoff relay 404 operated. It has been described previously that the sleeve conductor S in cable CA—DR—1 has been extended on the one hand through armature 724 and over conductor S2 of the cable CA—CT to the common test equipment CT, and has been extended on the other hand, through the devices DR—1 of Fig. 6, 5SB of Fig. 5, and 1PB of Fig. 4, to the sleeve conductor S associated with the called line #916. Conductor S2 of cable CA—CT normally extends, through the winding of line-test relay 1108, to ground at the contacts of relay 1104, enabling relay 1108 to operate in series with the cutoff relay of an idle called line. Under the present assumption, the called line is busy. The resulting ground potential on the sleeve lead thereof shunts line-test relay 1108, preventing its operation. In this event, ground potential is not applied to the switching conductor SW in cable CA—CT, and relay 1106 remains connected to the grounded conductor 14. The lower winding of relay 1106 is accordingly energized in parallel with the winding of relay 1107. The operation of relay 1106 is delayed somewhat by the illustrated short-circuited upper winding thereof.

After a slight interval, relay 1106 operates and applies a reverting-call test to determine whether the calling and called lines are identical. More in particular, relay 1106 opens points in the associated RC and H leads at armatures 1119 and 1120 respectively; it short-circuits line-test relay 1108 at armature 1121; at its lower contacts it closes a circuit for the associated slow-operating relay 1105; and at the contacts controlled by armature 1121, it removes ground from the right-hand terminal of reverting-call test relay 1109. Since the calling and called lines are not identical in the present assumed example, reverting-call test relay 1109 is not shunted over the called-line multiple, and therefore now operates in series with lead S1 and in the holding circuit of switching relay 621 of selector S81, and that of cutoff relay 402 of the calling line. Upon operating, relay 1109 applies ground potential, at its upper armature and front contact, through contacts 1116, to conductor B of cable CA—CT, thereby closing a circuit through contacts 728 for busy relay 708.

Upon operating, busy relay 708 locks itself at its lower armature to the grounded local conductor 738. At the back contact of its lower armature, relay 708 disconnects ground potential from conductor 746, thereby unlocking and clearing out the relays of the party register PR, and unlocking and restoring off-normal relay 807.

At contacts 837, off-normal relay 807 open-circuits and restores connecting relays 711 and 800. On restoring, connecting relay 711 frees the conductors of the cable CA—CT and re-establishes the chain circuit to chain-end conductor 737.

Relay 711 also removes ground potential from conductor 747, restoring relay 911. At armatures 913 and 914, relay 911 removes ground potential from the access point of the register contacts of the tens register TR and units register UR, thereby terminating the marked condition of the conductors 1 to 0 in each of the cables CA—TM and CA—UM.

As a result of the removal of ground potential from start conductor ST of cable CA—CT, transfer-start relay 1103 restores and removes battery potential from conductor 13 of the cable CA—TM, permitting transfer-control relay 221 to restore. The restoration of relay 221 results in the removal of ground potential from conductor 11, whereupon clearout relay 222 restores, as does relay 1107.

The restoration of relays 221 and 222 allows relays 101 and 102 to restore. The portion of the common equipment shown in Figs. 1 to 3 is thereby cleared out.

In the portion of the common equipment shown in Fig. 11, relay 1109 restores when lead S1 is disconnected by relay 711, and relays 1106 and 1107 restore, responsive to the ungrounding of conductor 11, thereby clearing out the common test equipment CT.

The common equipment is now completely cleared out.

In the connecting-link circuit CLC—1, busy relay 708, at its inner upper contacts, applies busy-tone signaling current from common lead 733, through contacts 717 and condenser 714, to the incoming tip talking conductor, whereby a busy-tone signal is transmitted to the calling substation to inform the subscriber thereat of the busy condition of the called line.

It should be mentioned at this point that the described operations resulting in the giving of a busy-tone signal and in the denying of the connection may result also from an open condition of the sleeve lead of the called line (such as results for example when an unequipped line is inadvertently called), for the line-test relay 1109 can operate to prevent the returning of the busy signal only in the event that the sleeve conductor of the called line is closed to battery, through the cutoff relay.

*The called line is idle*

Let it be assumed now that the desired line is idle when called. In this event, with connecting relay 711 in operated condition, the completion of the connection to the called line results in the energization of line-test relay 1108 in series with cutoff relay 404 of called line #916 over conductor S2 of cable CA—CT, contacts 724, sleeve conductor S of cable CA—DR—1, and thence by way of devices DR—1, 5SB, and 1PB, to the sleeve conductor of the called line. Relay 404 operates to clear the called line for ringing and talking purposes, while the line-test relay 1108 disconnects conductor 14 from the lower winding of relay 1106 and prepares to ground the associated switching conductor SW.

Under the assumption now being made, when conductor 14 of cable CA—TM is grounded as described, through contacts of the operated transfer control relay 211, as a result of the grounding of conductor 15 by hold relay 417, the resulting operation of relay 1107 extends ground potential (from conductor 14), through contacts of the operated line-test relay 1108 and the upper contacts of relay 1107, to conductor SW of the cable CA—CT, thereby closing an operating circuit, through contacts 727, for switching relay 709 of the connecting-link circuit CLC—1.

Switching relay 709 now operates. At its inner upper armature, relay 709 makes a new application of ground potential to sleeve conductor S of the cable CA—DR—1 to maintain the called sleeve grounded after relay 711 has restored; at armatures 715 and 716 it completes the ringing circuit, over the associated conductors T and R of the cable CA—DR—1, to the called line; at armature 717 it closes a ring-back circuit path through condenser 714; and at its inner lower contacts it closes a branch circuit for auxiliary relay 710. Auxiliary relay 710 thereupon operates. At its inner lower armature, relay 710 disconnects ground potential from conductor 745, thereby clearing out registers TR and UR; at the front contact of its inner lower armature, relay 710 closes a locking circuit for itself and a holding circuit for relay 709 from the grounded local conductor 738; it additionally applies ground potential to conductor H in cable CA—DR—1 so as to maintain the connection intact to the called line after relay 711 has restored; and at its lower contacts it open-circuits and restores relays 711 and 600. The restoration of relay 711 frees the conductors of the cable CA—CT and ungrounds conductor 747, thereby permitting the final clearing out of the common equipment as previously described.

*Initiating the ringing operation*

As previously indicated, each party line may have as many as ten substations connected thereto, each of which is signalled by a separate code. The codes are selected according to the setting of the party register PR (Fig. 9), which selects one or the other of the ten conductors of cable CA—CO, leading to the code machine CM. The code machine CM may be of any desired type or construction, but is illustrated as a multi-cam code machine having cam contacts 931 to 940, each of which may be arranged to transmit a distinctive code. The code machine CM also has cam contacts 930, through which ground potential is normally applied to pick-up conductor 743, being momentarily removed just prior to the beginning of a code period.

The previously operated off-normal relay 807 has a further duty in that it acts as a pick-up relay to start the ringing operation at the beginning of the code period. The lower armature of relay 709 transfers the locking conductor 744 for off-normal relays 807 from its previously existing connection with the grounded local conductor 738, to the normally grounded pick-up conductor 743. Nothing happens as a result of this transference until the pick-up position of the code machine CM is next reached, whereupon the resulting ungrounding of pick-up conductor 743 permits off-normal relay 807 to restore and open a further point in its previously existing locking circuit. Off-normal relay 807 cannot, therefore, reoperate when conductor 743 is subsequently regrounded.

When off-normal relay 807 restores, it completes the ringing relay circuit at armature 836; from ringing relay 707, over conductor 742, contacts 836, conductor 742′, the back contact of armature 912 and the said armature, conductor 903, lower contacts of the unoperated relays 935 to 932, lower armature and front contact of the operated relay 931, contacts of the restored relay 911, and thence over conductor 1 of the code cable CA—CO, to cam contacts 931 of the code machine CM. Accordingly, ringing relay 707 is operated in accordance with the code generated at contacts 931.

Each time ringing relay 707 operates, it removes ground potential from the tip talking conductor now extended to the called line and substitutes ringing current over lead 734 from the generator G. This ringing current passes over the tip conductor to the called line, and returns over the ring conductor through contacts 716, contacts of relay 708, and through the winding of ring-trip relay 706 to battery.

Being of the usual retarded type, as indicated, trip relay 706 does not operate in the ringing circuit so long as the call is unanswered (there being the usual blocking condenser in the ringing circuit). When the call is answered, however, trip relay 706 operates over the called line, its return circuit to ground being either through the back contact of the armature of relay 707, or through the front contact of the armature of this relay, to ground through the generator G, depending upon whether the response occurs during the transmission of ringing current or during a silent interval.

Upon operating, relay 706 connects the winding of busy relay 708 in parallel with the winding of auxiliary relay 710, whereupon busy relay 708 operates as a ring-cutoff relay. Upon operating, relay 708 locks itself to the grounded local conductor 738 at its lower armature, while at its upper and middle upper armatures it opens the ringing circuit and completes the talking circuit to the called line.

Back-bridge relay 703 now operates over the called line, and makes an additional application of ground potential, through contacts of the unoperated hold and reverting-call relays 701 and 705, to the local conductor 738.

The calling and called subscribers may now converse with each other as described.

*Clearing out the established connection*

When the conversation has been terminated and the subscribers as substations A and B have replaced their receivers, the established connection is cleared out, as will now be described. The order in which the clearing-out operations occur depends upon which of the two subscribers replaces his receiver first.

*The calling subscriber hangs up first*

Let it be assumed that the calling subscriber at substation A is the first to replace his receiver. Under this condition, the resulting restoration of line relay 702 is followed a moment later by the restoration of slow-releasing relay 704. Series relay 801 does not respond at this time because it has been disconnected at contacts 828. At its lower armature, relay 704 disconnects ground potential at one point from local condctor 738, leaving this conductor grounded at contacts of the operated back-bridge relay 702.

At its upper armature, relay 704 disconnects ground potential from the associated sleeve conductor S of the link incoming to the connecting-link circuit from the selectors, but no idle connecting battery potential is applied to this sleeve conductor at this time because resistor 718 is maintained disconnected at contacts of relay 710. As a result, the selector S81 and the devices 1SA and 1PA can now clear out as will be described, but the connecting-link circuit CLC—1 is not marked as idle to the battery-searching selectors because of the absence of battery potential on the sleeve lead of the associated link.

Responsive to the stated removal of ground potential from the sleeve conductor, the calling line is marked as idle, and cutoff relay 402 restores, to reconnect line relay 401, enabling finder action to occur the next time the subscriber at substation A removes his receiver to initiate a call.

Switching relay 621 of selector S81 also restores when ground potential is removed from the associated sleeve lead. Upon restoring, relay 621 disconnects ground potential from the associated hold conductor H, whereupon relays 624 and 625 restore, completing the clearing out of the selector.

Removal of ground potential from the lead H of the link S1A by the selector S81 restores any operated ones of the relays 501 to 507 of the device 1SA, clearing out this device. Ground potential is thereby disconnected from the hold conductor H of the link P1A, permitting any operated ones of the relays 411 to 417 to restore, clearing out the primary device 1PA.

When the subscriber at the called substation B replaces his receiver, back-bridge relay 703 restores and removes ground potential from conductor 738. When this occurs, relays 708 to 710, and 806, are unlocked and permitted to restore. The restoration of relay 710 reconnects battery potential, through resistor 718, to the sleeve conductor S of the link over which the connecting-link circuit CLC—1 is seized, thereby marking this link as idle.

The restoration of relay 709 opens the talking circuit at armatures 715 and 716, while, at the inner upper armature of relay 709, ground potential is removed from the sleeve lead of the connection to the called line, marking the called line as idle and restoring cutoff relay 404.

At the inner upper contacts of relay 711, the holding circuit of any operated one of the relays 601 to 606 of the distributor DR—1 is opened resulting in the clearing out of the distributor, and in the removal of ground potential from the hold conductor H of link S5B. When this occurs, any operated ones of relays 511 to 517 are permitted to restore. The device 5SB is thereby cleared out. A result is that the ungrounding of the hold conductor H of the link P1B permits any operated ones of the relays 421 to 427 to restore, clearing out the link 1PB.

The established connection has now been released as described and the apparatus involved therein is available for use in setting up further connections.

*The called subscriber hangs up first*

Let it be assumed now that the called subscriber is the first to replace his receiver upon completion of the conversation over the connection established as described. Under this assumption, the only immediate result is that back-bridge relay 703 restores and removes ground potential at one point from conductor 738, leaving this conductor grounded at contacts of release relay 704. The connection between the two lines remains intact under this condition until the calling subscriber replaces his receiver, whereupon the restoration of line relay 702 is followed by the restoration of release relay 704 to cause the connection from the calling line to the connecting-link circuit to clear out as described, and to cause the connection from the connecting-linke circuit to the called line to clear out as described.

*Further operation of the preference group PG*

From the description hereinbefore given, it is apparent that, beginning at a time when relays 107 to 110 of the preference group PG are all in a restored condition, relay 109 is operated by test cutoff relay 102 when the first call (finder action or connector action) is handled by the common equipment; that relay 110 operates in the locking circuit of the upper winding of relay 109 when the first call is cleared out and relay 102 restores; that relay 109 is restored and relay 110 is maintained operated by relay 102 when the next call is handled; and that relay 110 restores when this second call is cleared out of the common equipment and relay 102 restores. It follows that relay 109 operates upon each odd-numbered operation of relay 102, and restores upon each even numbered operation of relay 102, and that relay 110 operates upon each odd-numbered restoration of relay 102, and restores upon each even-numbered restoration of relay 102.

When relay 109 restores upon the second operation (finder action or connector action) of relay 102, it completes a circuit for the upper winding of relay 107 which is from ground, through contacts of the operated relay 110, middle lower contacts of relay 109, inner armature of relay 108 and its back contact, and through the upper winding of relay 107, to battery. Relay 107, therefore, operates on the receipt of the second call, and relay 108 operates in the locking circuit of the upper winding of relay 107 when the second call is cleared out. When relays 109 and 110 next reach the same condition (with relay 109 restored and relay 110 operated), on receipt of the fourth call at the common equipment, a holding circuit is closed for the lower winding of the operated relay 108, while the differential relay 107 is restored responsive to the current flow in the reverse direction in its lower winding. The circuit of the upper winding of relays 107 and 108 is thereby opened, with the result that relay 108 restores upon the clearing out of the fourth call, along with relay 110, placing all of the relays 107 and 110 again in the illustrated restored condition.

By the illustrated connections to the inner armatures of matching-control relays 103 to 106 from the front and back contacts of the middle lower and lowermost armatures of relay 108, which armatures are in turn connected to the front and back contacts of the second lowermost armature of relay 110, the preference ground potential is shifted successively from one to another of the inner armatures of relays 103 to 106 in a continuous cycle as the calls (both finder action and connector action) arrive at the common equipment and are cleared out. By this arrangement the calls are more or less uniformly distributed amongst the four primary switching devices having access to any one ten-line group, and amongst the four secondary groups, both for finder action and for connector action.

*Matching in other than the currently preferred groups*

It is to be observed that the back contacts of the inner armatures of matching-control relays 103 to 106 are chained together, each to the inner armature of the next succeeding relay, and that the back contact of the inner armature of relay 106 is connected to the inner armature of relay 103, thus making the chain continuous. In this way, when any relay which has the preference fails to operate, either because the primary switching device in whose circuit the relay is included (as hereinbefore described) is busy, or because all of the devices in the corresponding secondary group are busy, the preference ground potential is extended, through the then unoperated inner armature of the concerned matching-control relay, to the inner armature of the next succeeding relay in the chain circuit. If the next succeeding matching-control relay is also unable to operate, for either (or both) of the reasons stated, the preference ground potential is then extended to the third matching-control relay from the preferred one, and may be extended to the fourth, if the third is unable to operate. In this way, even though the preference ground potential is in each case applied to a specific matching-control relay, and the corresponding group is thereby given preference, operation can take place in any other group than the preferred one in the event that operation is unable to take place in the preferred group.

*Finder action delayed*

As previously stated, relays 231 to 240 are provided to withdraw the calling ten-line group from finder action temporarily at any time when the starting of attempted finder action is delayed for an interval of, say, a second after the serially related group relays, such as 201 and 211, have operated responsive to the removal of the receiver at a calling substation. This provision will now be explained.

Let it be assumed that the subscriber at substation A removes his receiver and brings about the operation of line relay 401 at a time when at least one of the devices 1PA to 1PD is idle, resulting in the operation of group relays 201 and 211 in series over conductor ST in cable CA—G1.

As previously explained, relay 201 connects up the mark conductors of cable CA—G1, individual to the calling ten-line group, to the conductors of cable CA—UM to cause the units translator UT to be set according to which line in the group is calling, and relay 211 connects the matching-control relays MC over the cable CA—PC1 to the devices 1PA to 1PD of the calling ten-line group, with the expected result that one or the other of the matching-control relays 103 to 106 will operate and lock itself as hereinbefore described.

Let it be assumed, however, that the only idle one of the devices 1PA to 1PD is the device 1PA, and that all of the finder-action devices in the secondary group A (including the secondary device 1SA of Figs. 5 and 13), are busy. Finder action, therefore, cannot take place for the lack of an idle link path. In this event, ground potential has been removed at all points from conductor GA in cable CA—FS, by hold relay 507 of the device 1SA and by the similar relays of the devices 2SA and 3SA, Fig. 13. As a result, no energizing circuit exists for the upper winding of matching-control relay 103 because of the stated condition of the A secondary group. No circuit exists for the upper winding of any one of the matching-control relays 104 to 106 because of the stated busy condition of the devices 1PB to 1PD. Therefore, none of the relays 103 to 106 can operate, and relay 102 remains unoperated, allowing cutoff-control relays 223 and 224 to respond.

When any one of the relays 211 to 220 operates, it closes a circuit for the lower winding of relay 223 in series with the associated one of the cutoff relays 231 to 240. In the present assumed example, relay 211 is operated and closes a circuit for relay 231 as follows: from ground, through the contacts of the common release timer RT, relay 231, inner upper contacts of relay 211, conductor 226, contacts of test-cutoff relay 102, conductor 227, the high-resistance resistor 230, and the lower winding of relay 223, to battery. Relay 231 is preferably so wound and adjusted as not to operate over the above-traced circuit because of the current-limiting effect of the high-resistance resistor 230. Relay 223, however, being a sensitive relay, is able to operate, but the operation thereof is delayed considerably by the retarding effect of the upper winding thereof, which is normally short-circuited as shown. Ordinarily, the above-traced circuit is opened by test-cutoff relay 102, responsive to the operation of one or another of the matching-control relays MC, preventing relay 223 from operating. In the present assumed example, relay 102 is unable to operate as stated, and the above-traced circuit for relay 223 remains closed, enabling relay 223 to operate. Upon operating, relay 223 removes the short circuit from around its upper winding so as to enable it to release quickly when its circuit is subsequently opened, and it applies ground potential to the junction of the associated resistor and the winding of the normally energized relay 224, thereby short-circuiting the winding of relay 224. Relay 224 restores after a slight interval, and when it does, it places a shunt around the high-resistance resistor 230 and the contacts of test-cutoff relay 102, thereby completing a low-resistance operating circuit for relay 231 in series with the lower winding of relay 223. Relay 231 operates when this occurs. Upon so doing, it disconnects conductor ST of cable CA—G1 from the circuit of relays 201 and 211 and closes a locking circuit for itself as follows: from ground, through contacts of the common release timer RT, the winding of relay 231, conductor ST of the cable CA—G1, conductor 405, contacts of the operated line relay 401, conductor 406, lower contacts of relay 417, and thence to battery through resistor 409.

Relays 201 and 211 restore responsive to the operation of relay 231. At its inner upper contacts, relay 211 disconnects relay 223 from in circuit with relay 231, whereupon relay 223 immediately restores and removes the short-circuit from around the winding of relay 224, permitting relay 224 to immediately reoperate. The relays 223 and 224 are, therefore, in readiness to time the finder action initiated at any other ten-line group and to lock out any other such group from finder action in the event that matching (at the matching-control circuit MC) cannot take place.

It is evident that one or more connections may become released in the next few seconds to enable the desired finder action to occur. The contacts of the release timer RT preferably open momentarily at short intervals of, say, ten seconds to allow any operated ones of the relays 231 to 240 to release and unlock. When such an opening of the contacts of RT occurs, the operated group-cutoff relay 231 restores. When this occurs, provided the calling subscriber at substation A has not replaced his receiver to allow line relay 401 to restore, relays 201 and 211 may again operate to thereby again attempt the finder action. If such action is successful on the second attempt, it takes place as previously described. On the other hand, if it is unsuccessful, relays 223 and 224 again operate as described to bring about a second operation of cutoff relay 231 to again clear the common equipment. This may be repeated a number of times, either until the calling subscriber replaces his receiver to wait a while before making his call, or until a finder-action path becomes available and the desired finder action accordingly takes place.

*Safeguarding secondary action*

A special safeguard is provided to prevent false secondary action when a secondary (either finder-action or connector-action) of a group becomes idle while a succeeding secondary of a group is being matched with an idle primary device, as will now be described. As previously explained, the busy or idle condition of the secondary device is indicated by whether or not the hold relay (such as 507 of the device 1SA, and 517 of the device 5SB) is operated. If the hold relay 507, for example, is operated, conductor CA of the cable CA—FS is disconnected from connecting relay 500 and is transferred as previously described through contacts of relay 500 and over conductor 520 to the next succeeding device 2SA. Let it be assumed now that the device 1SA is in use and hold relay 507 is accordingly being maintained operated over the hold conductor H of the link S1A and that matching has taken place between the finder-action portion of the A secondary group and an idle A primary device in one of the ten-line groups. In this event, conductor CA of the cable CA—FS has become grounded by matching-control relay 103 to cause the connecting relay (similar to 500) of a succeeding device to become operated. In this event, if hold relay 507, should restore before the ensuing finder action has been completed, the grounded conductor CA of cable CA—FS would be prematurely disconnected from the connecting relay of the succeeding secondary device and be reconnected to connecting relay 500 of the device 1SA, which operation under certain conditions might result in a double connection or in loss of the call. Such a contingency, however, is prevented by the maintenance of ground potential on the locking conductor LA of the cable CA—FS by relay 103. With ground potential on conductor LA, and relay 507 operated, a temporary locking circuit is completed for the upper winding of relay 507 to hold this relay operated independent of the continued grounded condition of the hold conductor H of the link S1A. Therefore, even though the link S1A should be freed at this time, relay 507 still remains operated by its upper winding until the current finder action has been terminated, whereupon relay 507 restores when conductor LA becomes ungrounded upon the restoration of relays 102 and 103. The same is true of the corresponding relay of the next succeeding secondary device, if operated.

Similarly, if connector action is ensuing in the B secondary group, through the device 4SB of Fig. 13, which may occur when the device 5SB is in use, and hold relay 517 is therefore operated, premature restoration of relay 517 is prevented by a locking circuit for the upper winding of this relay over conductor LB of the cable CA—CS, grounded through contacts of matching-control relay 104 and test-cutoff relay 102.

The same provision is extended to all finder-action and connector-action secondary devices as a safeguard against false secondary action under the condition stated.

*Reverting-call service*

Arrangements, lying partly in the individual connecting-link circuits (such as CLC—1, Figs. 7 to 9) and partly in the common equipment, are provided for enabling directory-number reverting-call service to be given to the party-line subscribers. By a reverting call is meant one made by one party-line subscriber to another subscriber on the same party line.

City party-line service ordinarily does not include more than four-party service, while a rural party line often has as many as ten stations connected thereto. Moreover, a considerable portion of the calls originating on rural party lines are for other parties on the same line. For this reason, it is desirable to make provisions enabling all of the exchange switching equipment to be released and returned to common use while a reverting-call conversation is being carried out on a rural party line. It is ordinarily uneconomical, however, to make such provisions in connection with the four-party lines which renders service to city subscribers, because of the relatively small portion of reverting calls on such lines. A portion of the switching equipment, therefore, must be held in the connection during a reverting-call conversation on a city party line in order to guard the line against intrusion, and to supply talking current to the line. Arrangements are provided, therefore, for releasing all of the switching equipment, or not, during a reverting-call conversation, depending upon whether the concerned party line is, for example, a ten-party rural line or is, for example, a four-party city line. Such provisions will be explained subsequently.

Fig. 4A shows the ten-party rural line #917 and the four-party city line #918. The line equipment of four-party line #918 (having substations 9181 to 9184 thereon) is similar to the line circuits of the individual lines of Fig. 4 in that it comprises simply a line relay 461 and a cutoff relay 462. The line equipment of the ten-party rural line #917 (having ten substations, 9171 to 9170, thereon), in addition to line and cutoff relays 451 and 452, is provided with a lockout relay 453 which enables the line to be placed in a lockout condition during a reverting-call conversation, and to be maintained guarded, while talking current is supplied to the line through the windings of line relay 451.

*Reverting-call service on ten-party lines*

It is now assumed that the subscriber at substation 9171 on the ten-party rural line #917 (Fig. 4A) desires to converse with the subscriber at substation 9170 on the same party line. For this purpose, the subscriber at substation 9171 removes his receiver; waits for dial tone; dials the desired number 9170; replaces his receiver to permit the ringing code of the called substation to be transmitted back over the calling party line; and removes his receiver to converse with the called substation when the application of ringing current is discontinued upon the answering of the subscriber at called substation 9170.

When the receiver (not shown) is removed at the calling substation #9171 (Fig. 4A), line relay 451 operates over the calling line. At its lower contacts, line relay 451 extends battery potential over conductor 405 to start conductor ST of cable CA—G1 (see Fig. 4), while at its inner armature it applies marking ground potential, through contacts of relay 453, to conductor 7 in the said cable CA—G1.

Responsive to the above grounding of start conductor ST and mark conductor 7 in cable CA—G1, primary and secondary finder operations occur as previously explained to complete a connection from the tip, ring, and sleeve conductors of calling line #917 to a selector. It may be assumed that the connection is extended through primary and secondary devices 1PA and 1SA of Figs. 4 and 5 to the selector S81 of Fig. 6, whereupon dial tone from conductor 627 is transmitted back to the calling line. When this connection is completed, and ground potential is consequently applied to the sleeve conductor of the calling line, cutoff relay 452 operates to lock itself to the sleeve conductor independent of the contacts of relay 453, and to disconnect line relay 451 which thereupon restores. Lockout relay 453, preferably adjusted to operate slightly after the cutoff relay has operated, opens the initial circuit of the now-locked cutoff relay 452.

When the hundreds digit 9 is dialed, selector S81 operates as previously discussed to select the ninth hundreds group and to select an idle link in the group. It may be assumed that the link extending to the connecting-link circuit CLC—1 of Figs. 7 to 9 is the first one found to be idle and is, therefore, selected, with the results as previously described.

When the tens, units, and partly digits (1, 7, and 0) are dialed, operations as previously described occur with the result that these digits are recorded respectively in tens registry TR, units register UR, and party register PR, of Figs. 8 and 9.

Following the dialing of the party digit, connecting relays 711 and 600 are energized in series over their previously traced circuit. Relay 711 thereupon makes connection with the conductors in cable CA—CT and brings about the operation of party-digit transfer relay 911 over conductor 747.

In the common test equipment CT, the grounding of start conductor ST of the cable CA—CT by relay 711 results in the previously described operation of transfer-start relay 1103 to place an energizing potential on conductor 13. The result, as previously described, is that the portion of the common equipment shown in Figs. 1 to 3 is called into service, and that ground potential is returned on conductod 11 when this has been accomplished, bringing about the energization of common-transfer relays 810 and 910, whereby the recorded tens and units digits are transferred over cables CA—TM and CA—UM to cause the connection to be extended from the connecting-link circuit CLC—1 to the desired called line substantially as hereinbefore described. It may be assumed that the terminating end of the connection to line #917 (Fig. 4A) is by way of primary device 1PB of Fig. 4 and secondary device S5B (Fig. 5), to which connection is made by the device DR—1 of Fig. 6.

When the connection has been set up to the desired line, and hold relay 427 of the primary device 1PB has operated, the resultant grounding of conductor 15 at the contacts of relay 427 causes clearout relay 222 to operate as previously described. The ground potential on conductor 15 is further extended, through contacts of the operated transfer control relay 221, to conductor 14 in cable CA—TM, operating relay 1107 of the common test equipment CT, to lock itself to conductor 11 of the cable CA—TM, grounded at contacts of relay 221.

Since the calling line is also the called line, the sleeve conductor of the terminating portion of the connection is connected to the grounded sleeve conductor S of the multiple of the concerned line #917, whereby line-test relay 1108 is shunted and thereby prevented from energizing in series with cutoff relay 452. The operation of relay 1107 of the cycle group in the common test equipment CT is accordingly followed by the operation of the slow- operating cycle relay 1106, through contacts of the non-operated line-test relay 1108.

When relay 1106 operates to shunt line-test relay 1108 and to remove the local shunt from around reverting-call test relay 1109, relay 1109 does not operate, being shunted by ground potential applied to the right-hand terminal thereof over the following circuit path:

From ground, through the inner upper contacts of relay 1104, contacts 1121 of relay 1106, conductor S2 of cable CA—CT, contacts 724, conductor S in cable CA—DR—1, through the operated device DR—1 (Fig. 6), sleeve conductor S of link S5B, through the secondary device 5SB (Fig. 5), sleeve conductor S of link P1B, through the operated device 1PB (Fig. 4), to the sleeve conductor S of the called line multiple #917 (Fig. 4A) and thence through the primary device 1PA, sleeve conductor S of link P1A, through the device 1SA, sleeve conductor S of link S1A, through the selector S81, the sleeve conductor S incoming to the connecting-link circuit CLC—1, front contact of armature 723 and the said armature, and conductor S1 of cable CA—CT, to the left-hand terminal of reverting-call test relay 1109.

The failure of reverting-call test relay 1109 to operate when the local shunt is removed therefrom at the contacts of armature 1121 establishes that the call being made is a reverting call. Since relay 1109 does not operate, it does not place ground potential on busy lead B of cable CA—CT.

A moment later slow-operating relay 1105 is operated, through the lower contacts of the relay 1106. Upon operating, relay 1105 locks itself to ground, through the lower contacts of relay 1107; removes the shunt from its retarding upper winding to permit it to release quickly when open-circuited; and at its upper contacts it operates relay 1104.

At its lower contacts, relay 1104 locks itself to ground at the lower contacts of relay 1107; at its inner lower contacts it short-circuits the lower winding of relay 1106 so as to cause relay 1106 to release shortly; at its middle lower armature it removes the shunt from around resistor 1126; while at its inner upper armature it removes the ground connection previously existing, through contacts 1121, to the associated terminating sleeve lead S2. The previously traced shunt path around the winding of reverting-call test relay 1108 is thus opened at the inner upper contacts of relay 1104. When this occurs, the entire holding current over the incoming sleeve of the connecting-link circuit CLC—1 of Fig. 8 flows through the winding of relay 1108. The relays which derive their current over this holding circuit are switching relay 621 of Fig. 6 and cutoff relay 452 of Fig. 4A. Additionally, the low-resistance winding of lockout relay 453 draws holding current from the sleeve conductor S of line multiple 917. Because of the presence of lockout relay 453 in the line circuit of line #917, a substantially heavier holding current is drawn at this time than is the case when the reverting call is being made from a line such as line #918, whose line circuit does not contain a lockout relay. With resistor 1126 having been introduced by relay 1104, the current through relay 1108 tends to be reduced somewhat. Nevertheless, the marginally adjusted relay 1108 is able to operate because of the additional holding current required by the presence of the above-mentioned lockout relay 453 in the holding circuit. Upon operating, relay 1108, at its inner upper contacts, opens a point in the connection through which ground potential would otherwise be applied to hold conductor H, while at its upper contacts it opens the initial circuit of the now-locked relay 1104 and attempts to apply ground potential to the associated busy conductor B, but is prevented from so doing by the open condition of contacts 1116.

A moment later, relay 1106 restores responsive to being shunted at the inner lower contacts of relay 1104. When it restores, it again removes the local shunt from around the winding of line-test relay 1108, but relay 1108 again fails to operate at this time because its terminals are connected respectively to leads S1 and S2, which are connected together through the common sleeve connection over the above-traced shunt path. At armatures 1119, the restored relay 1106 applies ground potential to reverting-call conductor RC. At armatures 1120, relay 1106 attempts to apply ground potential to hold conductor H, but is prevented from so doing at the inner contacts of the operated reverting-call test relay 1109.

In the connecting-link circuit CLC—1, the described grounding of conductor RC of cable CA—CT results in the operation of reverting-call relay 705 through contacts 726. At armature 712, relay 705 opens the connection through which ground potential is ordinarily applied to the incoming sleeve conductor S through contacts of the operated release relay 704, but this operation is of no effect as long as relay 711 or relay 702 remains operated. At its lower armature, relay 705 prepares a circuit for switching relay 709; at its inner lower contacts it closes a temporary locking circuit for release relay 704, through contacts of busy relay 708, to the grounded local conductor 738; and at its inner upper contacts it closes a parallel circuit for auxiliary relay 710. Relay 710 thereupon operates.

At its inner lower armature, relay 710 closes a locking circuit for itself and a holding circuit for relay 705; at its inner upper contacts, it makes a multiple application of ground potential to the hold conductor H in cable CA—DR—1 so as to maintain the connection established with the called line after relay 711 has restored, while at its lower contacts it open-circuits and restores relays 711 and 600.

Upon restoring, relay 711 frees the conductors in cable CA—CT to allow the common equipment to clear out. When this occurs, the outgoing sleeve conductor, conductor S in cable CA—DR—1, has no ground potential applied thereto in connecting-link circuit CLC—1, for switching relay 709 is not in operated condition at this time. The connection to the called line, however, is maintained intact by the ground potential applied to conductor H of cable CA—DR—1 at the inner upper contacts of relay 710.

Although contacts 712 of reverting-call relay 705 are open, the incoming sleeve conductor S is maintained grounded temporarily (following the restoration of relay 711), at the front contact of the upper armature of line relay 702, through the contacts controlled by armature 723.

As a further result of the described operation of reverting-call relay 705, busy-tone lead 733 is connected through the upper contacts of relay 705, through the back contact of armature 717 and the said armature, and condenser 714 to the tip talking conductor to give a busy-tone signal to the calling subscriber. The subscribers are preferably instructed to wait, on reverting calls, for this signal and to replace the receiver when the signal is heard.

When the receiver is replaced on the calling line, responsive to the above-mentioned busy-tone signal, line relay 702 restores and opens the original circuit, at its lower armature, of release relay 704. Relay 704, however, does not restore at this time, being held operated in a locking circuit including its lower armature, conductor 738, inner lower contacts of busy relay 708, and the inner lower contacts of reverting-call relay 705.

At its upper armature, line relay 702 removes ground potential from the incoming sleeve conductor S, armature 712 being in operated condition as pointed out. When this occurs, switching relay 621 restores to clear out the selector S81. The restoration of relay 621 results in the removal of holding ground potential from conductor H of link S1A, whereupon the secondary and primary devices 1SA and 1PA of Figs. 5 and 4 respectively clear out and are returned to common use. The connection established by finder action and selector operation between the calling line and the connecting-link circuit CLC—1 is thus automatically broken when the calling subscriber replaces his receiver, the terminating portion of the connection being held as previously mentioned at the inner upper contacts of relay 711.

In the calling line circuit (Fig. 4A) cutoff relay 452 now restores and reconnects line relay 451 to the line, but the latter relay does not now operate, for the receiver has been replaced at the calling substation (#9171). Cutoff relay 452 also temporarily disconnects itself from the sleeve lead. A slight interval later, however, lockout relay 453 (which is only slightly slow restoring) restores and reconnects cutoff relay 452 to the associated sleeve lead.

As a further result of the restoration of line relay 702, a circuit is closed at the lower armature and back contact thereof, through contacts of the operated relays 704 and 705, for switching relay 709. As is indicated by the cross-hatched upper portion thereof, relay 709 is rendered slow-operating, as by being provided with a copper collar around the armature end of its core. As a result, the operation of switching relay 709 is delayed a sufficient interval to permit the above-described restoration of lockout relay 453 (Fig. 4A) to occur before relay 709 operates.

Upon operating relay 709 lock itself to the grounded local conductor 738 at its inner lower contacts, through the inner lower contacts of the operated auxiliary relay 710; at armatures 715 and 716, it closes points in the ringing circuit; and at its inner upper armature it reapplies ground potential to sleeve conductor S in cable CA—DR—1, now extended through the operated devices DR—1, S5B, and 1PB, to the multiple of the concerned party line #917 (Fig. 4A). When this occurs cutoff relay 452 reoperates, through contacts of the restored lockout relay 453, and again locks itself to the associated sleeve lead S independent of the contacts of the relay 453. At the same time, cutoff relay 452 disconnects the windings of line relay 451 to prevent interference with the ringing operation which is about to ensue. Lockout relay 453 also reoperates. At its upper contacts, relay 453 again renders the circuit of cutoff relay 452 dependent upon the closed inner contacts of the latter relay.

As a further result of the described operation of switching relay 709, locking conductor 744 of off-normal relay 807 is disconnected from local conductor 738 and is transferred to the normally grounded pick-up conductor 743.

When the pick-up cam contacts 930 of the code machine CM (Fig. 9) next remove ground potential from pick-up conductor 743, off-normal relay 807 is unlocked and restored as hereinbefore explained to connect ringing relay 707, at armature 836, to the origin point of the digit contacts of relays 931 to 935, comprising the party register PR. Transfer relay 911 having been restored, and the digit 0 having been delivered to the party register PR, all the relays of this register are in restored condition and ringing relay 707 is thereby connected to conductor O in cable CA—CO, controlled by the tenth code cam contacts 940. Ringing relay 707 is accordingly controlled in accordance with the tenth party code. Each time it operates, ringing relay 707 applies ringing current to the called line, through the common lead 734, from the generator G, the return path to battery and ground being through the winding of trip relay 706.

It will be understood, of course, that the ringer at the calling substation responds to the code along with the ringers at all of the other substations on the line. The calling subscriber is thus able to determine when the call has been answered.

When the called subscriber at substation 9170 (Fig. 4A) responds, by removing his receiver, trip relay 706 responds to operate busy relay 708 as a ring-cutoff relay. Upon operating, relay 708 opens the ringing circuit and completes the connection over the tip and ring conductors between the concerned line and back-bridge relay 703. Back-bridge relay 703 now operates over the called line. At this time, it does not apply a holding ground connection to conductor 738 as in the case of a non-reverting call, being prevented from doing so by the now-open lower contacts of reverting-call relay 705.

As a further result of its operation, busy relay 708, at its inner lower contacts, opens the local holding circuit of release relay 704, with the result that relay 704 shortly restores.

Upon restoring, release relay 704, at its inner lower armature, opens the initial operating circuit of switching relay 709, while at its lower armature it removes ground potential from local conductor 738, unlocking and restoring relays 705, 708, 709, and 710. Back-bridge relay 703 restores responsive to the restoration of relays 708 and 709. Reverting-call relay 705 is rendered slightly slow-releasing, as by the indicated conducting sleeve around the core thereof, whereby it does not restore until after back-bridge relay 703 has restored. Reapplication of ground potential to conductor 738 through the contacts of back-bridge relay 703 is thus prevented.

The connecting-link circuit CLC—1 is now completely cleared out, and idle-indicating battery potential, through resistor 718, is reapplied to the incoming sleeve conductor S at contacts of the restored relay 710 to enable this connecting-link circuit to be again taken for use.

Upon the restoration of auxiliary relay 710, ground potential is removed from hold conductor H in cable CA—DR—1, causing the switching devices DR—1 of Fig. 6, S5B and 1PB of Figs. 5 and 4, to clear out. By this operation, the connection of the connecting-link circuit CLC—1 and the concerned line #917 of Fig. 4A is broken. Ground potential is thereby removed from the associated sleeve conductor S of the #917 line multiple, whereupon cutoff relay 452 immediately restores, lockout relay 453 being slightly slow-restoring as previously explained. Upon the restoration of cutoff relay 452, line relay 451 is reconnected to the associated line. At this time, because the receiver is off at the called substation #9170, line relay 451 immediately operates. Upon so doing, it closes a locking circuit at its inner contacts, through the inner lower armature of the operated lockout relay 453, for the latter relay. Lockout relay 453 is thus maintained operated, and the associated sleeve lead S is maintained guarded by ground potential, as long as line relay 451 remains operated. Because of the open condition of the back contacts of the inner and lower armatures of lockout relay 453, no start-ground and mark-ground connections are extended by the reoperated line relay. Cutoff relay 452, being maintained disconnected at the upper contacts of relay 453, is not reoperated when line relay 451 operates and closes the above-mentioned locking circuit for relay 453.

When the calling subscriber, at substation #9171, removes his receiver responsive to the cessation of the operation of his ringer (resulting from the answering of the called subscriber at substation #9170), the two subscribers may converse with each other as desired, talking current being supplied over line #917 through the windings of line relay 451.

When the conversation has been terminated and the two subscribers replace their receivers, line relay 451 restores thereby unguarding the associated sleeve lead S and permitting lockout relay 453 to restore.

*Reverting-call service on four-party lines*

The way in which reverting-call service is handled on the four-party city lines will now be explained. For this purpose, it will be assumed that the subscriber at substation #9181 (Fig. 4A) on four-party line #918 desires to converse with the subscriber at substation #9184 on the same line. For this purpose, the subscriber at substation #9181 removes his receiver; waits for dial tone; and then dials the digits (9, 1, 8 and 4) in the desired number.

It may be assumed that, when the receiver is removed, the primary and secondary devices 1PA and 1SA of Figs. 4 and 5 operate to extend the connection from the multiple of the calling line #918 to the selector S81 (Fig. 6). It may be assumed further that the selector S81, on responding to the hundreds digit 9, makes connection with the connecting-link circuit CLC—1 of Figs. 7 to 9.

When the connecting-link circuit CLC—1 is seized by the selector S81, it prepares itself for operation as hereinbefore described.

The tens, units, and party digits, when dialed, are recorded in the registers TR, UR, and PR of Figs. 8 and 9, following which connecting relay 711 operates as previously described to connect with the common test equipment CT of Fig. 11 over cable CA—CT. Transfer-start relay 1103 thereupon operates to apply battery potential to conductor 13 of the cable CA—TM to cause the common equipment of Figs. 1 to 3 to be changed over for connector action, whereupon relays 810 and 910 are operated, the recorded tens and units digits are transferred as previously described to cause the connection to be established to the called line.

It may be assumed that the primary and secondary devices operated to connect with the called lines are 1PB and 5SB of Figs. 4 and 5, the connection also including device DR—1, Fig. 6. When this connection has been completed and conductor 14 of cable CA—TM is consequently grounded as hereinbefore described, the previously described operation of cycle relays 1104 to 1107 of the common test equipment CT is initiated.

Since the called line is also the calling line, the called line tests busy Line-test relay 1108 consequently fails to operate. As a result, relay 1106 operates over the associated conductor 14; locally shunts line-test relay 1108; and removes the local shunt from the winding of reverting-call test relay 1109 to make the previously described reverting-call test.

Since the call under consideration is a reverting call, relay 1109 fails to operate at this stage, whereby the associated busy lead B in cable CA—CT is not grounded.

A moment later, relays 1105 and 1104 operate successively, and relay 1104 removes ground potential from the terminating sleeve conductor S2 and inserts resistor 1126 in series with reverting-call test relay 1109. At this time, reverting-call test relay 1108 does not operate, even though all of the holding current for switching relay 621 of selector S81 (Fig. 6) and cutoff relay 426 of the calling line circuit (Fig. 4A) passes through relay 1109. With current-limiting resistor 1126 now in circuit and with no increase of normal current flow over the sleeve conductor (such as is occasioned by a comparatively low resistance lockout relay such as 453), the current flowing through the marginally adjusted reverting-call test relay is insufficient to operate the relay.

With reverting-call test relay 1109 remaining in an unoperated condition, the restoration of relay 1106 (which occurs responsive to the shunting of the lower winding thereof at the inner lower contacts of relay 1104) results in the application of ground potential, through contacts 1118, 1120, the contacts of relay 1109, to hold conductor H. At the same time, ground potential is applied, through contacts 1117 and 1119, to the reverting-call conductor RC.

In CLC—1, Fig. 7, hold relay 701 operates over hold conductor H of cable CA—CT, through contacts 725, and reverting-call relay 705 operates over conductor RC, through contacts 726. As previously explained, reverting-call relay 705, at its inner lower contacts, closes a local holding circuit for release relay 704; at its middle lower armature it prepares an operating circuit for switching relay 709; at armature 712 it opens the normal incoming sleeve ground connection; at armature 713 it disconnects signal lamp 731; and at its inner upper armature it closes a parallel circuit for auxiliary relay 710.

Hold relay 701, upon operating, closes a locking circuit for its lower winding to local conductor 738, while at its lower armature it prepares a holding circuit for release relay 704 under the control of back-bridge relay 703.

When auxiliary relay 710 responds to the closure of its circuit by the inner upper contacts of reverting-call relay 705, it accomplishes the hereinbefore described circuit changes, including the open-circuiting and restoration of connecting relays 711 and 600. The common equipment is freed by the restoration of relay 711.

The previously discussed busy-tone signal is transmitted over the calling line through the upper contacts of reverting-call relay 705, prompting the calling subscriber to replace his receiver.

When the receiver is replaced at the calling substation #9181 (Fig. 4A), line relay 702 restores. With contacts 712 of reverting-call relay 705 now open, the upper armature of line relay 702 removes ground potential from the incoming sleeve conductor S, permitting cutoff relay 462 to restore, and permitting the selector S81 of Fig. 6 to clear out as previously described, as a result of which the primary and secondary finders 1PA and 1SA of Figs. 4 and 5 clear out, leaving the connection between the connecting-link circuit CLC—1 and the concerned line only that established by connector action through the devices 1PB, 5SB, and DR—1.

This being a reverting call, the restoration of line relay 702 is not followed by the restoration of release relay 704 as that relay is held operated in a circuit which includes the inner lower contacts of relays 705 and 708 and the lower contacts of relay 704. Consequently, local conductor 738 is maintained grounded to maintain relays 701, 705 and 710 locked operated.

As a further result of the restoration of line relay 702, switching relay 709 is operated, through the lower contacts of line relay 703, inner lower contacts of release relay 704, and the middle lower armature and front contact of reverting-call relay 705. Switching relay 709 thereupon applies ground potential to the sleeve conductor S in cable CA—DR—1 to regard the sleeve conductor of the multiple of the concerned line #918 and to reoperate cutoff relay 462.

The ringing operation occurs as a result of the transferal of the holding circuit of relay 807 to pick-up conductor 743 at the lower armature of switching relay 709, with the result that relay 807 restores when the code machine CM of Fig. 9 next arrives in pick-up position.

The code signaling ringing current is sent out as previously described by ringing relay 707, in accordance with whichever one of the ten codes has been selected by the setting of party register PR (Fig. 9), code #4 in the present assumed example.

When the subscriber at substation #9184 removes his receiver to answer the call, trip relay 706 operates as previously described to operate busy relay 708, whereupon busy relay 708 opens the ringing circuit and connects back-bridge relay 703 to the concerned line to supply talking current.

With hold relay 701 now operated and locked, the operation of back-bridge relay 703 results in the closure of a circuit, through the lower armature and front contact of relay 701 for the slow-acting release relay 704. This circuit holds release relay 704 operated after the temporary local holding circuit therefor has been opened at the inner lower contacts of relay 708. With relay 704 thus held operated to maintain ground potential on local conductor 738, relays 701, 705, and 708 to 710 are held operated to keep the connecting-link circuit CLC—1 from clearing out, and relay 709 maintains ground potential on the associated terminating sleeve conductor S to maintain the concerned party line #918 guarded for the duration of the reverting call conversation. Talking current is supplied to the line through the windings of back-bridge relay 703.

The subscribers at substations #9181 and #9184 may converse with each other as described, when the subscriber at the substation #9181 again removes his receiver responsive to the cessation of the operation of his ringer.

When the conversation has been terminated and the two subscribers have replaced their receivers, the restoration of back-bridge relay 703 is followed shortly by the restoration of slow-acting release relay 704. At its lower contacts, relay 704 removes ground potential from the local conductor 733, whereupon relays 701, 705, and 708 to 710 restore, clearing out the connecting-link circuit. The devices DR—1, 5SB, and 1PB clear out as previously pointed out.

*Non-busy-line service*

Line #955 (Fig. 4B) is equipped to serve as what is referred to herein as a "non-busy" line. By this, it is meant that the making of one calling connection to such a line does not preclude the making of one or more additional calling connections to the line while the first connection remains established thereto. These additional connections are made to the line despite the fact that the normal guarding potential is placed on the sleeve conductor thereof whenever the line is called. Such additional connections are made possible by the non-busy-line service provisions (including relay 1102) of the portion of the common equipment shown in Figs. 10 and 11.

The line shown in Fig. 4B may be one used for answering inquiries and the like. One example of such a line is one leading to a fire station in a comparatively small community over which calls are received from the residences of voluntary firemen regarding the location of a fire after the common fire signal has been sounded.

Let it be assumed now that #955 has been called and that a connection has been extended to the line of Fig. 4B over the tip, ring, and sleeve conductors of the associated #955 multiple. When this occurs, the placing of ground potential on the sleeve lead S of this multiple results in the closure of a circuit, through the lower contacts of line relay 473 and of cutoff relay 472, for ringing relay 471. When this occurs, ringing relay 471 operates to transfer the called line from a connection with line relay 473 into connection with the indicated ringing leads, thereby applying ringing current to the called line. At its lower contacts, relay 471 closes a circuit for the grounded sleeve conductor to battery through the winding of cutoff relay 472. Cutoff relay 472 is preferably slow-operating as indicated by the shaded upper portion thereof, to thereby prolong the ringing operation.

Upon operating, cutoff relay 472 closes a locking circuit for itself to the associated sleeve conductor and disconnects ringing relay 471. Being slow-restoring as indicated, ringing relay 471 remains operated for an interval and then restores, terminating the application of ringing current to the called line.

As will be pointed out hereinafter, no ringing current is applied to a called non-busy line such as #955, from a connecting-link circuit, such as CLC—1 of Figs. 7 to 9.

Let it be assumed now that, while the connection is maintained with the non-busy line #955 over the line multiple thereof, another call is made to such line. It may be assumed, for example, that this other call made to line #955 is from the line of substation A (Fig. 4) from which connection has been extended through the devices 1PA, 1SA, and S81 to the connecting-link circuit CLC—1 of Figs. 7 to 9. Following the seizure of the connecting-link circuit CLC—1 under these circumstances, the tens and units digits 5 and 5 are recorded on the tens register TR and the units register UR, while the assigned party digit 5 is recorded on the party register PR.

The dialing of the final digit in the called number, the party digit 5, is followed by the previously described operation of connecting relay 711 to associate the connecting-link circuit CLC—1 with the common-test equipment CT of Fig. 11. At the same time, conductor 747 is grounded by contacts 730 of relay 711 to operate transfer relay 911, individual to party register PR.

With relay 911 in operated condition, and with relays 810 and 910 not yet operated, ground potential (through armatures 913, 914, and 912 of relay 911) is extended through the set registers TR, UR, and PR respectively to the fifth terminal of each of the identity blocks B—TI, B—UI, and B—PI. The ground potential extended to the fifth terminal of block B—TI, for example, is through contacts 913, over conductor 901, and thence through contacts of the operated relays 825, 824, 823, 822, and 821, to the associated common digit-5 conductor, and thence through contacts of the unoperated relay 810 to the digit-5 terminal of the block B—TI.

From terminal 5 of block B—TI, jumper J21 extends to the terminal associated with the upper winding of non-busy line relay 1102, whereby the upper winding of this relay is energized. As indicated, relay 1102 is a marginal relay; it is not operated except when energized by current flow through both of its windings at the same time.

At the same time, the ground potential on digit-5 terminal of block B—UI is extended, by way of jumper J22, and through contacts controlled by the lower armature of relay 1102, to the lower winding of the said relay 1102. Relay 1102 now operates, for current is flowing through both of its windings.

The identifying potential placed on the fifth terminal of party block B—PI is not required at this time for identification purposes, since the concerned line #955 is not in fact a party line and the assignment of a party digit in the number thereof is merely for the purpose of causing the calling subscriber to dial a party digit to complete the required sequence of operations in the connecting-link circuit.

Upon operating, non-busy-line relay 1102 at its lower armature locks its lower winding to the grounded conductor 1114, which is a local extension of the now-grounded start conductor ST in cable CA—CT. Although a relay such as 1102 is unable to operate except when both windings are energized, the characteristics of the relay are such that it will remain operated with current flow in only one winding. It is, therefore, unnecessary to close a locking circuit for each of the windings.

At its upper contacts, relay 1102 joins conductors SW and B of cable CA—CT.

Along with the described operation of relay 1102, the normal sequence of operations previously described is occurring in the common equipment. These operations include that of transfer-start relay 1103 to place an energizing potential on conductor 14 of cable CA—TM to cause the common equipment of Figs. 1 to 3 to be changed over from finder action to connector action. When this has been accomplished, and transfer-control relay 221 has operated, the consequent grounding of conductor 11 in cable CA—TM results in the closure of a circuit through contacts of relays 1101 and 1109 for operating transfer relays 810 and 910. Relays 810 and 910 disconnect the associated digit conductors from blocks B—TI and B—UI and transfers them to the cables CA—TM and CA—UM with the hereinbefore described results. As a consequence, the marked condition of the #5 terminal in each of the blocks B—TI and B—UI is terminated, opening the circuit of the upper winding of relay 1102. Relay 1102, however, remains operated in its locking circuit which includes its lower winding, the front contact of its inner lower armature and the said armature, conductor 1114, and the associated grounded conductor ST in cable CA—CT.

When the portion of the common equipment shown in Figs. 1 to 3 has caused the connection to be set up from the connecting link circuit CLC—1 to called line #955 in accordance with the transferred tens and units digits 5 and 5, ground potential is applied as previously described to conductor 14 in cable CA—TM, starting the cycle portion of the common test equipment CT into operation to cause the called line to be tested. It may be assumed that the connection includes the devices 1PB and 5SB of Figs. 4 and 5, in addition to the device DR—1 of Fig. 6.

The terminating sleeve conductor S2 in cable CA—CT is thus connected to the sleeve conductor S in the #955 multiple (Fig. 4B). Under the assumption previously made, the sleeve conductor S of this multiple is grounded at this time because the associated line is in use by virtue of a previous connection thereto. Under this condition, line test relay 1108 is unable to operate, and the now-grounded conductor 14 remains in connection with the lower winding of relay 1106. Upon the operation of relay 1106, line test relay 1108 is excluded from the circuit and reverting-call test relay 1109 is inserted in the circuit as previously described. Since the call now being made is not a reverting call, relay 1109 is not shunted and, therefore, operates in the holding circuit of the originating portion of the connection (including the selector S81, Fig. 6). At its upper contacts, relay 1109 applies ground potential, through contacts 1116 to conductor B of cable CA—CT. This ground potential is also extended, through the upper contacts of the operated relay 1102, to the switching conductor SW in cable CA—CT.

In the connecting-link circuit CLC—1, busy relay 708 operates over lead B of cable CA—CT, and switching relay 709 operates over lead SW in cable CA—CT. Relay 709 brings about the operation of relay 710, whereupon relay 710 operates as previously described to open-circuit and restore connecting relays 711 and 600.

The common equipment is freed by the restoration of relay 711.

Off-normal relay 807 (which is unlocked, along with the relays of party register PR, at the lower contacts of relay 708) is slow-restoring, as indicated, whereby it does not prematurely restore relay 711 at contacts 837 before relays 709 and 710 have operated, and relay 710 has taken over the holding of ground potential on lead H of cable CA—DR—1 to maintain the terminating portion of the connection.

With the party register PR having been cleared out by the operation of busy relay 708, ringing relay 707 cannot operate, and with relays 708 to 710 in operated condition, the talking circuit is complete through contacts of relays 708 and 709. Back-bridge relay 703 does not operate at this time because the non-busy-line circuit of Fig. 4B includes the blocking condensers 474 and 475, talking current being supplied to the called line through line relay 473.

Still other connections, as desired, may be set up contemporaneously to the line shown in Fig. 4B regardless of the fact that the line is already in use.

With respect to the connection from any given calling line to the line of Fig. 4B, such connection is cleared out as will now be pointed out.

In the case of the connecting-link circuit CLC—1, when the receiver is replaced on the calling line the resultant restoration of line relay 702 permits release relay 704 to restore and remove ground potential from local conductor 738, whereupon relays 708 to 710 restore. The portion of the connection between the calling line and the connecting-link circuit CLC—1 is cleared out when the incoming sleeve conductor is ungrounded at the upper armature of release relay 704, while the portion of the connection between the connecting-link circuit CLC—1 and the line of Fig. 4B is cleared out responsive to the removal of holding ground from conductor H of cable CA—DR—1 by relay 710.

It will be understood, of course, that additional lines, as desired, may be provided with non-busy-line service by equipping any such line with a line circuit such as that shown in Fig. 4B and by providing each such line with a relay such as 1102. The jumpers, such as J21 and J22, for each additional relay are cross-connected with the appropriate terminals of blocks B—TI and B—UI, according to the tens and units digits in the directory number of any such other line accorded non-busy-line service. Conductors SW, B, and 1114 may be multipled to the corresponding contacts of the additional non-busy-line relays, as is meant to be shown by the indicated common connections leading from these conductors immediately to the right of the contacts of relay 1102.

*Call-hold service*

As previously explained, call-hold service enables the switchboard attendant to discover the identity of any line from which a call is made to any other line temporarily provided with call-hold service, in order that the originators of mischievous and annoying calls may be discovered. For this purpose, each of the connecting-link circuits is provided with special call-hold facilities. Those of the connecting-link circuits CLC—1 of Figs. 7 to 9 include hold relay 701, operable from the common-test equipment. When operated at a time when reverting-call relay 705 is not operated, relay 701 prepares to hold the connection intact between the calling and called lines, as long as the receiver is not hung up at the called substation, and it prepares to light the associated signal lamp 731 when the receiver is replaced at the calling substation, signalling the attendant to trace the connection to discover the identity of the calling line.

For every line or substation which is to be temporarily provided with call-hold service, a relay such as 1101 is provided. Relay 1101 is illustrated as being temporarily individual to the fifth party-line substation on line #917, Fig. 4A (telephone #9175), the associated jumpers J18, J19, and J20 being cross-connected in blocks B—TI, B—UI, and B—PI in accordance with the tens, units, and party digits (1, 7, and 5, respectively) in the directory number of the concerned line.

Assume now that a call is made from line #911 (Fig. 4) for example to substation #9175 on party line #917.

It may be assumed that the removal of the receiver at the calling substation A results in operation of the devices 1PA and 1SA of Figs. 4 and 5 to extend connection to the selector S81 of Fig. 6, and that the dialing of the hundreds digit 9 results in the connection being extended as previously described to the connecting-link circuit CLC—1 of Fig. 7.

As a result of the dialing of the tens and units digits 1 and 7, and of the party digit 5, the digits 1, 7, and 5 are recorded respectively on the registers TR, UR, and PR, following which connecting relay 711 operates to associate connecting-link circuit CLC—1 with the common test equipment CT, and transfer relay 911 is operated to cause the terminals in blocks B—TI, B—UI, and B—PI to be marked in accordance with the setting of the tens, units, and party registers.

The ground potential on the first terminal of block B—TI is extended through temporary jumper J18 to the upper winding of relay 1101 (temporarily individual to #9175); the identifying ground potential on the seventh terminal of block B—UI is extended by way of temporary jumper J19 to the lower winding of relay 1101; and the identifying ground potential on the fifth terminal of block B—PI is extended through temporary jumper J20 to the lower armature of relay 1101.

Both windings of relay 1101 now receive current, whereby the relay is operated. Upon operating, relay 1101 locks its lower winding to the associated locking conductor 1114, at the same time disconnecting the associated jumper J19. The ground potential received over jumper J20 at the lower armature of relay 1101 is now extended, to the hold conductor H in cable CA—CT, thereby closing a circuit, through contacts 725, for the upper winding of hold relay 701. Relay 701 thereupon operates and locks its lower winding to local conductor 738.

A short interval after relay 1101 is operated and locked as above described, the portion of the common equipment shown in Figs. 1 to 3 is operated to prepare itself for connector operation (responsive to the operation of transfer start relay 1103), and applies ground potential to conductor 11 in cable CA—TM to operate relays 810 and 910 to transfer the stored tens and units digits over the cables CA—TM and CA—UM to cause the connection to be set up to the desired line as hereinbefore described.

The connection set up to the desired line may be assumed to include primary device 1PB of Fig. 4 and the secondary device 5SB of Fig. 5, to which connection is made by distributor DR—1 of Fig. 6.

When this connection has been completed, conductor 14 in cable CA—TM becomes grounded temporarily as previously pointed out, starting the common equipment CT to test the called line to determine whether or not the connection is to be made or denied. Let it be assumed that the called line is idle, in which case the resulting testing operation causes switching lead SW in cable CA—CT to become grounded to bring about the operation of switching relay 709 to prepare the ringing circuit at armatures 715 and 716.

Since the substation being called on the party line #917 (Fig. 4A) is the fifth substation, the operation of code-ringing relay 707 is controlled in accordance with the digit 5, which has been set up on the party register PR, Fig. 9.

When the called subscriber responds, trip relay 706 temporarily operates and causes relay 708 to operate and lock to thereby open the ringing circuit and complete the talking circuit. Back-bridge relay 703 is now operated over the called line. With relay 701 in operated and locked condition, back-bridge relay 703 maintains release relay 704 in operated condition independent of line relay 702.

Let it be assumed now that the one calling from substation A, Fig. 4, is a mischievous person who desires to annoy the subscriber at telephone #9175, and that the calling subscriber refuses either to identify himself or to tell from where he is calling. In this event, the called subscriber at substation #9175 does not replace his receiver until the connection has been traced by the central office attendant.

When the calling subscriber at substation A replaces his receiver, line relay 702 restores, but release relay 704 remains operated through contacts of back-bridge relay 703 and the operated hold relay 701, whereby the connection between the calling line and the connecting-link circuit CLC—1 is maintained intact by the maintenance of ground potential on the incoming sleeve conductor S at the upper contacts of relay 704. With line relay 702 restored, a circuit is closed through the upper contacts thereof, through the upper contacts of hold relay 704, and contacts 713, for signal lamp 731. Lamp 731 thereupon becomes lighted to identify the connecting-link circuit CLC—1 as the one through which a connection from an anonymous calling line is being held from the called line. The circuit of lamp 731 includes the connected common conductor 732, which may have a signal relay therein to operate a common alarm to attract the attendant's attention.

As is well known, the connection between the calling line and the connecting-link circuit CLC—1 can be traced as follows:

In the selector S81, the energized condition of relays 624 and 625 shows that this selector is in connection with the connecting-link circuit CLC—1;

In the secondary device 1SA, the energized condition of selecting relay 501, with switching relay 506 not energized, shows that the device 1SA is in connection with the device 1PA; and In the device 1PA, the energized condition of relay 411, with relay 416 not operated, shows that the device is in connection with line #911 of substation A.

When the attendant has traced the connection, he may bridge a portable test telephone across the talking conductors and converse with the subscriber at the called substation and inform him of the identity of the calling line.

When the receiver is replaced at the called substation, the restoration of back-bridge relay 703 permits release relay 704 to restore, whereupon the connection is cleared out as previously described.

*P. B. X service*

As previously explained, the portion of the common equipment shown in Figs. 10 and 11 includes a relay such as 1010 for each P. B. X group. Conductors 11, 12, 1114, and cutoff relay 1009 are common to all such P. B. X relays. Relay 1010 is illustrated as associated with the P. B. X group having directory #9991.

Let it be assumed that the connecting-link circuit CLC—1 of Figs. 7 to 9 has been seized in a call destined for P. B. X group #9991, and that the tens, units, and party digits 9, 9, and 1 have been recorded in the registers TR, UR, and PR respectively. In this event, when connecting relay 711 operates to make connection with the common test equipment CT of Fig. 11 and operates transfer relay 911 to extend marking ground potential to the selected contacts of identity blocks B—TI, B—UI, and B—PI, relay 1010 is operated over temporary jumpers J16 and J17 responsive to identifying potential on the ninth terminal of each of the blocks B—TI and B—UI. Upon operating, relay 1010 locks its lower winding to conductor 1114 at its lower armature, while at its inner upper armature it operates the common cutoff relay 1009 to prevent subsequent operation of transfer relays 810 and 910, so as to enable the tens and units marking to be made to the conductors of the cables CA—TM and CA—UM only through the contacts of the operated P. B. X relay 1010.

At its middle upper and upper armatures, relay 1010 connects conductors 11 and 12 of the cable CA—TM respectively to jumpers J4 and J3, preparatory to placing units and tens marking on the conductors of the cables CA—UM and CA—TM.

When, as the result of the operation of transfer-start relay 1103 to apply potential to conductor 13 of cable CA—TM, transfer control relay 221 operates to cause the associated portion of the common equipment to be changed over from finder action to connector action, conductors 11 and 12 in the cable CA—TM are grounded as previously explained. The ground potential on conductor 11 is now extended, through contacts of relay 1010, and jumper J4, to the sixth terminal in the units-mark block B—UM, thereby grounding the sixth conductor in units-mark table CA—UM to determine that the P. B. X line to which connection is to be made in one having the digit 6 as the units digit of its individual directory number.

The above mentioned grounding of conductor 12 of the cable CA—TM results in the extension of ground potential, through the upper contacts of relay 1010, to the jumper J3, whence it is extended to one or another of the terminals of tens-mark block B—TM of Fig. 8, depending upon the busy or idle condition of the lines in the P. B. X group, all of which have the same units digit (6) in their respective individual directory numbers.

The first line in the P. B. X group is line #916 (Fig. 4). Accordingly, the above mentioned jumper J3 extends to the upper armature of cutoff relay 404. If line #916 is idle, and cutoff relay 404 is consequently not operated, the ground potential on jumper J3 is further extended, by way of jumper J5, to the first terminal in the block B—TM to thereby ground the first conductor in cable CA—TM. On the other hand, if the first line in the P. B. X group is busy, the resulting operated condition of cutoff relay 404 causes the ground potential on jumper J3 to be extended to the upper armature of the next cutoff relay 404′, associated with the second P. B. X line #926. If this second line is idle ground potential is extended, through jumper J6, to the second terminal in block B—TM in Fig. 8. On the other hand, if the second line is also in use and relay 404′ is consequently in an operated condition, the ground potential on jumper J3 is further extended to the jumper associated with the first idle succeeding line of the P. B. X group.

In the present example, it may be assumed that the first line #916 is idle, in which case cutoff relay 404 is not operated, and the ground potential incoming on jumper J3 is extended over jumper J5 to the first conductor in tens cable CA—TM. As a result, connection is made with the first P. B. X line #916 through the devices 1PB and 5SB, the distributor DR—1 making connection with the device 5SB.

When the connection is made and test-start conductor 14 in cables CA—TM is consequently grounded as hereinbefore described, the previously described testing operation of the common test equipment CT, Fig. 11, is initiated. Since the line connected with is idle under the assumption previously made, the line test relay 1108 is in operated condition, whereby ground potential is extended through contacts of relays 1108 and 1107 to the switching conductor SW of cable CA—CT to thereby operate switching relay 709 in the connecting-link circuit CLC—1 to cause the connection to be completed at the connecting-link circuit to the called line #916.

The subsequent operations are as previously described, relays 1009 and 1010 clearing out when ground potential is removed from conductor ST of cable CA—CT upon the operation of relay 710 (and consequent restoration of relay 711), responsive to the previously mentioned operation of relay 709.

When a call is made to the P. B. X group at a time when all of the intervening lines except the last (line #906) are in use, the ground potential incoming on jumper J3 is extended to the upper armature of relay 404''. The upper armature of the final cutoff relay 404'' may be strapped to the back contact thereof, whereby the incoming ground potential is extended to the associated jumper J7, whether cutoff relay 404'' is operated or not. The terminating connection is accordingly directed to the final line (#906) of the P. B. X group when all the intervening lines are in use, whether this final line be busy or idle. The common test equipment CT thereupon operates as previously described to test the connected line #906. If the line is idle, the connection is caused to be completed at the connecting-link circuit CLC—1 by the operation of switching relay 709. But, if line #906 is busy at this time, the connection is denied at the connecting-link circuit, and busy relay 708 is operated as previously described to send back a busy-tone signal over the calling line.

By the previously described arrangement, each of the P. B. X lines is in a different tens group of the concerned hundreds group of lines, thus distributing the comparatively heavy P. B. X traffic throughout the several tens groups to avoid overloading of any one of them.

It will be understood, of course, that fewer lines than ten may be included in a P. B. X group. In the event that more lines than ten are required in a P. B. X group, a second P. B. X call number may be assigned to the lines of the P. B. X group in excess of ten, an additional relay similar to 1010 being operated responsive to the calling of this second P. B. X call number to cause connection to be extended to the first idle one of the P. B. X lines in excess of the initial ten. In this event, a subscriber calling the first P. B. X call number and receiving a busy signal may then call the other P. B. X call number of the same group to make connection with one of the lines associated therewith.

*Intercepting service*

It is common practice in telephone exchanges to intercept calls intended for disconnecting lines and for disconnected substations on party lines. This intercepting service is ordinarily provided for a definite length of time following the disconnection in order to acquaint the subscribers with the fact of such disconnection before the concerned numbers are reassigned. The intercepting operator also ordinarily informs the calling subscriber of any new number assigned to the concerned party. The arrangements exemplified by relay 1008 enable intercepting service to be given readily, and with a minimum of equipment, in the illustrated system.

In order to explain how intercepting service is given in the disclosed system, let it be assumed that substation #9175 (Fig. 4A) on party line #917 has been disconnected, such as may occur when the subscriber has moved to a new location. Relay 1008 is one of a number of relays which may be provided for intercepting service, and any one of them can be temporarily associated with any directory number assigned to the associated hundreds group. Relay 1008 is shown as temporarily identified with party #5 on line #917 by jumpers J13 to J16. Jumper J13 connects the upper winding of relay 1008 to tens terminal #1 in block B—TI; jumper J14 connects the lower winding of relay 1008 to units terminal #7 in block B—UI; while jumper J15 connects the lower armature of relay 1008 to party terminal #5 in block B—PI. As a result, when a call is made (through the connecting-link circuit CLC—1 of Figs. 7 to 9, for example) intended for the now-disconnected substation #9175 on party line #917 (Fig. 4A), the setting of the registers TR, UR, and PR in accordance with the tens, units, and party digits 1, 7, and 5, followed by the operation of relay 911, causes identifying potentials to be extended over jumpers J13 to J14 to operate relay 1008. Party-identifying potential is extended over jumper J15, resulting in the closure of a circuit, through the lower contacts of the operated relay 1008, and over conductor 1013 for call relay 1001.

When relay 1001 operates, it disconnects transfer relays 810 and 910 to prevent the recorded tens and units digits from being subsequently transferred over cable CA—TM and CA—UM.

Relay 1001 also connects conductor 12 to jumper J1, and it connects the associated conductor 11 to jumper J2. As a result, when conductors 12 and 11 become grounded subsequently by the operation of transfer control relay 221, the resultant extension of ground potential to jumpers J1 and J2 causes the 0 conductor in each of the cables CA—TM and CA—UM to become energized to thereby transfer the tens and units digits 0 and 0 to the portion of the common equipment shown in Figs. 1 to 3. The call is thus extended to line #900 (not shown) which is assumed to be a line leading to the switchboard of the intercepting operator.

The usual test of the called line now takes place. If the line #900 is in use, the previously described testing operation causes the connection to be denied at the connecting-link circuit CLC—1 and a busy-tone signal to be returned by the operation of busy relay 708. On the other hand, if the intercepting line #900 is idle, connection is made thereto through the connecting-link circuit CLC—1 as in the case of a call to a regular subscriber's line. The call-intercepting operator may then converse with the calling subscriber and give him such information as may be desired.

Intercepting-service relay 1008 is cleared out when connecting relay 711 of the connecting-link circuit CLC—1 clears out at the end of the testing operation.

*Secretarial service*

As previously explained, relays 1004 and 1005 are associated in common with as many pairs of secretarial-service relays, such as 1006 and 1007, as may be provided, each such pair of relays being assigned to a separate secretarial-service subscriber. By the running of the temporary jumpers J8 to J12, as will be hereinafter discussed, relays 1006 and 1007 are assigned to the provision of secretarial service for substation A, being the substation on individual line #911 (Fig. 4).

A subscriber to secretarial service may condition the secretarial relay equipment assigned to his line to divert calls from his station to the line of a common secretary, the intercepting operator in the assumed example.

Let it be assumed now that the subscriber at substation A desires to have his calls answered temporarily by the common secretary, which may occur when he is going to be absent for a time. In this event, the calling subscriber at substation A, Fig. 4, removes his receiver and dials the number (911) assigned to his line, followed by the party digit 9. The complete number called is 9119.

It may be assumed that the connection, is extended, on the removal of the receiver, through devices 1PA and 1SA of Figs. 4 and 5, to the selector S81, and that the selector S81 extends connection to the connecting-link circuit CLC—1 of Figs. 7 to 9, when the hundreds digit 9 is dialed. In this event, the tens, units, and party digits (1, 1, and 9) are set up on the registers TR, UR, and PR, following which connecting relay 711 is operated to associate the connecting-link circuit CLC—1 with the equipment CT (Fig. 11), and transfer relay 911 of the party register PR is operated to identify the recorded tens, units, and party digits. When this occurs, ground potential on terminal 1 of the tens block B—TI is extended, through temporary jumper J8, to the upper winding of relay 1006; ground potential on terminal 1 of the units block B—UI is extended through temporary jumper J9 to the lower winding of relay 1006; and ground potential on the ninth terminal in block B—PI is extended, through the temporary jumper J10, to the lower armature of relay 1006.

Relay 1006 now operates because of the energization of both its windings, and locks itself to the associated conductor 1114. At its lower armature, relay 1006 extends the ground potential received over jumper J10, over common conductor 1015, to connecting relay 1004. Relay 1004 thereupon operates to prepare a circuit for the lower winding of relay 1007.

As the result of the operation of transfer relay 1103 and the consequent placing of battery potential on conductor 13 of cable CA—TM, the common equipment of Figs. 1 to 3 is changed over to connector action and conductors 11 and 12 of the cable CA—TM are grounded, whereupon relays 810 and 910 operate to cause the recorded tens and units digits (1 and 1) to be transferred over the cables CA—TM and CA—UM to cause connection to be set up from the connecting-link circuit CLC—1 to the calling line, such as by way of the devices 1PB and 5SB of Figs. 4 and 5, as well as the device DR—1 of Fig. 6.

The operation of relays 810 and 910 removes energizing ground potential from jumpers J8 and J9, but relay 1006 remains operated in its locking circuit to conductor 1114. Jumper J10 (connected to terminal 9 of block B—PI) remains grounded to hold relay 1004 operated.

When connection has been extended to the calling line as above pointed out, line test relay 1108 is unable to operate because the calling and called lines are the same. Accordingly, when conductor 14 in cable CA—TM is grounded as a result of the completion of the connection by the primary device 1PB (Fig. 4), the resulting operation of relay 1107 is followed by the operation of relay 1106 (through contacts of relay 1108). A moment later, relay 1106 operates to apply the reverting-call test. The purpose of this operation at this time is to insure that the one calling to divert the normal calls from the concerned line to the line of the common secretary is someone calling from the concerned line. If the call is from any line other than the concerned line, reverting-call test relay 1109 operates and at its inner contacts prevents the relay operations now about to be described from occurring.

In the present assumed example, the call is in fact from the concerned line and reverting-call test relay 1109 is unable to operate, since the calling and called lines are the same.

When the previously described reverting-call test is completed, and relay 1106 restores with relay 1104 operated, conductor RC of cable CA—CT is grounded as hereinbefore described to bring about the operation of reverting-call relay 705 in the connecting-link circuit CLC—1. At the same time, the ground potential placed on the lead RC closes a circuit through the upper contacts of the operated connecting relay 1004, conductor 1012, and contacts of relay 1006 for the lower winding of relay 1007. Relay 1007 thereupon operates and closes a locking circuit for itself at its inner lower contacts, while at its lower contacts it connects jumper J12 to call relay 1001. This latter operation is of no effect at this time, as the jumper J12 is not now identified in the block B—PI.

In the connecting-link circuit CLC—1, auxiliary relay 710 responds to the operation of reverting-call relay 705, with the result that connecting relay 711 is open-circuited and restored. Ground potential is thereby removed from start conductor ST of the cable CA—CT, clearing out the common equipment and restoring relays 1004 to 1005. Relay 1007, however, remains locked operated.

In the connecting-link circuit CLC—1, a busy-tone signal is returned at the upper contacts of reverting-call relay 705, indicating to the calling subscriber that the connection has been completed back to his own line and that he should replace his receiver. When the receiver is replaced ringing current is projected out on the calling line as hereinbefore described, giving the calling subscriber a further indication of the successful completion of the connection. This ringing current is terminated when the calling subscriber again removes his receiver, and the final clearing out of the connection occurs when he again replaces his receiver.

The subscriber at substation A (Fig. 4), if he so desires, may now call the secretarial operator directly, telephone number 900, in the event that he desires to give her any special instructions.

With relay 1007 now operated and locked, any further calls to the line of substation B are directed to the intercepting operator as will now be pointed out.

Relay 1006 again operates as a result of the dialing of the tens and units digits 1 and 1 in the desired number (9111). The following of these digits by the party digit 1 results in the identifying of terminal 1 of block B—PI by ground potential, closing a circuit over the associated jumpers J12, through contacts of the operated relays 1006 and 1007, and over conductor 1013, for call relay 1001. Relay 1001 thereupon operates. At the back contact of its inner armature, relay 1001 open-circuits transfer relays 810 and 910 to prevent the transference of the digits recorded in the tens and units register TR and UR. Relay 1001 also extends the associated conductors 12 and 11 through the jumpers J1 and J2 to the terminals 0 and 0 of blocks B—TM and B—UM. As a result, when transfer control relay 221 operates to ground conductors 12 and 11, it marks the 0 conductor in each of the cables CA—TM and CA—UM, through the contacts of the operated relay 1001, thereby causing the connection to be extended to the line of the common secretary, who is also the intercepting operator in the present assumed example.

When the subscriber at substation B returns from his absence and again desires to have his calls come to his own telephone, he may call the number 911 assigned to his line, followed by the party digit 0. Relay 1006 is again operated over jumpers J8 and J9, responsive to the tens and units digits 1 and 1. By virtue of the dialing of the party digit 0, the tenth terminal in block B—PI is marked, whereby ground potential is extended, through jumper J11 and contacts of relay 1006 to common conductor 1014, thereby operating disconnect relay 1005. When relay 1005 operates, it prepares a circuit for the upper or restoring winding of differential relay 1007.

When the reverting-call test is made successfully in the common equipment CT as hereinbefore described, the resulting application of ground potential to conductor RC results in the closure of a circuit, through the upper contacts of relays 1005 and 1006, for the upper winding of the differential relay 1007. Relay 1007 is thereupon restored, disconnecting both its windings. At its lower contacts, relay 1007 disconnects jumper J12 from call relay 1001, permitting subsequent calls to the line of substation B, Fig. 4, to be completed in the usual way.

I claim:

1. In a telephone system, a group of telephone lines, a group of link circuits serving said lines when called, each link circuit having an originating end and a terminating end, switching means for connecting the originating end of any one of said link circuits with a calling line and for connecting the terminating end with a desired called one of said lines, test equipment common to all said link circuits, means for rendering said test equipment temporarily individual to any one of said link circuits during the process of setting up a connection through such link circuit, and means in each link circuit controlled from said common test equipment depending upon the called line being also the calling line for correspondingly conditioning the link circuit.

2. In a telephone system, a group of telephone lines, a group of link circuits serving said lines when called, each link circuit having an originating end and a terminating end, switching means for connecting the originating end of any one of said link circuits with a calling line and for connecting the terminating end with a desired called one of said lines, at least a portion of said lines being party lines, a first group of said party lines being equipped with lockout individual line circuits, a second group of said party lines being equipped with normal individual line circuits, test-controlled means in any link circuit effective when a called party line is also the calling line for placing a first reverting-call condition on the link circuit provided the concerned party line is one of the first group, and for placing a second reverting-call condition on the link circuit provided the concerned party line is one of the second group.

3. In a telephone system, a group of telephone lines, a group of link circuits serving said lines when called, each link circuit having an originating end and a terminating end, switching means for connecting the originating end of any one of said link circuits with a calling line and for connecting the terminating end with a desired called one of said lines, at least a portion of said lines being party lines, a first group of said party lines being equipped with lockout individual line circuits, a second group of said party lines being equipped with normal individual line circuits, test-controlled means in any link circuit effective when a called party line is also the calling line for placing a first reverting-call condition on the link circuit provided the concerned party line is one of the first group, and for placing a second reverting-call condition on the link circuit provided the concerned party line is one of the second group, means effective when either said first condition or said second condition is placed on a link circuit for clearing out the originating portion of the connection when the receiver is replaced at the calling substation and for transmitting signaling current over the terminating portion of the connection to the called line, means effective when said first condition is placed on a link circuit for clearing out the terminating portion of the connection when the call is answered, permitting talking current to be supplied from the concerned individual lockout line circuit, and means effective when the said second condition is placed on a link circuit for holding the terminating portion of the connection intact to permit talking current to be supplied to the concerned line from the link circuit.

4. In a telephone system, a group of telephone lines, a group of link circuits serving said lines when called, each link circuit having mechanism for recording the digits designating the called line, class-of-service relays associated respectively with classes of service to be accorded to certain of said lines when called, said class- of-service relays being common to all said link circuits, means effective when the line-designating digits have been set up in the recording mechanism of a link circuit for temporarily rendering said class-of-service relays individual to such link circuit, means thereupon effective, if the called line is one of said certain lines, for operating the class-of-service relay associated with the class of service to be accorded to the called line designated by the recorded digits, and means effective when any one of said class-of-service relays is operated for conditioning the link circuit to provide the class of service with which such relay is associated.

5. In a telephone system, a group of telephone lines, a group of link circuits serving said lines when called, each link circuit having mechanism for recording the digits designating the called line, calls to certain of said lines being arranged to be diverted to respectively corresponding other lines, diverting relays associated respectively with said certain lines, said diverting relays being common to all said link circuits, means effective when the line-designating digits have been set up in the recording mechanism of a link circuit for temporarily rendering said diverting relays individual to such link circuit, means thereupon effective, if the called line is one of said certain lines, for operating the diverting relay associated with the called line designated by the recorded digits, and means effective when any one of said diverting relays is operated for diverting the call from the called line to the corresponding one of said other lines.

6. In a telephone system, a group of telephone lines, a group of link circuits serving said lines when called, each link circuit having mechanism for recording the digits designating the called line, calls to certain of said lines being arranged to be diverted to another line, diverting relays associated respectively with said certain lines, said diverting relays being common to all said link circuits, means effective when the line-designating digits have been set up in the recording mechanism of a link circuit for temporarily rendering said diverting relays individual to such link circuit, means thereupon effective, if the called line is one of said certain lines, for operating the diverting relay associated with the called line designated by the recorded digit, and means effective when any one of said diverting relays is operated for diverting the call from the called line to said other line.

7. In a telephone system, a group of telephone lines, a group of link circuits serving said lines when called, each link circuit having an originating end and a terminating end, switching means for connecting the originating end of any one of said link circuits with a calling line and for connecting the terminating end with a desired called one of said lines, at least one of said lines being accorded non-busy-line service, test-controlled means in said link circuits normally effective to deny the completion of a connection to any busy called line, and other test-controlled means effective to nullify the stated effect of the first-named test-controlled means when a connection is to be completed to a line accorded non-busy-line service, whereby the connection is completed to the last-named line regardless of whether such line be busy or idle when called.

8. In a telephone system, a group of telephone lines, a group of link circuits serving said lines when called, each link circuit having an originating end and a terminating end, switching means for connecting the originating end of any one of said link circuits with a calling line and for connecting the terminating end with a desired called one of said lines, one of said lines being accorded non-busy-line service, test-controlled means in said link circuits normally effective to deny the completion of a connection when the called line is in use, and means associated with said link circuits for causing an attempted connection to be completed to the said line accorded non-busy-line service regardless of whether said line be busy or idle when called, the last-named means including a relay individual to the called line.

9. In a telephone system, a group of telephone lines, a group of link circuits serving said lines when called, each link circuit having an originating end and a terminating end, switching means for connecting the originating end of any one of said link circuits with a calling line and for connecting the terminating end with a desired called one of said lines, one of said lines being accorded non-busy-line service, test-controlled means in said link circuits normally effective to deny the completion of a connection when the called line is in use, and means associated with said link circuits for causing an attempted connection to be completed to the said line accorded non-busy-line service regardless of whether said line be busy or idle when called, the last-named means including a relay operated responsive to the calling of the directory number assigned to a line accorded non-busy-line service.

10. In a telephone system, a group of telephone lines, a group of link circuits serving said lines when called, each link circuit having an originating end and a terminating end, switching means for connecting the originating end of any one of said link circuits with a calling line and for connecting the terminating end with a desired called one of said lines, each link circuit having mechanism for recording the digits designating the called line, one of said lines being accorded non-busy-line service, a service relay associated with said one line and common to all said link circuits, means effective when the line-designating digits have been set up in the recording mechanism of a link circuit for temporarily rendering said service relay individual to such link circuit, means thereupon effective, dependent upon the designation of the said one line having been set up in the recording mechanism of the link circuit, for operating said service relay, and means controlled by said service relay when operated for conditioning the link circuit to complete connection to the called line whether it is busy or idle.

11. In a telephone system, a group of telephone lines, a group of link circuits serving said lines when called, each link circuit having an originating end and a terminating end, switching means for connecting the originating end of any one of said link circuits with a calling line and for connecting the terminating end with a desired called one of said lines, one of said lines being accorded non-busy-line service, test-controlled means in said link circuits normally effective to deny the completion of a connection when the called line is in use, means associated with said link circuits for causing an attempted connection to be completed to the said line accorded non-busy-line service regardless of whether said line be busy or idle when called, means in each link circuit normally effective to transmit ringing current to the called line, but rendered ineffective to transmit ringing current to the said line accorded non-busy-line service, and a line circuit individual to the last-named line for applying ringing current thereto responsive to the extension of a connection to such line through any one of said link circuits.

12. In a telephone system, a group of telephone lines, a group of link circuits serving said lines when called, each link circuit having an originating end and a terminating end, switching means for connecting the originating end of any one of said link circuits with a calling line and for connecting the terminating end with a desired called one of said lines, at least one of said lines being accorded non-busy-line service, test-controlled means in said link circuits normally effective to deny the completion of a connection when the called line is in use, means associated with said link circuits for causing an attempted connection to be completed to a line accorded non-busy-line service regardless of whether said line be busy or idle when called, each of said link circuits including a holding relay responsive to current flow over the called line for holding the terminating portion of a connection until the receiver is replaced on the called line, the said line accorded non-busy-line service being composed of two inductively coupled sections, a switchboard section and a line section, said switchboard section being opaque to direct current, whereby no current flows thereto from a link circuit which has extended connection to such line, the said means for holding the terminating portion of the connection from the called line being accordingly ineffective when the called line is one accorded non-busy-line service.

13. In a telephone system, a group of telephone lines, a group of link circuits serving said lines when called, means in each link circuit normally effective after a connection has been completed therethrough from a calling line to a called line for clearing out the originating portion of the connection when the receiver is replaced on the calling line whether the receiver has been replaced on the called line or not, each link circuit containing a hold relay, said lines being of two classes, means effective when the called line is a line of one class and ineffective when the called line is a line of the other class for operating the hold relay in the link circuit through which the call is extended, said hold relay being effective when operated to maintain the entire connection intact until the receiver is replaced on the called line.

14. In a telephone system, a group of telephone lines, a group of link circuits serving said lines when called, means in each link circuit normally effective after a connection has been completed therethrough from a calling line to a called line for clearing out the originating portion of the connection when the receiver is replaced on the calling line whether the receiver has been replaced on the called line or not, each link circuit containing a hold relay, said lines being of two classes, means effective when the called line is a line of one class and ineffective when the called line is a line of the other class for operating the hold relay in the link circuit through which the call is extended, said hold relay being effective when operated to maintain the entire connection intact until the receiver is replaced on the called line, and means for signaling the switchboard attendant responsive to the receiver being replaced on the calling line provided the hold relay is operated and the connection is being held from the called line.

15. In a telephone system, a group of telephone lines, a group of link circuits serving said lines when called, switching means for extending a calling line to any one of said link circuits and for extending such link circuit to any called line of said group, each link circuit having mechanism for recording the digits designating the called line, the clearing out of the connection between the calling line and the link circuiit being normally under the control of the calling line, a call-hold relay common to all said link circuits and assigned to a specific one of the lines of said group, means effective when the line-designating digits have been set up in the recording mechanism of a link circuit for temporarily rendering said call-hold relay temporarily individual to such link circuit, means for thereupon operating said common call-hold relay subject to the designation of the line with which said relay is associated having been set up on the recording mechanism of the link, each link having an individual call-hold relay, means responsive to the operation of said common call-hold relay for operating the individual call-hold relay of the currently associated link circuit, and means controlled by the last-named call-hold relay for removing the clearing out of the connection from under the control of the calling line.

16. In a telephone system, a group of telephone lines, a group of link circuits serving said lines when called, switching means for extending a calling line to any one of said link circuits, and for extending such link circuit to any called line of said group, each link circuit having mechanism for recording the digits designating the called line, the clearing out of the connection between the calling line and the link circuit being normally under the control of the calling line, a call-hold relay common to all said link circuits and assigned to a specific one of the lines of said group, means effective when the line-designating digits have been set up in the recording mechanism of a link circuit for temporarily rendering said call-hold relay temporarily individual to such link circuit, means for thereupon operating said call-hold relay subject to the designation of the line with which said relay is associated having been set up on the recording mechanism of the link, means responsive to the operation of said common call-hold relay for conditioning the currently associated link circuit to remove the clearing out of the connection from under the control of the calling line.

17. In a telephone system, a group of telephone-line terminals having a block of telephone numbers assigned thereto, each line terminal bearing a separate telephone number, a group of P. B. X lines connected respectively to certain of said line terminals, a group of link circuits serving said line terminals when called, switching means for extending a calling line to any one of said link circuits and for extending such link circuit to any called terminal of the group, each link circuit having mechanism for recording telephone numbers in said block, switch-control equipment common to all said link circuits, means effective when a telephone number has been set up in the recording mechanism of a link circuit for rendering said common equipment temporarily individual to such link circuit, said common equipment being normally effective to operate said switching means to extend the currently associated link circuit to the line terminal whose telephone number is recorded, a P. B. X service relay included in said common equipment and having assigned thereto the telephone number of a line terminal other than any of said P. B. X line terminals, means controlled by the recording mechanism of the currently associated link circuit for operating said P. B. X service relay when its said assigned telephone number is recorded, and means controlled by said relay, when operated, for causing said common equipment to operate the switching means to extend the link circuit to one or another of said P. B. X line terminals instead of to the line terminal to which the recorded telephone number is assigned.

18. In a telephone system, a group of telephone-line terminals, a group of P. B. X lines connected respectively to certain of said terminals, a group of link circuits serving said terminals when called, switching means for extending a calling line to any one of said link circuits and for extending such link circuit to any called terminal of the group, each link circuit having mechanism for recording telephone numbers assigned to said terminals, switch-control equipment common to all said link circuits, means effective when a telephone number has been set up in the recording mechanism of a link circuit for rendering said common equipment temporarily individual to such link circuit, said common equipment being normally effective to operate said switching means to extend the currently associated link circuit to the line terminals whose telephone number is recorded, a P. B. X service relay included in said common equipment, means controlled by the recording mechanism of the currently associated link circuit for operating said P. B. X service relay subject to a specific telephone number being recorded, and means controlled by said relay for causing said common equipment to operate the switching means to extend the link circuit to one or another of said P. B. X line terminals according to the busy or idle condition of the connected lines.

19. In a telephone system, groups of telephone lines, groups of switches having access respectively to said groups of lines, a P. B. X group of telephone lines comprising a line of each of said groups of lines, there being a common P. B. X telephone number assigned to the lines of said P. B. X group, and means effective when said common telephone number is called for operating a switch in one or another of said groups to make connection with an idle P. B. X line.

20. In a telephone system, a group of telephone lines divided into tens groups, the lines in each tens group bearing respectively the same units designations as the lines in any other tens group, but each said tens group bearing a separate tens designation, certain of said telephone lines comprising a P. B. X group, each said P. B. X line being a line of a different tens group, but all bearing the same units designation, final tens switches having access respectively to said tens groups of lines, there being a common call number assigned to said P. B. X group, means responsive to the calling of said common call number for causing one or another of said final switches to be positioned according to the units designation of the P. B. X lines, the one positioned depending on the busy or idle condition of the P. B. X lines.

21. In a telephone system, a group of telephone lines, a group of link circuits serving said lines when called, switching means for extending a calling line to any one of said link circuits and for extending such link circuit to any called line of the group, each link circuit having mechanism for recording the digits designating the called line, an intercepting-service relay common to all said link circuits and assignable to any specific one of the lines of said group which has been disconnected, means effective when the line-designating digits have been set up in the recording mechanism of a link circuit for rendering said intercepting-service relay temporarily individual to such link circuit, means for thereupon operating said intercepting-service relay subject to the designation of the disconnected line with which said relay is associated having been set up on the recording mechanism of the link, an intercepting line, and means controlled by said intercepting-service relay, when operated, for diverting the terminating portion of the connection from the disconnected called line to said intercepting line.

22. In a telephone system, a group of telephone lines including party lines, a group of link circuits serving said lines when called, switching means for extending a calling one to any one of said link circuits and for extending such link circuit to any called line of said group, each link circuit having mechanism for recording the digits designating the called line and designating the called substation on a called party line, an intercepting-service relay common to all said link circuits and assignable to any specific substation which has been disconnected from any party line of said group, means effective when the line and party-designating digits have been set up in the recording mechanism of a link circuit for temporarily rendering said intercepting-service relay temporarily individual to such link circuit, means for thereupon operating said intercepting-service relay subject to the designation of the disconnected substation with which said relay is associated having been set up on the recording mechanism of the link, an intercepting line, and means controlled by said intercepting-service relay, when operated, for diverting the terminating portion of the connection from the line of the disconnected substation to said intercepting line.

23. In a telephone system, subscriber lines having directory numbers assigned respectively thereto, switching means normally responsive to the calling of any such directory number for extending the call to the line to which such number is assigned, means associated with a specific one of said lines for diverting calls for such line to a specific other line, means for extending a connection from a calling line to said diverting means incident to the calling of the directory number assigned to said specific line, and means controllable over one such connection for rendering said diverting means effective, and controllable over another for rendering it ineffective.

24. In a telephone system, subscriber lines having directory numbers assigned respectively thereto, switching means normally responsive to the calling of any such directory number for extending the call to the line to which such number is assigned, means associated with a specific one of said lines for diverting calls for such line to a specific other line, means for extending a connection from a calling line to said diverting means incident to the calling of the directory number assigned to said specific line; means controllable over one such connection for rendering said diverting means effective, and controllable over another for rendering it ineffective; and means for preventing said rendering means from being controlled over a connection from a line other than said specific line.

25. In a telephone system, subscriber lines having directory numbers assigned respectively thereto, switching means normally responsive to the calling of any such directory number for extending the call to the line to which such number is assigned, means associated with a specific one of said lines for diverting calls for such line to a specific other line, means for extending a connection from a calling line to said diverting means incident to the calling of the directory number assigned to said specific line; and means controllable over one such connection responsive to the suffixing of a specific digit to the called directory number for rendering said diverting means effective, and controllable over another connection responsive to the suffixing of another specific digit to the called directory number for rendering said diverting means ineffective.

26. In a switching system including a large group of lines divided into small groups, primary switching devices each comprising a group of relays adapted to make connection selectively with any line of a small group, a plurality of primary devices being provided for each said small group of lines, the lines of each small group being multipled to all of the said primary devices assigned thereto, secondary switching devices similar to said primary switching devices, said secondary switching devices being arranged in a number of groups equal to the number of primary switching devices assigned to a small group of lines, said secondary devices being multipled together by groups, each of said secondary groups having access to a primary device assigned to each small group of lines, and means for selectively operating the relays constituting any secondary switching device to make connection with a primary device assigned to any small group of lines, and for selectively operating the relays constituting the last said primary device to make connection with any line in the small group to which it is assigned.

27. A relay-type switching device comprising a group of separately operable relays, there being a separate pair of link paths associated with each relay, each relay being adapted when operated to prepare each of the two associated link paths, a further selective relay selectively operable to complete either of the two link paths prepared by the operation of any one of the first-named relays, conductors over which the operation of all of the said relays are controlled, a connecting relay operable when the switching device is idle to connect said conductors to the said selective relays, and a hold relay for disabling said connecting relay when the switching device is in use.

28. In a switching system, lines divided into groups, primary switching devices assigned to each group, each such device being operable to make connection with any line in the group to which it is assigned, secondary switching devices operable to make connections in tandem with operated primary switching devices, equipment provided in common for operating said primary and secondary switching devices, means effective when a connection is to be extended from a secondary switching device through a primary switching device to one of said lines for taking said common equipment into use and for operating it to cause the connection to be extended, means effective after the connection has been extended for freeing the common equipment for use in extending other connections, means effective as long as the common equipment is associated with the operated primary and secondary devices for holding them operated, and means controlled over the established connection for closing and maintaining a holding circuit for the operated secondary device and for closing and maintaining a holding circuit for the operated primary device through the operated secondary device, and means for insuring that both holding circuits are established before the said common equipment is freed from either of said operated devices.

29. In a switching system, lines divided into groups, groups of primary switching devices assigned respectively to said groups of lines, groups of secondary switching devices, the devices in each secondary group having access to a primary device in each of the primary groups, a portion of the devices in each secondary group being assigned to outgoing service, the remaining secondary devices in each secondary group being assigned to incoming service, a single group of common control equipment, means in said control equipment effective whether a connection is being extended from, or is being extended to, one of said lines for operating any idle one of the associated primary devices to make connection with the line, and means in said control equipment depending upon whether the call is being extended from the line or is being extended to the line for causing an outgoing or an incoming secondary device in the concerned secondary group to make connection with the last said primary device.

30. In a switching system; large groups of lines; each large group being divided into small groups; groups of primary switching devices assigned respectively to said small groups of lines; each large group of lines having groups of secondary switching devices assigned thereto, the devices in each secondary group having access to a primary device in each of the primary groups assigned to the same large group of lines; a portion of the devices in each secondary group being assigned to outgoing service, the remaining secondary devices in each secondary group being assigned to incoming service; separate incoming link paths for each large group of lines; selectors having access to all said incoming link paths; means responsive to a call being originated on any one of said lines for causing a connection to be extended therefrom, through an idle primary switching device assigned to the small group in which the calling line is located, and thence through an idle secondary device to an idle one of said selectors; means controlled over the calling line for setting said selector in accordance with the large group in which the desired called line is located; said selector being responsive thereto to extend connection to an idle incoming link path assigned to the called large group; means controlled over the calling line for indicating the small group containing the desired called line and for indicating which line therein is the desired called line; means responsive thereto for setting an idle primary device in the called small group on the called line and for setting a secondary device in the called large group on the last-named primary device, and distributing means for connecting the incoming link path in use with the last-named secondary device.

31. In a switching system including a large group of lines divided into small groups; groups of primary switching devices assigned respectively to said small group of lines; groups of secondary switching devices; the devices in each secondary group having access to a primary device in each of the small groups; incoming link paths; means for causing a connection to be extended from any calling one of said lines, through an idle primary switching device assigned to the small group in which the calling line is located, and through an idle secondary device to an idle incoming link path; means controlled over the calling line for indicating the small group containing the desired called line and for indicating which line therein is the desired called line; means responsive thereto for setting an idle primary device in the called small group on the called line and for setting a secondary device on the last-named primary device, and distributing means thereafter operable for connecting the incoming link path in use with the last-named secondary device.

32. In a switching system including a large group of lines divided into small groups; groups of primary switching devices assigned respectively to said small groups of lines; groups of secondary switching devices; the devices in each secondary group having access to a primary device in each of the small groups; link paths; means for causing a connection to be extended from one calling one of said lines through an idle primary switch-in device assigned to the small group in which the calling line is located, and through an idle secondary device to an idle link path; means controlled over the calling line and through the operated primary and secondary device for storing an indication of the small group containing the desired called line and an indication of which line in the small group is the desired called line; common control means; means effective after both said indications are stored for causing said common control means to operate in accordance therewith to position an idle primary device in the called small group on the called line and for positioning an idle secondary device on the last-named primary device, and distributing means for interconnecting the link path in use with the last-named secondary device.

33. In an automatic switching system, a group of lines, links common to said lines, switching equipment arranged to connect any one of said links individually to any one of said lines, control equipment common to said lines and links, means responsive to a call being originated on a calling one of said lines for causing said common equipment to operate said switching equipment to link a connection by finder action between a calling line and an idle one of said links, digit storage means operable over the calling line to store digit information indicative of the designation of the desired called line, and means for operating said common equipment in accordance with the stored digit information to operate said switching equipment to link a path by connector action from the last-named link to the desired called one of said lines.

34. In an automatic switching system including a large group of lines divided into small groups, groups of primary switching devices assigned respectively to said small groups of lines, groups of secondary switching devices, the devices in each secondary group having access to a primary device in each of the small groups, the number of groups of secondary switching devices being equal to the number of primary devices assigned to a small group of lines, a separate matching relay for each group of secondary devices, means responsive to a call being originated in any one of said small groups for associating said matching relays respectively with the primary switching devices assigned to the concerned small group of lines, means controlled by said matching relays for causing connection to be extended from the calling line through an idle primary switching device and an idle secondary switching device having access thereto, storage means controlled over the calling line for storing digit information indicative of the small group containing the desired called line and indicative of which line in the small group is the desired called line, means controlled in accordance with the digit information stored for associating said matching relays respectively with the primary devices assigned to the called small group, means controlled by said matching relays for causing an idle primary device in the called small group to make connection with the desired called line and for causing an idle secondary switching device having access to the last-named primary device to make connection therewith, and means for interconecting the secondary device to which the calling line has been extended with the secondary device to which the called line has been extended.

35. In a switching system including a large group of lines divided into small groups; groups of primary switching devices assigned respectively to said small groups of lines; groups of secondary switching devices; the devices in each secondary group having access to a primary device in each of the small groups; control equipment common to all of said devices, means effective when a call is originated on any line in any small group for rendering said common control equipment temporarily individual to the small group containing the calling line; means controlled by said common equipment for causing an idle primary device in the concerned small group to make connection with the calling line and for causing a secondary device having access to the last-named primary device to make connection therewith; means effective for thereupon freeing said common equipment and returning it to common use; and means responsive to said common equipment being rendered temporarily individual to a small group containing a calling line at a time when no tandem connection can be linked, through an idle primary device in the concerned group and an idle secondary device having access thereto, for returning the common equipment to common use and for temporarily preventing further association of the common equipment with the last-named small group.

36. In a switching system including a large group of lines divided into small groups; groups of primary switching devices assigned respectively to said small groups of lines; groups of secondary switching devices; the devices in each secondary group having access to a primary device in each of the small groups; control equipment common to all of said devices, means effective when a call is originated on any line in any small group for rendering said common control equipment temporarily individual to the small group containing the calling line; means controlled by said common equipment for causing an idle primary device in the concerned small group to make connection with the calling line and for causing a secondary device having access to the last-named primary device to make connection therewith, means effective for thereupon freeing said common equipment and returning it to common use; means responsive to said common equipment being rendered temporarily individual to a small group containing a calling line at a time when no tandem connection can be linked, through an idle primary device in the concerned group and an idle secondary device having access thereto, for returning the common equipment to common use and for temporarily preventing further association of the common equipment with the last-named small group, and means effective upon the elapse of a predetermined time interval for again enabling the common equipment to become associated with the last-named small group.

37. In a switching system, a group of devices, each of said devices being operable when idle to extend a connection, each device having a hold relay and means for operating it when the device is in use, said hold relay restoring when the device again becomes idle, an operating conductor normally extending to the first device, the hold relay of the first device having transfer contacts effective when the relay is operated for transferring the operating conductor to the next succeeding device, said conductor being transferred in a similar manner through contacts of the hold relays of all busy ones of said devices to an idle one when only a part of the devices are in use, means effective when one of said devices is to be operated for closing an operating circuit for the first idle device over said operating conductor, the device being responsive to the closure of the said circuit for operating to extend a connection therethrough, and means effective while a device is being operated for closing a temporary holding circuit for the holding relay of any busy one of said devices to prevent the extended operating circuit from being broken in case any preceding device becomes idle during the time a succeeding device is being operated.

38. In a switching system; primary and secondary switching devices, each such switching device being composed entirely of selectively operable relays through whose contacts a connection may be extended; means effective when a call is originated on a calling line for operating one of said primary switching devices to make connection with the calling line, and for operating one of said secondary switching devices to make connection with the operated primary switching device; means controlled over the calling line for setting another secondary switching device to make connection with another primary switching device, and for operating the said other primary switching device to make connection with the called line; and means for interconnecting the two last-named secondary switching devices together to afford a connection from the calling line to the called line.

39. In a switching system including a large group of lines divided into small groups, groups of small-capacity primary switching devices assigned respectively to said small groups of lines, small-capacity secondary switching devices having access to said primary switching devices, each of the said primary and secondary switching devices being composed entirely of selectively operable relays, and means effective responsive to the origination of a call on any line in any one of said small groups for causing an idle one of said primary devices assigned to the calling small group to make connection with the calling line and for causing an idle one of said secondary devices to make connection with the last-named primary device.

40. In a switching system including a large group of lines divided into small groups, groups of small-capacity primary switching devices assigned respectively to said small groups of lines, small-capacity secondary switching devices having access to said primary switching devices, each of the said primary and secondary switching devices being composed entirely of selectively operable relays, means effective responsive to the origination of a call on any line in any one of said small groups for causing an idle one of said primary devices assigned to the calling small group to make connection with the calling line and for causing an idle one of said secondary devices to make connection with the last-named primary device, control means common to all of said switching devices, and means effective when any one of said switching devices is to be operated for causing said common control means to bring about the selective operation of the relays constituting such switching device.

41. A switching system including lines divided into line groups and having identifying numbers assigned respectively thereto, the identifying number of any of said lines including a digit indexing the one of said groups in which it is located, followed immediately by the digits indexing the line within the group; (*a*) each such line group having, specific thereto, a group of line links, primary switching devices for interconnecting such line links with the associated lines, a group of terminating links, secondary switching devices for interconnecting such terminating links with the associated line links, a group of terminating trunks, and distributor switching devices for interconnecting such trunks with the associated terminating links; (*b*) in each line group, the lines, the primary switching devices, and the primary end of the line links, being divided into primary subgroups; (*c*) in each line group, the secondary end of the line links, the secondary switching devices, and the terminating links, being divided into secondary subgroups, with line links at any secondary subgroup extending respectively to the associated primary subgroups; (*d*) a selector switching stage common to all said line groups, said groups of terminating trunks extending from the selector stage to their respective line groups; (*e*) trunks incoming to the selector stage; (*f*) means for extending a calling line into connection with any idle one of the said incoming trunks; (*g*) means thereafter effective in the selector switching stage, controlled over the seized incoming trunk responsive to the calling of the group-indexing digit in the number of any desired line in any group, for extending connection from such trunk to an idle terminating trunk in the indexed line group; (*h*) means associated with the called line group and controlled over the last-named trunk for recording the remaining digits in the number of the called line; and (*i*) means controlled in accordance with such recorded digits for operating associated distributor, secondary, and primary switching devices to further extend the connection serially therethrough to the identified called line.

42. A switching system including lines divided into line groups and having multi-digit identifying numbers assigned respectively thereto, each such number including a portion indexing the concerned line group and a further portion indexing the concerned line therein; (*a*) each such line group having, specific thereto, a group of line links, primary switching devices for interconnecting such line links directly with the associated lines, a group of terminating links, secondary switching devices for interconnecting such terminating links directly with the associated line links, a group of terminating trunks, and distributor switching devices for interconnecting such trunks directly with the associated terminating links; (*b*) in each line group, the lines, the primary switching devices and the primary end of the line links, being divided into primary subgroups; (*c*) in each line group, the secondary end of the line links, the secondary switching devices, and the terminating links, being divided into secondary subgroups, with line links at any secondary subgroup extending respectively to the associated primary subgroups; (*d*) a selector switching stage common to all said line groups, said groups of terminating trunks extending from the selector stage to their respective line groups; (*e*) trunks incoming to the selector stage; (*f*) means for extending a calling line into connection with any idle one of the said incoming trunks; (*g*) means thereafter effective in the selector switching stage, controlled over the seized incoming trunk responsive to the calling of the group-indexing portion of the number of any desired line in any group, for extending connection from such trunk to an idle terminating trunk in the indexed line group; (*h*) means associated with the called line group and controlled over the last-named trunk for recording the line-indexing portion of the number of the called line; and (*i*)

means controlled in accordance with such recorded digits for operating associated distributor, secondary, and primary switching devices to further extend the connection serially therethrough to the identified called line.

43. In a switching system, lines; a group of first and second trunk sections over which calling ones of said lines may be extended, said group comprising subgroups each including a first trunk section, a second trunk section, and a further trunk section in duplicate of one of those named; first switching devices operable to interconnect any one of said lines with any first trunk section; second switching devices operable to interconnect any first trunk section with any second trunk section in the same subgroup; contact sets corresponding respectively to said trunk sections; means effective when any one of said lines is calling for placing each of said contact sets in one position subject to the corresponding trunk section being busy, and for placing it in another position subject to the corresponding trunk section being idle; means controlled through said contact sets when one of said lines is calling, and dependent upon the respective positions occupied by concerned ones of them, for selecting any subgroup subject to such subgroup containing an idle first trunk section and an idle second trunk section, and for selecting an idle first trunk section and an idle second trunk section in the selected subgroup; and means for operating a first switching device and a second switching device to extend the calling line by way of the selected first trunk section to the selected second trunk section.

44. In a switching system, lines; a group of first and second trunk sections over which calling ones of said lines may be extended, said group comprising subgroups each including a plurality of first trunk sections and a second trunk section; first switching devices operable to interconnect any one of said lines with any first trunk section; second switching devices operable to interconnect any first trunk section with any second trunk section in the same subgroup; contact sets corresponding respectively to said trunk sections; means effective when any one of said lines is calling for placing each of said contact sets in one position subject to the corresponding trunk section being busy, and for placing it in another position subject to the corresponding trunk section being idle; means controlled through said contact sets when one of said lines is calling, and dependent upon the respective positions occupied by concerned ones of them, for selecting any subgroup subject to such subgroup containing an idle first trunk section and an idle second trunk section, and for selecting an idle first trunk section and an idle second trunk section in the selected subgroup; and means for operating a first switching device and a second switching device to extend the calling line by way of the selected first trunk section to the selected second trunk section.

45. In a switching system, groups of called lines; first, second, and third groups of trunks, said second and third trunks comprising subgroups each including a plurality of second trunks common to all said groups of called lines, and including third trunks corresponding respectively to said groups of called lines, said first trunks being common to all said subgroups; first switching devices operable to interconnect any first trunk directly with any second trunk in any subgroup; second switching devices operable to interconnect any second trunk directly with any third trunk in the same subgroup; means effective when a call is received over one of said first trunks for any one of said groups of called lines for selecting any idle second trunk in any subgroup subject to such subgroup containing an idle third trunk corresponding to the called group, and for selecting such idle third trunk; and means for operating a first switching device and a second switching device to extend the last-named first trunk by way of the selected second trunk to the selected third trunk.

46. In a switching system, groups of called lines; first, second, and third groups of trunks, said second and third trunks comprising subgroups each including a plurality of second trunks common to all said groups of called lines, and including third trunks corresponding respectively to said groups of called lines, said first trunks being common to all said subgroups; first switching devices operable to interconnect any first trunk directly with any second trunk in any subgroup; second switching devices operable to interconnect any second trunk directly with any third trunk in the same subgroup; third switching devices operable to interconnect any third trunk directly with any called line in the corresponding group; means effective when a call is received over one of said first trunks for any one of said called lines for selecting an idle second trunk in any subgroup subject to such subgroup containing an idle third trunk corresponding to the line group containing the called line, and for selecting such idle third trunk and the called line; and means for operating a first switching device, a second switching device and a third switching device to extend the last-named first trunk by way of the selected second trunk and the selected third trunk to the selected called line.

NORMAN H. SAUNDERS.